US007702442B2

(12) United States Patent
Takenaka

(10) Patent No.: US 7,702,442 B2
(45) Date of Patent: Apr. 20, 2010

(54) CONTROL DEVICE FOR VEHICLE

(75) Inventor: Toru Takenaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 192 days.

(21) Appl. No.: 11/572,606

(22) PCT Filed: Aug. 4, 2005

(86) PCT No.: PCT/JP2005/014297

§ 371 (c)(1),
(2), (4) Date: Jan. 24, 2007

(87) PCT Pub. No.: WO2006/013922

PCT Pub. Date: Feb. 9, 2006

(65) Prior Publication Data

US 2008/0133066 A1    Jun. 5, 2008

(30) Foreign Application Priority Data

Aug. 6, 2004    (JP)    ............... 2004-231269

(51) Int. Cl.
*A01B 69/00* (2006.01)
(52) U.S. Cl. ............... 701/48; 701/41; 701/58
(58) Field of Classification Search .......... 701/1, 701/41, 42
See application file for complete search history.

(56) References Cited

U.S. PATENT DOCUMENTS 5,043,896 A *    8/1991  Sol ............... 701/80

(Continued)

FOREIGN PATENT DOCUMENTS

EP    0 995 656    4/2000

(Continued)

OTHER PUBLICATIONS

"Automotive Engineering Handbook—Basics and Theory (vol. 1)", Society of Automotive Engineers of Japan, Inc., Jun. 15, 1992, pp. 180-184, p. 211. p. 220, p. 225.

(Continued)

*Primary Examiner*—Mark Hellner
*Assistant Examiner*—Helal A Algahaim
(74) *Attorney, Agent, or Firm*—Rankin, Hill & Clark LLP

(57) ABSTRACT

A control device for a vehicle is equipped with a vehicle model motion determining device for determining a motion of a vehicle (a vehicle model motion) on a vehicle model expressing the dynamic characteristics of a vehicle on the basis of drive manipulated variables, such as an angle of steering by a driver, and a state amount error reaction control device for determining control inputs to an actuator control device of the actual vehicle and the vehicle model motion determining device according to a feedback law on the basis of a difference between a state amount of a vehicle model motion (model state amounts, such as a position or a posture of a vehicle) and a state amount of a motion of the actual vehicle 1 (a state amount error). Based on a state amount error, not only a motion of an actual vehicle but also a vehicle model motion is manipulated, thereby enhancing robustness against disturbance factors or their changes while conducting actuator operation control that is suited to a behavior of the actual vehicle as much as possible.

18 Claims, 23 Drawing Sheets

U.S. PATENT DOCUMENTS

| | | | |
|---|---|---|---|
| 5,408,411 A * | 4/1995 | Nakamura et al. | 701/48 |
| 5,455,770 A | 10/1995 | Hadeler et al. | |
| 5,671,143 A * | 9/1997 | Graber | 701/72 |
| 5,701,248 A | 12/1997 | Wanke | |
| 6,453,226 B1 | 9/2002 | Hac et al. | |
| 6,547,343 B1 | 4/2003 | Hac | |
| 2002/0087251 A1 * | 7/2002 | Kogure et al. | 701/80 |
| 2003/0187578 A1 * | 10/2003 | Nishira et al. | 701/301 |

FOREIGN PATENT DOCUMENTS

| | | |
|---|---|---|
| EP | 1 527 970 | 5/2005 |
| JP | 02-018168 | 1/1990 |
| JP | 07-304460 | 11/1995 |
| JP | 2002-019485 | 1/2002 |

OTHER PUBLICATIONS

"Motions and control of automobiles", Sankaido, Jul. 23, 2004, p. 55.

* cited by examiner

CONTROL DEVICE FOR VEHICLE

TECHNICAL FIELD

The present invention relates to a control device for a vehicle having a plurality of wheels, such as an automobile (engine automobile), a hybrid car, an electric car, and a motorcycle.

BACKGROUND ART

A vehicle, such as an automobile, is provided with systems, including a driving/braking system that transmits a driving force from a propulsive force generating source, such as an engine, to a wheel or imparts a braking force, a steering system (steering control system) for controlling steering control wheels of a vehicle, and a suspension system that elastically supports a vehicle body on wheels, as main mechanisms. Furthermore, in recent years, there has been known a vehicle provided with a variety of electric or hydraulic actuators to actively (positively) control the operations of the actuators according to a traveling condition or an environmental condition or the like rather than only passively operating the aforesaid systems in response to operations (man-caused operations) of a steering wheel (driver's wheel), an accelerator (gas) pedal, a brake pedal or the like performed by a driver (refer to, for example, 6.8.1 of page 220 of "Automotive Engineering Handbook—Basics and Theory (Vol. 1)/The Society of Automotive Engineers of Japan (published on Jun. 15, 1992)" (hereinafter referred to as non-patent document 1)).

Regarding, for example, a steering system, a control method called a model following method is shown in FIGS. 6-99(a) on page 225 of the aforesaid non-patent document 1. According to this control method, a steering control angle of a steering wheel operated by a driver is input to a reference model in which the steering control response characteristics of yaw angular velocities and lateral accelerations have been set in advance. Then, an input of a vehicle model is determined so as to make the vehicle model follow an output of the reference model, and the determined input is additionally input to an actual vehicle (an actual steering system), thereby operating the actual vehicle steering.

However, the technology shown in the aforesaid non-patent document 1 has been suffering from the following inconveniences. The behaviors of an actual vehicle are subjected to a variety of disturbance factors, including changes in a friction coefficient of a road surface. Meanwhile, it is virtually difficult to construct a vehicle model expressing behaviors of the vehicle by taking every disturbance factor into account, and there is no other choice but to construct it by assuming a certain standard environmental condition. Furthermore, even if a vehicle model is constructed by taking a variety of disturbance factors into account, various parameters defining a behavior of the vehicle model will develop errors (modeling errors). Therefore, according to the technology shown in FIGS. 6-99(a) on page 225 in non-patent document 1, a variety of disturbance factors acting on an actual vehicle or changes therein cause a significant difference (mismatch) between a behavior of the actual vehicle and a behavior of a vehicle model to take place in some cases. In such a case, a control input (manipulated variable) that does not match a behavior of the actual vehicle will control an operation of an actuator of the vehicle or the operation of the actuator will be restricted by a limiter, making it difficult to ideally control the operation of the actuator.

In a conventional vehicle wherein a driving/braking system, a steering system or a suspension system is actively controlled through the intermediary of actuators, generally, state amounts (a vehicle speed, an engine speed, and the like) of the vehicle and a vehicle traveling environment (a friction coefficient of a road surface and the like) are detected through sensors or estimated by observers or the like, and on the basis of the detection values and estimated values, the manipulated variables of the actuators (control inputs to the actuators) are determined using a map or the like that has been set beforehand on the basis of traveling experiments or the like. With such a technology, however, it frequently happens that a detection error or an estimation error in a state amount or a traveling environment of a vehicle causes a control input (manipulated variable) that does not suit a behavior of the actual vehicle to control an operation of an actuator or to restrict an operation of the actuator by a limiter. This makes it difficult to ideally control the operations of the actuators.

The present invention has been made in view of the background described above, and it is an object thereof to provide a control device for a vehicle that is capable of enhancing robustness against disturbance factors or changes therein while carrying out control of the operations of actuators that suit behaviors of an actual vehicle as much as possible.

DISCLOSURE OF INVENTION

To fulfill such an object, according to a first invention of a control device for a vehicle, there is provided a control device for a vehicle that is equipped with a drive manipulated variable output means for outputting a drive manipulated variable that indicates a drive manipulation state of a vehicle driven by a driver of the vehicle having a plurality of wheels, an actuator device provided in the vehicle so as to be able to perform manipulation of a predetermined motion of the vehicle, and an actuator device control means for controlling an operation of the actuator device, the control device for a vehicle comprising:

an actual state amount grasping means for detecting or estimating an actual state amount, which is a predetermined state amount related to an actual motion of the vehicle;

a vehicle model motion determining means for determining a vehicle model motion, which is a vehicle motion on a first vehicle model expressing dynamic characteristics of the vehicle, on the basis of at least the drive manipulated variable; and a state amount error reaction control means for determining an actual vehicle actuator manipulation control input for manipulating the actuator device of an actual vehicle and a vehicle model manipulation control input for manipulating the vehicle model motion according to a predetermined feedback control law on the basis of a first state amount error, which is the difference between an actual state amount that has been detected or estimated and a model state amount, which is the predetermined state amount related to the vehicle model motion, wherein the actuator device control means comprises a means for controlling the actuator device on the basis of at least the actual vehicle actuator manipulation control input, and the vehicle model motion determining means comprises a means for determining the vehicle model motion on the basis of at least the drive manipulated variable and the vehicle model manipulation control input.

According to the first invention, the actual vehicle actuator manipulation control input and the vehicle model manipulation control input are determined according to the predetermined feedback control law on the basis of the first state amount error. Hence, these control inputs are determined such that the first state amount error is brought close to zero. And, the actuator device control means controls the actuator device on the basis of at least the actual vehicle actuator manipulation control input. Further, the vehicle model motion determining means determines the vehicle model motion on the basis of at least the drive manipulated variable and the vehicle model manipulation control input. Therefore, according to the first invention, a motion of an actual vehicle and a vehicle model motion are both manipulated so as to bring an actual state amount related to a motion of an actual vehicle (hereinafter referred to as the actual vehicle in the present description) and a state amount related to a vehicular motion (vehicle model motion) on the vehicle model close to each other. In other words, a motion of the actual vehicle is controlled such that the motion of the actual vehicle follows a vehicle model motion while making a correction so as to prevent the vehicle model motion from deviating from the motion of the actual vehicle.

This arrangement makes it possible to prevent the first state amount error from becoming excessive even if a disturbance factor not assumed on a vehicle model acts on an actual vehicle or a modeling error of the vehicle model accumulates on a state amount of a vehicle model motion.

As a result, the robustness of vehicle control against disturbance factors or their changes can be enhanced while accomplishing operation control of an actuator device suited to behaviors of an actual vehicle.

In the present description, positions and postures of a vehicle and temporal changes thereof will be generically referred to as motions of the vehicle. A position of the vehicle means a spatial position of a certain representative point (the center of gravity or the like) fixedly set at a certain portion (a vehicle body or the like) of a vehicle. A posture of the vehicle means a spatial orientation of a certain portion (a vehicle body or the like) of the vehicle and it is composed of a posture in a pitch direction (an inclination angle about the axis in the direction of the vehicle width (lateral direction)), a posture in a roll direction (an inclination angle about the axis in the direction of the vehicle length (longitudinal direction)), and a posture in the yaw direction (a rotational angle about a vertical axis). Inclination angles or rotational angles related to postures are generically referred to as posture angles. Further, state amounts related to vehicle motions mean positions or postures of a vehicle or changing velocities or changing accelerations thereof. The state amount includes both a state amount related to a position of a vehicle and a state amount related to a posture thereof or it includes a state amount of either one of them. The state amount does not have to include all spatial components related to a position or a posture; it may include a certain one component or two components.

In the first invention, the vehicle model manipulation control input comprises, for example, a virtual external force to be applied to a vehicle on the first vehicle model or a manipulated variable of an actuator device on the first vehicle model (a second invention and a third invention). In either case, a motion of the vehicle on the vehicle model can be manipulated by the vehicle model control input. If a vehicle model manipulation control input is a virtual external force, then the virtual external force is preferably applied to the vehicle body (a so-called portion above a spring) in the vehicle on the first vehicle model. The virtual external force may include at least either one of a translational force component and a moment component. Further, the translational force component or the moment component does not necessarily have to be a three-dimensional vector quantity; it may be composed of only one or two axial components.

Further, in the first invention, preferably, the actuator device control means is provided with a means for determining an actual vehicle basic control input, which is a basic value of a control input specifying an operation of the actuator device on the basis of at least the drive manipulated variable, the actual vehicle actuator manipulation control input comprises a correction amount for correcting the actual vehicle basic control input, and the actuator device control means controls the actuator device on the basis of a control input obtained by correcting the determined actual vehicle basic control input by the actual vehicle actuator manipulation control input (a fourth invention).

With this arrangement, the actual vehicle basic control input functions as a feed-forward amount (feed-forward control input) to the actuator device, and on the basis of the feed-forward amount, a control input of the actuator device is adjusted by an actual vehicle actuator manipulation control input serving as the correction amount. This makes it possible to enhance the stability of control of the actuator device.

Further, in the first invention, preferably, the actuator device control means is provided with a means for determining a road surface reaction force basic desired parameter that defines a basic desired value of a road surface reaction force (a reaction force that a vehicle receives from a road surface) to be applied to the vehicle on the basis of at least the drive manipulated variable, the actual vehicle actuator control input comprises a correction parameter for correcting the road surface reaction force basic desired parameter, and the actuator device control means controls the actuator device on the basis of a desired value of a road surface reaction force defined by a corrected parameter obtained by correcting the determined road surface reaction force basic desired parameter by the correction parameter (a fifth invention).

According to the fifth invention, the road surface reaction force basic desired parameter functions as a feed-forward amount (feed-forward control input) to the actuator device, and on the basis of the basic desired value of a road surface reaction force defined by the feed-forward amount, a desired value of a road surface reaction force defined by a control input (the corrected parameter) of the actuator device is adjusted by an actual vehicle actuator manipulation control input serving as the correction parameter. This makes it possible to enhance the stability of control of the actuator device, as with the fourth invention described above. And, in this case, a control input of the actuator device will define a desired value of a road surface reaction force, so that a road surface reaction force acting on an actual vehicle can be controlled to a desired road surface reaction force while bringing the first state amount error close to zero.

The fifth invention corresponds to one in which the road surface reaction force basic desired parameter is used as an actual vehicle basic control input in the aforesaid fourth invention and the correction parameter is used as a correction amount in the aforesaid fourth invention. A road surface reaction force in the fifth invention may include at least either one of a translational force component and a moment component. Further, the translational force component or the moment component does not necessarily have to be a three-dimensional vector quantity; it may be composed of only one or two axial components.

Further, in the aforesaid fourth invention, preferably, the vehicle model motion determining means is provided with a means for determining a model basic control input, which is a basic value of a control input that defines an operation of the actuator device on the first vehicle model on the basis of at least the drive manipulated variable, the vehicle model manipulation control input comprises a correction amount for correcting the model basic control input, the vehicle model motion determining means is a means for determining the vehicle model motion by operating the actuator device on the first vehicle model on the basis of a manipulated variable obtained by correcting the determined model basic control input by the vehicle model manipulation control input, and the model basic control input agrees with the actual vehicle basic control input (a sixth invention).

With this arrangement, the actuator device of the actual vehicle and the actuator device on the first vehicle model use the same type of control inputs. Further, an actual vehicle basic control input serving as a feed-forward amount of a control input of the actuator device of the actual vehicle and a model basic control input serving as a feed-forward amount of a control input of the actuator device on the first vehicle model are set to agree with each other, thus allowing the basic control inputs to be determined by a common means. This makes it possible to simplify an algorithm of the control device in accordance with the present invention. Moreover, if the first state amount error approximates zero, then substantially the same control input will be supplied to the actuator device of the actual vehicle and the actuator device on the first vehicle model, so that an appropriate vehicle model motion that matches a motion of the actual vehicle can be determined.

Further, in the aforesaid fifth invention, preferably, the vehicle model manipulation control input is a virtual external force to be applied to a vehicle on the first vehicle model, the vehicle model motion determining means is provided with a means for determining a model road surface reaction force parameter that defines a road surface reaction force to be applied to a vehicle on the first vehicle model on the basis of at least the drive manipulated variable, and a means for determining a motion of the first vehicle model by applying at least a road surface reaction force defined by the determined model road surface reaction force parameter and the virtual external force, which is the vehicle model manipulation control input, to the vehicle on the first vehicle model, and a road surface reaction force defined by the model road surface reaction force parameter agrees with a basic desired value of the road surface reaction force defined by the road surface reaction force basic desired parameter (a seventh invention).

According to the seventh invention, the model road surface reaction force parameter functions as a feed-forward amount (feed-forward control input) to the first vehicle model. And, a road surface reaction force defined by the model road surface reaction force parameter is set to agree with a basic desired value of a road surface reaction force defined by the road surface reaction force basic desired parameter serving as a feed-forward amount to the actuator device of an actual vehicle, thus allowing the model road surface reaction force parameter and the road surface reaction force basic desired parameter to be determined by a common means. This makes it possible to simplify an algorithm of the control device in accordance with the present invention, as with the aforesaid sixth invention. Moreover, if the first state amount error approximates zero, then a road surface reaction force acting on the actual vehicle and a road surface reaction force acting on the vehicle on the first vehicle model substantially agree with each other, so that an appropriate vehicle model motion that matches a motion of the actual vehicle can be determined. When determining a motion of the first vehicle model, an air resistance may be applied to the vehicle on the first vehicle model in addition to a road surface reaction force defined by a model road surface reaction force parameter and a virtual external force.

Further, in the fifth invention or the seventh invention described above, preferably, the state amount error reaction control means is equipped with a means for setting a permissible range of the road surface reaction force and determines an actuator manipulation control input serving as the correction parameter such that a permissible range condition in that a desired value of a road surface reaction force defined by a corrected parameter obtained by correcting a basic desired value of a road surface reaction force defined by the determined road surface reaction force basic desired parameter by the correction parameter falls within the permissible range is satisfied (an eighth invention).

According to the eighth invention, the actuator manipulation control input is determined such that a desired value of a road surface reaction force defined by the corrected parameter falls within the permissible range. Thus, a motion of an actual vehicle can be properly controlled while maintaining a road surface reaction force acting on the actual vehicle at an appropriate road surface reaction force (a road surface reaction force that makes it possible to prevent slippage or the like of wheels of the vehicle).

A permissible range of a road surface reaction force may be a permissible range of a translational force component of a road surface reaction force (i.e., a frictional force component) in a direction parallel to a road surface or in a horizontal direction, or a permissible range of a translational force component of a road surface reaction force in a vertical direction or in a direction perpendicular to a road surface. The permissible range may be a permissible range for each wheel of the vehicle or a permissible range of a resultant force of the road surface reaction forces of the wheels. Alternatively, the wheels of the vehicle may be divided into a few groups and a permissible range of a road surface reaction force may be set for each group.

In the aforesaid eighth invention, preferably, the correction parameter comprises a parameter that defines a correction amount of a road surface reaction force acting on each wheel of a vehicle, the road surface reaction force basic desired parameter comprises a parameter that defines a basic desired value of a road surface reaction force acting on each wheel mentioned above, and the permissible range comprises a permissible range of a road surface reaction force acting on each wheel mentioned above (a ninth invention).

With this arrangement, for each wheel of an actual vehicle, a road surface reaction force acting thereon can be maintained at an appropriate road surface reaction force, thus allowing a motion of the actual vehicle to be controlled more properly.

And, in the ninth invention, preferably, the state amount error reaction control means is equipped with a means for determining an error canceling compensation amount, which is an external force to be applied to a vehicle in order to bring the first state amount error close to zero, on the basis of the first state amount error, and it determines the correction parameter such that a resultant force of the correction amounts of road surface reaction forces acting on the individual wheels defined by the correction parameters approximates the error canceling compensation amount while satisfying the permissible range condition (a tenth invention).

According to the tenth invention, an actuator manipulation control input (the correction parameter) to the actuator device of an actual vehicle can be determined such that the first state amount error approximates zero as much as possible within a range that allows the actual vehicle to satisfy a permissible range condition of a road surface reaction force. This makes it possible to reduce the manipulation of a vehicle model motion that provides a reference of the motion as much as possible, the manipulation being based on the first state amount error. Hence, a motion of the actual vehicle can be properly controlled to a motion close to an ideal motion within a range that allows the actual vehicle to satisfy a permissible range condition of a road surface reaction force.

The error canceling compensation amount in the tenth invention may include at least either a translational force component or a moment component. Further, the translational force component or the moment component does not necessarily have to be a three-dimensional vector quantity; it may be formed only of one or two axial components.

In the tenth invention, preferably, the vehicle model manipulation control input comprises a virtual external force to be applied to the vehicle on the first vehicle model, and the state amount error reaction control means is equipped with a means for determining the virtual external force as the vehicle model manipulation control input on the basis of a difference between the resultant force of the correction amounts of the road surface reaction forces and the error canceling compensation amount (an eleventh invention).

Alternatively, it is preferred that the vehicle model manipulation control input comprises a manipulated variable of an actuator device on the first vehicle model, and the state amount error reaction control means is equipped with a means for determining the manipulated variable as the vehicle model manipulation control input on the basis of a difference between the resultant force of the correction amounts of the road surface reaction forces and the error canceling compensation amount (a twelfth invention).

According to these eleventh invention or twelfth invention, the vehicle model manipulation control input is determined on the basis of a difference between the resultant force of the correction amounts of the road surface reaction forces and the error canceling compensation amount. Hence, in a case where the first state amount error cannot be brought close to zero while satisfying a road surface reaction force permissible range condition simply by controlling the actuator device of an actual vehicle, a vehicle model motion is manipulated so as to bring the first state amount error close to zero. Therefore, even in a situation wherein a road surface reaction force of an actual vehicle is likely to deviate from a permissible range, it is possible to prevent a first state amount error from becoming excessive, so that proper control of a motion of the actual vehicle can be continued.

Incidentally, in the tenth to the twelfth inventions described above, if a predetermined component of the error canceling compensation amount is sufficiently close to zero (within a predetermined range in the vicinity of zero), then the actuator manipulation control input may be set to zero. This makes it possible to prevent the actuator device of an actual vehicle from being frequently controlled on the basis of a first state amount error.

Further, in the aforesaid fourth invention (or an invention including this as a requirement thereof), the control device is equipped with a future drive manipulated variable determining means for determining a future drive manipulated variable, which is a drive manipulated variable for a predetermined period including a period until after a predetermined time from the present time, on the basis of at least the drive manipulated variable before the present time, and a future vehicle behavior predicting means for predicting a future behavior of the first vehicle model on the basis of at least the future drive manipulated variable, using a latest value of a state amount of the first vehicle model as a starting point, wherein the actuator device control means determines the actual vehicle basic control input on the basis of a future behavior of the first vehicle model (a thirteenth invention).

According to the thirteenth invention, at an instant (the present time) when a new control input of an actuator device is to be determined, the future drive manipulated variable (this means a predicted value of a future drive manipulated variable) is determined. And, using a latest value (a latest state amount at the present time) of the state amount of the first vehicle model as the starting point, a future behavior of the first vehicle model is predicted on the basis of at least the future drive manipulated variable. In this case, according to the present invention, a state amount of the first vehicle model and a state amount of an actual vehicle are controlled such that they approach each other, so that a future behavior of the first vehicle model will be the one that predicts a future behavior of the actual vehicle. Hence, by determining the actual vehicle basic control input (a feed-forward amount of a control input of the actuator device of the actual vehicle) on the basis of a future behavior of the first vehicle model, the actual vehicle basic control input can be determined, predicting a future behavior of the actual vehicle. As a result, a motion of the actual vehicle can be controlled while preventing the actual vehicle actuator manipulation control input from instantaneously becoming excessive due to a change or the like in a future behavior of the actual vehicle as much as possible.

Further, in the aforesaid first invention (or the first to the twelfth inventions), preferably, the control device for a vehicle is equipped with:

a future drive manipulated variable determining means for determining a future drive manipulated variable, which is a drive manipulated variable for a predetermined period including a period until after a predetermined time from the present time, on the basis of at least the drive manipulated variable before the present time, and a future vehicle behavior predicting means for predicting future behaviors of a second vehicle model and a third vehicle model while determining a model control input, which is a control input defining an operation of an actuator device on the third vehicle model on the basis of at least a difference between a state amount of the second vehicle model and a state amount of the third vehicle model and the future drive manipulated variable at each time until after the predetermined time from the present time, taking a latest value of a state amount of the first vehicle model as the starting point of the state amount of the second vehicle model that represents the dynamic characteristics of the vehicle and by taking a latest value of an actual state amount of the vehicle as the starting point of the state amount of the third vehicle model that represents the dynamic characteristics of the vehicle, wherein the actuator device control means determines the actual vehicle actuator manipulation control input on the basis of at least a future behavior of the third vehicle model (a fourteenth invention).

According to the fourteenth invention, at an instant (the present time) when a new control input of an actuator device is to be determined, the future drive manipulated variable (a predicted value of a future drive manipulated variable) is determined. And, a future behavior of the second vehicle model and the third vehicle model are predicted. In this case, the future behavior of the second vehicle model is a future behavior whose starting point is a latest state amount of the first vehicle model, and the future behavior of the third vehicle model is a future behavior whose starting point is a latest state amount of the actual automobile (a latest actual state amount). And, the future behaviors of the second vehicle model and the third vehicle model are determined on the basis of at least a difference between a state amount of the second vehicle model and a state amount of the third vehicle model and the aforesaid future drive manipulated variable, including a model control input of the actuator device on the third vehicle model. More specifically, assuming that a future actual drive manipulated variable is the aforesaid determined future drive manipulated variable, the future behaviors of the second vehicle model and the third vehicle model are determined, including a model control input of the actuator device on the third vehicle model, such that the difference between a state amount of the second vehicle model and a state amount of the third vehicle model (this corresponding to a future estimated value of the first state amount error) approximates zero. Hence, a future behavior of the second vehicle model predicts a future behavior of the first vehicle model, and a future behavior of the third vehicle model predicts a future behavior of the actual vehicle. Thus, determining the actual vehicle actuator manipulation control input on the basis of a future behavior of the third vehicle model makes it possible to determine an actual vehicle actuator manipulation control input, predicting the future behaviors of the actual vehicle and the first vehicle model. As a result, a motion of the actual vehicle can be properly controlled while preventing the actual vehicle actuator manipulation control input from instantaneously becoming excessive due to a change or the like in a future behavior of the actual vehicle as much as possible.

Supplementally, in the fourteenth invention, a future behavior of the second vehicle model is a future behavior whose starting point is a latest state amount of the first vehicle model, and a future behavior of the third vehicle model is a future behavior whose starting point is a latest state amount of the actual vehicle (a latest actual state amount), so that a difference between a state amount of the second vehicle model and a state amount of the third vehicle model at the starting points thereof corresponds to a first state amount error in the aforesaid first invention.

Further, in the aforesaid fourth invention (or an invention including this as a requirement thereof), preferably, the control device for a vehicle is equipped with:

a future drive manipulated variable determining means for determining a future drive manipulated variable, which is a drive manipulated variable for a predetermined period including a period until after a predetermined time from the present time, on the basis of at least the drive manipulated variable before the present time;

a reference motion state amount determining means for sequentially determining a state amount of a reference motion that the first vehicle model should follow by a reference dynamic characteristics model representing dynamic characteristics of the vehicle on the basis of at least the drive manipulated variable; and a future vehicle behavior predicting means for predicting future behaviors of a second vehicle model and a third vehicle model while determining a model control input, which is a control input defining an operation of an actuator device on the third vehicle model on the basis of at least a difference between a state amount of the second vehicle model and a state amount of the third vehicle model and the future drive manipulated variable at each time until after the predetermined time from the present time, a latest value of a state amount of the reference motion being the starting point of a state amount of the second vehicle model that represents the dynamic characteristics of the vehicle and a latest value of a state amount of the first vehicle model being the starting point of a state amount of the third vehicle model that represents the dynamic characteristics of the vehicle, wherein the actuator device control means determines the actual vehicle basic control input on the basis of at least a future behavior of the third vehicle model (a fifteenth invention).

According to the fifteenth invention, a state amount of a reference motion that the first vehicle model should follow is sequentially determined. Further, at an instant (the present time) when a new control input of an actuator device is to be determined, the future drive manipulated variable (a predicted value of a future drive manipulated variable) is determined. And, a future behavior of the second vehicle model and the third vehicle model are predicted. In this case, the future behavior of the second vehicle model is a future behavior whose starting point is a latest state amount of the reference motion, and the future behavior of the third vehicle model is a future behavior whose starting point is a latest state amount of the first vehicle model. And, the future behaviors of the second vehicle model and the third vehicle model are determined on the basis of at least a difference between a state amount of the second vehicle model and a state amount of the third vehicle model and the aforesaid future drive manipulated variable, including a model control input of the actuator device on the third vehicle model. More specifically, assuming that a future actual drive manipulated variable is the aforesaid determined future drive manipulated variable, the future behaviors of the second vehicle model and the third vehicle model are determined, including a model control input of the actuator device on the third vehicle model, such that the difference between a state amount of the second vehicle model and a state amount of the third vehicle model (this corresponding to an estimated value of a difference between a state amount of a future reference motion and a state amount of a future first vehicle model) approximates zero. Hence, a future behavior of the third vehicle model is determined such that a predicted state amount of a future first vehicle model is brought close to a predicted state amount of a future reference motion. Thus, determining the actual vehicle actuator manipulation control input on the basis of a future behavior of the third vehicle model makes it possible to control a motion of the actual vehicle such that a state amount of the actual vehicle is brought close to a state amount of the first vehicle model while bringing the state amount of the first vehicle model close to a state amount of a reference motion (while preventing a state amount of the first vehicle model from moving apart from a state amount of a reference motion), predicting a future behavior of the first vehicle model. As a result, a motion of the actual vehicle can be properly controlled while preventing the actual vehicle actuator manipulation control input from instantaneously becoming excessive due to a change or the like in a future behavior of the actual vehicle as much as possible.

In the fifteenth invention, the reference motion state amount determining means preferably determines a new state amount of the reference motion on the basis of at least a difference between the state amount of the first vehicle model and the state amount of the reference motion and the drive manipulated variable (a sixteenth invention). This arrangement makes it possible to prevent a state amount of a reference motion from significantly deviating from a state amount of the first vehicle model subjected to an influence of a motion of the actual vehicle.

Further, in the aforesaid fifth invention (or an invention including this as a requirement thereof), the control device for a vehicle is equipped with:

a reference motion determining means for determining a reference motion, which is a reference motion for the vehicle model motion, on the basis of at least the drive manipulated variable; and a means for determining a model restoring compensation amount, which is an external force to be applied to a vehicle to bring the second state amount error, which is a difference between a predetermined second state amount related to the determined reference motion and a predetermined second state amount related to the determined first vehicle model motion, close to zero, on the basis of the second state amount error, wherein the means for determining a road surface reaction force basic desired parameter determines the road surface reaction force basic desired parameter on the basis of at least the model restoring compensation amount (a seventeenth invention).

This seventeenth invention makes it possible to determine a road surface reaction force basic desired parameter for the actuator device of an actual vehicle such that the first state amount error and the second state amount error are brought close to zero. Thus, the second state amount of the vehicle model motion can be brought close to a second state amount of a reference motion, while reducing a manipulation based on the first state amount error of a vehicle model motion that provides a reference of a motion of the actual vehicle. Hence, a motion of the actual vehicle can be properly controlled to a motion that is close to an ideal motion.

Further, in the sixth invention (or an invention including this as a requirement thereof), preferably, the control device for a vehicle is equipped with a reference motion determining means for determining a reference motion, which is a reference motion for the vehicle model motion, on the basis of at least the motion manipulated variable, wherein the means for determining the model basic control input determines the model basic control input on the basis of at least a second state amount error, which is a difference between a predetermined second state amount related to the determined reference motion and a predetermined second state amount related to the determined first vehicle model motion, such that the difference is brought close to zero (an eighteenth invention).

This eighteenth invention makes it possible to determine a model basic control input for the actuator device on the vehicle model such that the first state amount error and the second state amount error are brought close to zero. Therefore, as with the aforesaid seventeenth invention, the second state amount of the vehicle model motion can be brought close to a second state amount of a reference motion, while reducing a manipulation based on the first state amount error of a vehicle model motion that provides a reference of a motion of the actual vehicle. Hence, a motion of an actual vehicle can be properly controlled to a motion that is close to an ideal motion.

Incidentally, in the seventeenth invention and the eighteenth invention described above, the second state amount may be a different state amount from the state amount in the aforesaid first invention or it may be the same therewith.

Further, in the seventeenth invention and the eighteenth invention, as with the eleventh invention or the twelfth invention described above, the state amount error reaction control means may determine the vehicle model manipulation control input (the virtual external force or the manipulated variable of the actuator device on the first vehicle model) on the basis of a difference between the resultant force of the correction amounts of the road surface reaction forces and the error canceling compensation amount.

BEST MODE FOR CARRYING OUT THE INVENTION

The following will explain embodiments of the control device for a vehicle in accordance with the present invention.

First, a schematic explanation of a vehicle in the embodiments in the present description will be given. A vehicle illustrated in the embodiments in the present description is a car provided with four wheels (two wheels each at the front and the rear of the vehicle). The construction itself of the car may be a publicly known one, so that detailed illustration and explanation will be omitted in the present description, the overview thereof being as follows. FIG. 1 is a block diagram showing the schematic construction of the vehicle.

As shown in FIG. 1, a vehicle 1 (car) is provided with a driving/braking device 3A (a driving/braking system) that imparts a rotative driving force (a rotative force that provides an impelling force for a vehicle) to driving wheels among four wheels W1, W2, W3, and W4, or imparting a braking force to each of the wheels W1 to W4, a steering device 3B (a steering system) for controlling steering control wheels (usually the front wheels W1 and W2) among the four wheels W1 to S4, and a suspension device 3C (a suspension system) that resiliently supports a vehicle body 1B on the four wheels W1 to W4, as with a publicly known regular car.

These devices 3A, 3B and 3C have functions for manipulating motions of the vehicle 1. For example, the driving/braking device 3A has a function for manipulating primarily a position, a velocity, and acceleration in an advancing direction of the vehicle 1. The steering device 3B has a function for manipulating primarily a posture of the vehicle 1 in the yaw direction. The suspension device 3C has a function for manipulating postures in the pitch direction and the roll direction of the vehicle body 1B of the vehicle 1 or a height of the vehicle body 1B from a road surface (a vertical position of the vehicle body 1B relative to the wheels W1 to W4). Incidentally, "posture" means a spatial orientation.

Although not detailedly illustrated, the driving/braking device 3A is equipped with an engine (an internal-combustion engine) serving as a motive power generating source (an impellent generating source of the vehicle 1), a motive power transmitting system for transmitting an output (a rotative driving force) of the engine to the driving wheels among the wheels W1 to W4, and a braking device that imparts braking forces to the wheels W1 to W4. The motive power transmitting system includes a transmission, a differential gear, etc. The driving wheels may be the two front wheels W1 and W2 or the two rear wheels W3 and W4, or both the front wheels W1 and W2 and the rear wheels W3 and W4 (the four wheels W1 through W4).

The vehicle 1 explained in the embodiments is equipped with an engine as a motive power generating source; however, it may alternatively be a vehicle equipped with an engine and an electric motor as motive power generating sources (a so-called parallel type hybrid vehicle) or a vehicle equipped with an electric motor as a motive power generating source (a so-called electric car or series type hybrid vehicle).

Further, a steering wheel (driver's wheel), an accelerator (gas) pedal, a brake pedal, a shift lever, and the like functioning as manipulating devices 5 (artificial manipulating devices) operated by a driver to steer the vehicle 1 (car) are provided in a vehicle compartment of the vehicle 1.

The steering wheel among the manipulating devices 5 is related to an operation of the steering device 3B. As the steering wheel is rotatively manipulated, the steering control wheels (normally the two front wheels W1 and W2) among the wheels W1 to W4 are steer controlled accordingly by the steering device 3B.

The accelerator (gas) pedal, the brake pedal, and the shift lever among the manipulating devices 5 are related to operations of the driving/braking device 3A. More specifically, the opening of a throttle valve provided in an engine changes according to a manipulated variable (a depression amount) of the accelerator (gas) pedal and an intake air volume and a fuel injection amount (eventually an output of the engine) are adjusted. Further, the braking device is actuated according to a manipulated variable (a depression amount) of a brake pedal, and a braking force based on the manipulated variable of the brake pedal is imparted to the wheels W1 to W4. Further, manipulating the shift lever changes an operation state of the transmission, such as a change gear ratio of the transmission, thus adjusting torque transmitted from the engine to the driving wheels.

The drive manipulation states of the manipulating devices 5, such as the steering wheel, operated by the driver (the steerer of the vehicle 1) are detected by appropriate sensors, which are not shown. Hereinafter, detection values (detection outputs of the sensors) of the drive manipulation states will be referred to as drive manipulation inputs. The drive manipulation inputs specifically include a steering angle, which is a rotative angle of the steering wheel, an accelerator (gas) pedal manipulated variable, which is a manipulated variable of the accelerator (gas) pedal, a brake pedal manipulated variable, which is a manipulated variable of the brake pedal, and a shift lever position, which is a manipulation position of the shift lever. The drive manipulation inputs correspond to drive manipulated variables in the present invention, and sensors that output the drive manipulation inputs correspond to the drive manipulated variable output means.

In the embodiments in the present description, the driving/braking device 3A, the steering device 3B, and the suspension device 3C described above are adapted to permit active control of operations thereof (eventually motions of the vehicle 1) in response to state amounts (a vehicle speed, a yaw rate, etc.) of the vehicle 1 other than the aforesaid drive manipulation inputs.

More specifically, the driving/braking device 3A makes it possible to control, for example, the distribution of a rotative driving force transmitted from the engine to the driving wheels when the vehicle 1 travels or the distribution of a braking force to be imparted to the wheels W1 to W4 when the vehicle 1 decelerates to desired motive power distributions through the intermediary of actuators, such as a hydraulic actuator, an electric motor, and an electromagnetic control valve. Hereinafter, the driving/braking device 3A having such a function for controlling the distribution of motive powers will be referred to as the driving/braking device 3A with motive power distribution controlling function. The driving/braking device 3A with motive power distribution controlling function includes an actuator for driving a throttle valve of the engine, an actuator for driving a fuel injection valve, an actuator for performing speed change drive of the transmission, and an actuator of the braking device in addition to the actuators for controlling motive power distribution.

Further, the steering device 3B is equipped with a steering control mechanism for the rear wheels W3 and W4 in addition to the front wheels W1 and W2, and it is adapted to steer control the front wheels W1 and W2 and also steer control the rear wheels W3 and W4 (so-called 4WS) as necessary through the intermediary of actuators, including a hydraulic pump, an electric motor, and an electromagnetic control valve, as appropriate, in response to rotative manipulation of the steering wheel. In this case, the steering device 3B makes it possible to control the steering control angles of the front wheels W1 and W2 to desired steering control angles by actuators, including electric motors, as with the rear wheels W3 and W4.

However, the steering device 3B may be the one adapted to mechanically steer control the front wheels W1 and W2 through the intermediary of a steering control mechanism, such as a rack and pinion, in response to a rotative manipulation of the steering wheel (the one not provided with an actuator for steer controlling the front wheels), or the one adapted to assist the steer controlling of the front wheels W1 and W2 by an actuator, such as an electric motor, as necessary, in addition to the mechanical steering control. Alternatively, the steering device 3B may be the one that is not equipped with a function for steer controlling the rear wheels W3 and W4 but be capable of controlling only the steering control angles of the front wheels W1 and W2 to desired steering control angles by an actuator, such as an electric motor. Hereinafter, the steering device 3B capable of controlling the steering control angles of the front wheels W1 and W2, or the steering control angles of the rear wheels W3 and W4, or the steering control angles of both the front wheels W1, W2 and the rear wheels W3, W4 by actuators will be referred to as the active steering device 3B.

In the active steering device adapted to subsidiarily steer control steering control wheels by actuators in addition to mechanically steer controlling the steering control wheels, such as the front wheels W1 and W2, in response to rotative manipulation of the steering wheel, a composite angle of a steering control angle of a steering control wheel mechanically determined in response to a rotative manipulation of the steering wheel and a steering control angle based on an operation of an actuator (a correction amount of a steering control angle) will be a steering control angle of a steering control wheel. In an active steering device adapted to steer control a steering control wheel simply by a driving force of an actuator, a desired value of a steering control angle of the steering control wheel is determined on the basis of at least a detection value of a steering control angle, and the actuator is controlled such that an actual steering angle of the steering control wheel reaches the desired value.

Further, the suspension device 3C makes it possible to variably control, for example, a damping force, hardness or the like of a damper provided between the vehicle body 1B and the wheels W1 through W4 through the intermediary of an actuator, such as an electromagnetic control valve or an electric motor. Alternatively, the suspension device 3C is adapted to be capable of directly controlling a stroke (an amount of vertical displacement between the vehicle body 1B and the wheels W1 to W4) of a suspension (a mechanical portion, such as a spring, of the suspension device 3C) or a vertical expanding/contracting force of the suspension generated between the vehicle body 1B and the wheels W1 to W4 by a hydraulic cylinder or a pneumatic cylinder (a so-called electronically controlled suspension). Hereinafter, the suspension device 3C having these controlling functions will be referred to as the active suspension device 3C. In the active suspension device 3C, the damping force or the like of the damper is controlled through the intermediary of an actuator so as to manipulate an acting force between the wheels W1 to W4 and the vehicle body 1B, thereby manipulating ground contact loads of the wheels W1 to W4 (a vertical component of a translational force of a road surface reaction force acting on the wheels W1 to W4 or a component thereof perpendicular to a road surface). Alternatively, a stroke of the suspension (that is, the vertical position of the vehicle body 1B relative to the wheels W1 to W4) is manipulated through the intermediary of an actuator.

Hereinafter, the driving/braking device 3A with motive power distribution controlling function, the active steering device 3B, and the active suspension device 3C will be frequently referred to generically as actuator devices 3 to mean devices that are capable of actively controlling their operations through the intermediary of an appropriate actuator. The vehicle 1 in the embodiments in the present description is provided with the driving/braking device 3A with motive power distribution controlling function, the active steering device 3B, and the active suspension device 3C as the actuator devices 3.

Incidentally, it is not required that all these actuators 3 be provided; alternatively, only one or two of the actuator devices 3 may be provided. Further alternatively, an actuator device other than the above may be provided. The actuator devices 3 are required simply to be capable of actively controlling their operations in response to a drive manipulation input or a state amount (a vehicle speed, a yaw rate, etc.) or the like of the vehicle 1, and capable of actively manipulating a certain motion of the vehicle 1 by the control.

Furthermore, the vehicle 1 is provided with a controller 10 that determines a manipulated variable of an actuator (a control input to the actuator; hereinafter referred to as an actuator manipulated variable) provided in each of the actuator device 3 on the basis of the aforesaid drive manipulation inputs or the like and controls the operation of each actuator device 3 on the basis of the actuator manipulated variable. This controller 10 is constituted of an electronic circuit unit that includes a microcomputer, and implements each means in the present invention by the arithmetic processing function thereof. Incidentally, the controller 10 receives the aforesaid drive manipulation inputs from sensors of the manipulating devices 5 and also detection values of state amounts of the vehicle 1, such as a vehicle speed or a yaw rate, from various sensors, which are not shown.

The above is the overview of the vehicle 1 (the car) in the embodiments in the present description. Based on the overview of the vehicle 1 explained above, the controller 10 of the vehicle 1 in the embodiments will be explained in detail below. The construction of the vehicle 1 will be the same in any embodiments except for a second embodiment to be discussed later.

First Embodiment

First, a vehicle model used in arithmetic processing (control processing) of the controller 10 in a first embodiment of the present invention will be explained with reference to FIG. 2 and FIG. 3. FIG. 2 is a block diagram showing a functional construction of a vehicle model 72 of the present embodiment, and FIG. 3 is a flowchart showing the processing of the vehicle model 72.

In the following explanation, subscripts i (i=1, 2, 3, 4) that are the same numbers of wheels W1 to W4 will be attached to variables corresponding to the wheels W1 to W4. The wheels W1 to W4 denote the front left wheel, the front right wheel, the rear left wheel, and the rear right wheel, respectively, of the vehicle 1, as shown in FIG. 1 mentioned above. In the following explanation, the tire provided on the outer periphery (a portion to be in direct contact with a road surface and subjected to a frictional force) of each wheel Wi will be regarded as identical to the wheel, and the wheel Wi will be frequently referred to as the tire Wi. The longitudinal direction or an advancing direction of the vehicle body 1B will be denoted by X axis, the vertical direction thereof will be denoted by Z axis, and the axis orthogonal to the X axis and the Z axis will be denoted by Y axis, and subscripts x, y, and z, respectively, will be attached to the coordinate axis components of vector quantities. In the present embodiment, the arithmetic processing (control processing) of the controller 10, including the arithmetic processing of the vehicle model 72, is sequentially carried out at a predetermined arithmetic processing cycle (control cycle). In the explanation of the embodiments in the present description, a value of a variable newly calculated at each arithmetic processing cycle of the controller 10 will be accompanied by "current time" and a value of a variable calculated at immediately preceding (last time) arithmetic processing cycle will be accompanied by "last time."

Referring to FIG. 2, the vehicle model 72 is a model showing the dynamic characteristics of the vehicle 1, including the aforesaid actuator devices 3 (the driving/braking device 3A with motive power distribution controlling function, the active steering device 3B, and the active suspension device 3C). More specifically, the vehicle model 72 is a model that includes a tire friction model 50 showing a relationship between slippage of the wheels W1 to W4 and road surface reaction forces acting on the wheels W1 to W4, a kinematic model showing a relationship between motions of the vehicle 1 and the slippage of the wheels W1 to W4, a dynamic model showing a relationship between motions of the vehicle 1 and road surface reaction forces (more generally, external forces (including road surface reaction forces) acting on the vehicle 1), and a model showing the dynamic characteristics of the actuator devices 3 (drive manipulation inputs and actuator manipulated variables, or the operation characteristics of the actuator devices 3 in response to external forces).

More specifically, the vehicle model 72 is provided with the tire friction model 50, a driving/braking system model 52, a suspension dynamic characteristics model 54, a vehicle body motion model 56, a tire rotative motion model 58, a steering control system model 60, a side slip angle calculator 62, a slippage ratio calculator 64, and a tire advancing speed vector calculator 66. The vehicle body motion model 56 is formed of the dynamic model and the kinematic model.

The tire friction model 50 calculates and outputs a driving/braking force Fmdl_x_i, a lateral force Fmdl_y_i, and a self-aligning torque Mmdl_z_i that are produced in each tire Wi in response to a relative motion between each tire Wi (i=1, 2, 3, 4) and a road surface on the vehicle model 72. These Fmdl_x_i, Fmdl_y_i, and Mmdl_z_i are calculated by publicly known arithmetic processing mentioned in, for example, the aforesaid non-patent document 1.

To be more specific, the driving/braking force Fmdl_x_i, of each tire Wi is determined by the following expressions 01 and 02 on the basis of a slippage ratio Smdl_i of each tire Wi, as shown in, for example, expressions (26) and (27) on page 183 of the non-patent document 1. Incidentally, expressions 01 and 02 take the same forms of expressions for all tires W1 to W4, so that the subscript i (i=1, 2, 3 or 4) will be omitted.

$$\text{If } Smdl \le 3 \cdot \mu s \cdot Fmdl\_z/Kx, \qquad \text{Expression 01}$$
$$\text{then } Fmdl\_x = Kx \cdot (Lh/L)^2 \cdot Smdl +$$
$$\mu d \cdot (1 + 2 \cdot Lh/L) \cdot (1 - Lh/L)^2 \cdot Fmdl\_z +$$
$$6 \cdot Fmdl\_z \cdot (\mu s - \mu d) \cdot [\{L \cdot \varepsilon \cdot Smdl\}^{-2} +$$
$$2 \cdot (L \cdot \varepsilon \cdot Smdl)^{-3}\} \exp\{-\varepsilon \cdot (L - Lh) \cdot Smdl\} +$$
$$(L \cdot \varepsilon \cdot Smdl)^{-1} \cdot (1 - Lh/L) \cdot (Lh/L) -$$
$$(L \cdot \varepsilon \cdot Smdl)^{-2} \cdot (1 - 2 \cdot Lh/L) - 2 \cdot (L \cdot \varepsilon \cdot Smdl)^{-3}]$$

-continued

If $1 \geq |Smdl| \geq 3 \cdot \mu s \cdot \text{Fmdl\_z}/Kx$, Expression 02
then $\text{Fmdl\_x} = \mu d \cdot \text{Fmdl\_z} + 6 \cdot \text{Fmdl\_z} \cdot$
$(\mu s - \mu d) \cdot [\{(L \cdot \varepsilon \cdot Smdl)^{-2} + 2 \cdot (L \cdot \varepsilon \cdot Smdl)^{-3}\}$
$\exp(-L \cdot \varepsilon \cdot Smdl) +$
$(L \cdot \varepsilon \cdot Smdl)^{-2} - 2 \cdot (L \cdot \varepsilon \cdot Smdl)^{-3}]$ In these expressions 01 and 02, Kx denotes a proportionality constant called driving stiffness (when tires are driven) or braking stiffness (when tires are braked), L denotes the ground contact length of each tire, µs denotes a maximum friction coefficient, µd denotes a slippage friction coefficient, Lh denotes a ground contact length of each tire at the beginning of slippage, ε denotes a value indicating a changing degree of a friction coefficient when the friction coefficient changes from µs to µd, exp( ) denotes an exponential function of a base e of a natural logarithm, Fmdl_z denotes a ground contact load (a road surface reaction force in the vertical direction) of each tire, and Smdl denotes a slippage ratio of each tire. Smdl is determined by the slippage ratio calculator 64, which will be discussed later, and the ground contact load Fmdl_z is determined by the suspension dynamic characteristics model 54, which will be discussed later. As and µd are determined on the basis of an estimated road surface friction coefficient µestm (an estimated value of a friction coefficient of a road surface in contact with a tire) or the like determined by a µ estimator 80, which will be discussed later. Kx, L, Lh, and ε are set to, for example, predetermined values decided in advance. Alternatively, ε and the like may be estimated by a publicly known method, as with a friction coefficient. Incidentally, as shown in FIG. 6-17 on page 183 of the aforesaid non-patent document 1, the relationship between the slippage ratios Smdl of the individual tires and ground contact loads Fmdl_z may be set in terms of a map or a data table, and Fmdl_z may be determined by using it.

The self-aligning torque Mmdl_z_i of each tire Wi is determined according to expressions 03 and 04 given below on the basis of a side slip angle (slippage angle) αmdl_i, as shown in, for example, expressions (4) and (5) on page 180 of the aforesaid non-patent document 1. Incidentally, expressions 03 and 04 take the same forms of expressions for all tires W1 through W4, so that the subscript i (i=1, 2, 3 or 4) will be omitted.

$M\_z^* = \text{Mmdl\_z}/(L \cdot \mu \cdot \text{Fmdl\_z})$  Expression 03
$= (1/6) \cdot \phi - (1/6)\phi^2 + (1/18) \cdot \phi^3 - (1/162) \cdot \phi^4$ $\phi = (Ky/(\mu \cdot \text{Fmdl\_z})) \cdot \tan \alpha mdl$  Expression 04

Incidentally, in expression 03, a result obtained by dividing Mmdl_z by (L·µ·Fmdl_z) is defined as M_z*.

In these expressions 03 and 04, Ky denotes a proportionality constant called cornering stiffness, L denotes a ground contact length of each tire, and µ denotes a friction coefficient. The side slip angle αmdl of each tire is determined by the side slip angle calculator 62, which will be discussed later, and the ground contact load Fmdl_z of each tire is determined by the suspension dynamic characteristics model 54, which will be discussed later. Further, µ is determined on the basis of an estimated road surface friction coefficient µestm determined by the µ estimator 80, which will be discussed later. Ky and L are set to, for example, predetermined values decided in advance or estimated by a publicly known method.

Incidentally, as shown in FIG. 6-10 on page 180 of the aforesaid non-patent document 1, the relationship between φ and M_z* may be set in terms of a map or a data table, and Mmdl_z_i may be determined by using it.

The lateral force Fmdl_y_i of each tire Wi is determined according to expressions 05 given below on the basis of a side slip angle αmdl_i, as shown in expression (3) on page 180 of the aforesaid non-patent document 1. Incidentally, expression 05 takes the same form of expression for all tires W1 through W4, so that the subscript i (i=1, 2, 3 or 4) will be omitted.

$F\_y^* = \text{Fmdl\_y}/(\mu \cdot \text{Fmdl\_z})$  Expression 05
$= \phi - (1/3)\phi^2 + (1/27) \cdot \phi^3$ Incidentally, in expression 05, a result obtained by dividing Fmdl_y by (µ·Fmdl_z) is defined as F_z*.

φ in this expression 05 is a value defined according to the aforesaid expression 04 on the basis of the side slip angle αmdl. The side slip angle αmdl of each tire is determined by the side slip angle calculator 62, which will be discussed later, and the ground contact load Fmdl_z of each tire is determined by the suspension dynamic characteristics model 54, which will be discussed later. Further, µ is decided on the basis of the estimated road surface friction coefficient µestm determined by the µ estimator 80, which will be discussed later.

Incidentally, as shown in FIG. 6-10 on page 180 of the aforesaid non-patent document 1, the relationship between φ and F_y* may be set beforehand in terms of a map or a data table, and Fmdl_y_i may be determined by using it. Further, the lateral force Fmdl_y_i of each tire Wi may be corrected according to the slippage ratio Smdl_i. More specifically, a relationship between lateral forces and slippage ratios, as shown in FIG. 6-20 on page 184 of the aforesaid non-patent document 1, may be set in terms of a map or a data table beforehand, and the lateral force Fmdl_y_i determined according to expression 05 may be corrected by using it. Alternatively, the lateral force Fmdl_y_i may be directly determined by using a map from the side slip angle αmdl_i and the slippage ratio Smdl_i. Furthermore, if an inertia (an inertial moment) of the tires can be ignored, then the relationship shown in FIG. 6-21 on page 184 of the aforesaid non-patent document 1 may be used to correct the lateral force Fmdl_y_i on the basis of the driving/braking force Fmdl_x_i acting on each tire Wi instead of correcting the lateral force Fmdl_y_i on the basis of the slippage ratio Smdl_i.

Further, compliance characteristics related to a geometry of the suspension may be equivalently included in a tire friction model.

As described above, in order to calculate the driving/braking force Fmdl_x_i the lateral force Fmdl_y_i, and the self-aligning torque Mmdl_z_i in the vehicle model 72 shown in FIG. 2, the slippage ratio Smdl_i the side slip angle αmdl_i, the ground contact load Fmdl_z_i, and the estimated road surface friction coefficient µestm of each tire Wi are input to the tire friction model 50. Then, the tire friction model 50 determines and outputs Fmdl_x_i, Fmdl_y_i and Mmdl_z_i from the inputs according to the aforesaid expressions (01) to (05).

Supplementally, to be more precise, the driving/braking force Fmdl_x_i determined according to the aforesaid expressions 01 or 02 is a force in the direction of a line of intersection between a central plane of a wheel Wi (a plane orthogonal to the axis of rotation of a wheel Wi) and a road surface, and the lateral force Fmdl_y_i determined according to expression 05 is a force in the direction of a line of intersection between a plane that includes the axis of rotation of the wheel Wi and that is perpendicular to a road surface and the road surface. Hence, if the directions of the lines of intersection do not agree in the directions of the X axis (the longitudinal direction of the vehicle body 1B) and the Y axis (the direction of the vehicle width of the vehicle body 1B) (when the vehicle is turning or the like), then Fmdl_x_i and Fmdl_y_i are determined by carrying out coordinate conversion on the basis of the aforesaid side slip angle αmdl_i or the like. Incidentally, in a case where the directions of the lines of intersection do not agree on the X axis and the Y axis, a force Fmdl_x_i in the X-axis direction is referred to as a cornering drag and a force Fmdl_y_i in the Y-axis direction is referred to as a cornering force.

As described above, the driving/braking system model 52 is a model showing the dynamic characteristics of the driving/braking device 3A constituted of the engine, the motive power transmitting system, and the braking device, and it calculates a driving/braking torque Tqmdl_i to be imparted to each tire Wi on the basis of at least the manipulated variables of the driving/braking system actuators (mainly the manipulated variables of actuators for driving a fuel injection valve of the engine and shifting the gear of the transmission), which are the manipulated variables of the actuators provided in the driving/braking device 3A. The driving/braking system actuator manipulated variables are input from an actuator drive controller model 76, which will be discussed later (hereinafter, the driving/braking system actuator manipulated variables will be referred to as the driving/braking system model actuator manipulated variables in some cases). In this case, the driving/braking torque Tqmdl_i (to be precise, a set of a driving torque and a braking torque) to be imparted to each tire Wi from the driving/braking device 3A varies with a rotational speed ωwmdl_i of each tire Wi, so that the rotational speed ωwmdl_i of the tire Wi is also input to the driving/braking system model 52. Further, in the present embodiment, inputs to the actuator drive controller model 76 include the commands on distribution of driving/braking torques or the desired values of the driving/braking forces Fmdl_x_i acting on the tires Wi. The driving/braking torques Tqmdl_i to be imparted to the tires Wi are calculated so as to follow the distribution commands or the desired values.

The suspension dynamic characteristics model 54 is a model showing the dynamic characteristics of the active suspension device 3C, which is the suspension device in the present embodiment. The suspension dynamic characteristics model 54 receives state amounts of vehicle body motions (the posture angles and angular velocities of the vehicle body 1B and the positions and speeds of the vehicle body 1B) on the vehicle model 72 from the vehicle body motion model 56, which will be described in detail later, and the suspension actuator manipulated variables, which are the manipulated variables of the actuators provided in the active suspension device 3C, (hereinafter, referred to as the suspension system model actuator manipulated variables in some cases) from the actuator drive controller model, which will be discussed later. Incidentally, the state amounts of the vehicle body motions input to the suspension dynamic characteristics model 54 are the last time state amounts of the controller 10 (the last time values of the state amounts of vehicle body motions).

Then, the suspension dynamic characteristics model 54 calculates the ground contact loads Fmdl_Z_i acting on the tires Wi on the basis of the suspension actuator manipulated variables and the state amounts (last time values) of the vehicle body motions that have been input and an assumed or estimated road surface configuration (supposed to be flat to make the explanation easy in this case).

If the suspension device 3C is a passive suspension device not provided with an active actuator, then the suspension dynamic characteristics model 54 may be the one that expresses the spring-mass-damper characteristics of the suspension device 3C or the tires Wi. In this case, the suspension dynamic characteristics model 54 may calculate the ground contact loads Fmdl_z_i acting on the tires Wi on the basis of the last time state amounts of the vehicle body motions (the posture angles and angular velocities of the vehicle body 1B and the position and speed of the vehicle body 1B) and the assumed road surface configuration.

The vehicle body motion model 56 includes a dynamic model showing a relationship between forces acting on the vehicle 1 and motions of the vehicle body 1B. The vehicle body motion model 56 receives the road surface reaction forces (the lateral force Fmdl_y_i, the driving/braking force Fmdl_x_i, the ground contact load Fmdl_z_i, the self-aligning torque Mmdl_z_i and the like) of the tires Wi determined by the tire friction model 50 and the suspension dynamic characteristics model 54 and virtual external forces Fvirt and Mvirt. The virtual external forces Fvirt and Mvirt are input from a distributor 88, which will be discussed later. Then, the vehicle body motion model 56 calculates the current time state amounts (the current time values of the state amounts) of the vehicle body motion on the basis of these inputs and the last time state amounts (the posture angles and angular velocities of the vehicle body 1B and the position and speed of the vehicle body 1B).

The vehicle body motion model 56 is specifically described in terms of, for example, expressions in which virtual external forces are added to the right sides expressions (122) to (127) on page 211 of the aforesaid non-patent document 1. More specifically, the dynamics related to the translational motions of the vehicle body 1B (the translational motions in the directions of coordinate axes of X, Y and Z axes) are described by expressions 10a to 10c given below, while the dynamics related to rotative motions of the vehicle body 1B (rotative motions in the roll direction (about the X axis), the pitch direction (about the Y axis), and the yaw direction (about the Z axis)) are described by expressions 11a to 11c given below. Here, the influences of aerodynamic forces acting on the vehicle 1 are ignored. However, the influences of aerodynamic forces may be considered.

[Mathematical expression 1]

$$m \cdot \left(\frac{du}{dt} - v \cdot r\right) = \sum_{i=1}^{4} \text{Fmdl\_x\_i} + \text{Fvirt\_x} \qquad \text{Expression 10a}$$

$$m \cdot \left(\frac{dv}{dt} + u \cdot r\right) = \sum_{i=1}^{4} \text{Fmdl\_y\_i} + \text{Fvirt\_y} \qquad \text{Expression 10b}$$

$$ms \cdot \frac{dw}{dt} + ms \cdot g = \sum_{i=1}^{4} \text{Fmdl\_z\_i} + \text{Fvirt\_z} \qquad \text{Expression 10c}$$

[Mathematical expression 2]

$$Ix \cdot \frac{dp}{dt} - Ixz \cdot \frac{dr}{dt} - ms \cdot \left(\frac{dv}{dt} + r \cdot u\right) \cdot hs =$$
$$(Fmdl\_y\_1 + Fmdl\_y\_2) \cdot hf +$$
$$(Fmdl\_y\_3 + Fmdl\_y\_4) \cdot hr +$$
$$(Fmdl\_z\_1 - Fmdl\_z\_2) \cdot \frac{bf}{2} + Mvirt\_x$$

Expression 11a $$Iy \cdot \frac{dq}{dt} + ms \cdot \left(\frac{du}{dt} - v \cdot r\right) \cdot hs =$$
$$-(Fmdl\_z\_1 + Fmdl\_z\_2) \cdot Lf +$$
$$(Fmdl\_z\_3 + Fmdl\_z\_4) \cdot Lr -$$
$$\sum_{i=1}^{4} Fmdl\_x\_i \cdot h_{RC} + Mvirt\_y$$

Expression 11b $$-Ixz \cdot \frac{dp}{dt} + Iz \cdot \frac{dr}{dt} = (Fmdl\_y\_1 + Fmdl\_y\_2) \cdot Lf -$$
$$(Fmdl\_y\_3 + Fmdl\_y\_4) \cdot Lr +$$
$$(Fmdl\_x\_2 - Fmdl\_x\_1) \cdot \frac{bf}{2} +$$
$$(Fmdl\_x\_4 - Fmdl\_x\_3) \cdot \frac{br}{2} +$$
$$\sum_{i=1}^{4} Mmdl\_z\_i + Mvirt\_z$$

Expression 11c

Here, the meanings of the variables of these expressions are as defined by table 6-7 on page 210 of non-patent document 1. More specifically, u, v, and w denote velocity components in the longitudinal, lateral, and vertical directions (the X-axis, Y-axis, and Z-axis directions), respectively, of the portion above the spring (the vehicle body 1B) of the vehicle 1, p, q, and r denote angular velocities in the roll direction (about the X axis), the pitch direction (about the Y axis), and the yaw direction (about the Z axis), respectively, of the portion above the spring (the vehicle body 1B), Ix and Iy denote inertial moments about the X axis and the Y axis, respectively, of the portion above the spring (the vehicle body 1B), Iz denotes an inertial moment about the Z axis of the vehicle, Ixz denotes an inertial synergistic moment related to the X axis and the Z axis of the portion above the spring (the vehicle body 1B), hf and hr denote the roll center heights of the front axis and the rear axis, respectively, of the vehicle 1, hs denotes the length of the normal drawn onto a roll axis from the center of gravity of the portion above the spring (the vehicle body 1B) (roll arm), $h_{RC}$ denotes the height of the roll axis at the position of the center of gravity of the portion above the spring (the vehicle body 1B), Lf and Lr denote the distances between the front axis and the rear axis, respectively, and the center of gravity of the portion above the spring (the vehicle body 1B), bf and br denote a front wheel tread and a rear wheel tread, respectively, m and ms denote the mass of the vehicle 1 and the portion above the spring (the vehicle body 1B), respectively, g denotes a gravitational acceleration, and ax and ay denote accelerations in the longitudinal direction (the X-axis direction) and the lateral direction (the Y-axis direction) of the vehicle 1, respectively.

Fvirt denotes a translational force component (vector) of a virtual external force, and Fvirt_x, Fvirt_y, and Fvirt_z denote coordinate axis components of the translational force component. Mvirt denotes a moment component (vector) of a virtual external force, and Mvirt_x, Mvirt_y, and Mvirt_z denote coordinate axis components of the moment component.

According to a specific arithmetic procedure of the vehicle body motion model 56, the velocities of the vehicle body 1B in the X-, Y-, and Z-axis directions (u, v, and w in expressions 10a to 10c) and the angular velocities in the roll direction, the pitch direction, and the yaw direction of the vehicle body 1B (p, q, and r in expressions 11a to 11c) are determined according to the model expressions of expressions 10a to 10c and 11a to 11c given above. Then, the determined velocities and angular velocities of the vehicle body 1B are individually integrated thereby to determine the position and posture angles (the angles in the roll direction, the pitch direction, and the yaw direction) of the vehicle body 1B. Hereinafter, the motions of the vehicle body 1B (the positions, the speeds (translational speeds), posture angles, and the angular velocities of the posture angles of the vehicle body 1B) determined by the vehicle body motion model 56 as described above may be referred to as model vehicle body motions.

Incidentally, in the expressions for the vehicle body motion model 56 described above, it is assumed that the vertical displacements of the tires Wi are constant (or the height from a road surface is constant); however, they do not have to be constant.

Further, in the aforesaid models, moments Mmdl_x_i and Mmdl_y_i about a horizontal axis that act on the tires Wi are ignored; however, they may be considered. Further, the models may be described by expressions that do not use the roll center.

The tire rotative motion model 58 is a model that receives the driving/braking force Fmdl_x_i of the tires Wi and the driving/braking torque Tqmdl_i of each tire Wi and outputs the rotational speed ωwmdl_i of each tire Wi. The Fmdl_x_i and the Tqmdl_i are input from the tire friction model 50 and the driving/braking system model 52, respectively.

Specifically, in the tire rotative motion model 58, first, a value obtained by multiplying the driving/braking force Fmdl_x_i of each tire Wi by an effective radius rw of the tire Wi is subtracted from the driving/braking torque Tqmdl_i of each tire Wi so as to determine rotative acceleration torque of each tire Wi. And, a value obtained by dividing the rotative acceleration torque by a rotative inertia (inertial moment) Iw of each tire Wi is integrated, thereby determining the rotational speed ωwmdl_i of each tire Wi.

Incidentally, in a discrete system whose control cycle (arithmetic processing cycle) is Δt, in order to determine the rotational speed ωwmdl_i of a tire Wi by integration, the rotative acceleration torque of each tire Wi is divided by the rotative inertia Iw of the tire Wi. Then, a value obtained by multiplying the value that is the result of the division by Δt is added to a last time value of the rotational speed of the tire Wi, thereby determining a current time value (the value at the current time control cycle) of the rotational speed ωwmdl_i of the tire Wi.

The steering control system model 60 is a model showing operations of the steering device (active steering device) 3B of the present embodiment, and it calculates a steering control angle δmdl_i of each tire Wi. The steering control system model 60 receives mainly a steering angle θs, which is an element of the aforesaid drive manipulation inputs. To be more specific, the steering control system model 60 receives, in addition to the steering angle θs, a steering actuator manipulated variable δa_i (hereinafter referred to a steering control system model actuator manipulated variable), which is a manipulated variable of an actuator provided in the active steering device 3B, from the actuator drive controller model 76, which will be discussed later. The steering actuator manipulated variable δa_i is a manipulated variable that specifies the steering control angle of each wheel Wi by an actuator of the steering device 3B or a manipulated variable that specifies a correction amount of a mechanical steering control angle based on manipulation of the steering wheel. And, the steering control system model 60 calculates the steering control angle δmdl_i of each tire Wi on the basis of these inputs. For example, if the steering device 3B assists the mechanical steering control of the front wheels W1 and W2 on the basis of rotative manipulation of the steering wheel by an actuator and the steering control of the rear wheels W3 and W4 is accomplished by a driving force of an actuator, then the steering control angles of the front wheels W1 and W2 that are dependent upon the mechanical characteristics of the steering control system of the front wheels W1 and W2 may be determined from the steering angle θs, and the steering angles may be corrected on the basis of steering actuator manipulated variables δa_1 and δa_2 for the front wheels W1 and W2 thereby to calculate the steering control angles δmdl_1 and δmdl_2 of the front wheels W1 and W2. Further, the steering control angles δmdl_3 and δmdl_4 of the rear wheels W3 and W4 may be determined from the steering actuator manipulated variables δa_3 and δa_4 for the front wheels W1 and W2 rear wheels W3 and W4. In this case, the steering control angle δmdl_i may be determined, considering characteristics, such as delayed transmission from an actuator of the steering device 3B to a steering control wheel.

If the active steering device 3B is not adapted to steer control the rear wheels W3 and W4, then the steering control angles of the rear wheels W3 and W4 are always set to zero (the angle relative to the longitudinal direction of the vehicle body 1B is zero) regardless of the steering angle θs. If the steering device 3B is not equipped with an active actuator, then the steering control system model 60 may calculate the steering control angle δmdl_i of each tire (each of the front wheels W1 and W2) from the steering angle θs on the basis of a mechanical characteristic (a characteristic indicating a relationship between the steering angle θs and the steering control angles of the steering control wheels (the front wheels W1 and W2)) of the steering device 3B. If the steering device 3B is adapted to steer control the steering control wheels only by the driving forces of actuators, then only the steering actuator manipulated variable δa_i may be input to the steering control system model 60 and the steering control angle δmdl_i may be calculated from the input. Furthermore, the steering control angle εmdl_i may be calculated, considering a stroke change of the suspension or a geometry change due to a load change.

The aforesaid tire advancing speed vector calculator 66 calculates an advancing speed vector of each tire Wi (the advancing direction and velocity of each tire Wi) Vmdl_i by kinematics calculation on the basis of the state amounts of a model vehicle body motion supplied from the vehicle body motion model 56.

The aforesaid slippage ratio calculator 64 calculates a slippage ratio Smdl_of each tire Wi. The slippage ratio calculator 64 receives the advancing speed vector Vmdl_i of each tire Wi, the steering control angle δmdl_i of each tire Wi, and the rotational speed ωmdl_i of each tire Wi. The advancing speed vector Vmdl_i the steering control angle δmdl_i and the rotational speed ωmdl_i are supplied from the tire advancing speed vector calculator 66, the steering control system model 60, and the tire rotative motion model 58, respectively. And, based on these inputs, the slippage ratio calculator 64 calculates the slippage ratio Smdl_i of each tire Wi according to, for example, expressions (17) and (18) on page 182 of the aforesaid non-patent document 1. Specifically, the slippage ratio Smdl_i of each tire Wi is calculated according to expression 12a given below when the tire Wi is driven, whereas it is calculated according to expression 12b given below when the tire Wi is braked, where V in these expressions 12a and 12b denotes a component in the direction of the line of intersection between the central plane of the tire Wi and a road surface out of the advancing speed vector Vmdl_i based on the direction (the X-axis direction) of the vehicle body 1B. This component is determined from Vmdl_i and the steering control angle δmdl_i. Further, in expressions 12a and 12b, rw denotes an effective radius of each tire Wi. Incidentally, expressions 12a and 12b take the same forms of expressions for all tires W1 through W4, so that the subscript i (i=1, 2, 3 or 4) will be omitted.

When driven:

$$Smdl = (V - rw \cdot \omega wmdl)/(rw \cdot \omega mdl) \qquad \text{Expression 12a}$$

When braked:

$$Smdl = (V - rw \cdot \omega wmdl)/V \qquad \text{Expression 12b}$$

The aforesaid side slip angle calculator 62 calculates the side slip angle αmdl_i of each tire Wi. The side slip angle calculator 62 receives the advancing speed vector Vmdl_i of each tire Wi and the steering control angle δmdl_i of each tire Wi. The advancing speed vector Vmdl_i and the steering control angle δmdl_i are input from the tire advancing speed vector calculator 66 and the steering control system model 60. Then, the side slip angle calculator 62 determines, as the side slip angle αmdl_i, a difference between the steering angle (an angle relative to the X-axis direction) of each tire Wi and an azimuth (an angle relative to the X-axis direction) of the advancing speed vector Vmdl_i of each tire Wi, as shown in, for example, FIG. 6-13 on page 181 of the aforesaid non-patent document 1.

The arithmetic processing of the vehicle model explained above will be explained below with reference to the flowchart of FIG. 3. This arithmetic processing is a processing carried out at predetermined arithmetic processing cycles (control cycles). In the following explanation, "last time" means a last time arithmetic processing cycle and "current time" means a current arithmetic processing cycle.

First, in S110, the driving/braking torque Tqmdl_i of each tire is calculated as described above by the driving/braking system model 52 on the basis of a driving/braking system model actuator manipulated variable.

Subsequently, the procedure proceeds to S112 wherein the rotational speed ωwmdl_i of each tire is calculated as described above by the tire rotative motion model 58 on the basis of the driving/braking torque Tqmdl_i of each tire and a last time driving/braking force Fmdl_x_i of each tire.

Subsequently, the procedure proceeds to S114 wherein the steering control angle δmdl_i of each tire is determined as described above by the steering control system model 60 on the basis of the steering angle θs and the steering control system model actuator manipulated variable δa_i.

Subsequently, the procedure proceeds to S116 wherein the ground contact load Fmdl_z_i acting on each tire Wi is calculated as described above by the suspension dynamic characteristics model 54 on the basis of a suspension system model actuator manipulated variable, last time state amounts (posture angle/angular velocity of the vehicle body and position/speed of the vehicle body) of a model vehicle body motion, and an assumed road surface configuration (assumed to be flat here to make the explanation easy to understand).

Subsequently, the procedure proceeds to S118 wherein the advancing speed vector Vmdl_i (advancing direction and speed) of each tire Wi is calculated as described above by the tire advancing speed vector calculator 66 on the basis of last time state amounts (a speed and posture angle/angular velocity of the vehicle body) of the model vehicle body motion.

Subsequently, the procedure proceeds to S120 wherein the slippage ratio Smdl_i of each tire Wi is calculated in the slippage ratio calculator 64 as described above on the basis of the steering control angle δmdl_i of each tire Wi, the rotational speed ωwmdl_i of each tire Wi, and the advancing speed vector Vmdl_i of each tire Wi.

Subsequently, the procedure proceeds to S122 wherein the side slip angle αmdl_i is determined in the side slip angle calculator 62 on the basis of the steering control angle δmdl_i of each tire Wi and the advancing speed vector Vmdl_i of each tire Wi.

Subsequently, the procedure proceeds to S124 wherein the driving/braking force Fmdl_x_i, the lateral force Fmdl_y_i, and the self-aligning torque Mmdl_z_i of each tire Wi are determined by the tire friction model 50 on the basis of the side slip angle αmdl_i, the slippage ratio Smdl_i, and the ground contact load Fmdl_z_i of each tire Wi.

Lastly, the procedure proceeds to S126 wherein the road surface reaction forces (the lateral force Fmdl_y_i, the driving/braking force Fmdl_x_i, the ground contact load Fmdl_z_i, the self-aligning torque Mmdl_z_i, etc.) determined as described above are input to the aforesaid vehicle body motion model 56, and the current time state amounts of the model vehicle body motion are calculated on the basis of these inputs and the last time state amounts (the posture angle/angular velocity of the vehicle body 1B and the position/speed of the vehicle body 1B) of the model vehicle body motion.

The arithmetic processing of the vehicle model 72 is carried out as described above. Incidentally, the order of the calculation of the vehicle model 72 may be changed as appropriate. Further, the expressions used for the calculation of the vehicle model 72 may be approximated or modified.

The vehicle model 72 and the arithmetic processing thereof explained above will be the same in all embodiments except for the second embodiment, which will be discussed later. Supplementally, the vehicle model 72 explained above corresponds to a first vehicle model in the present invention, and a model vehicle body motion determined by the vehicle model 72 as described above corresponds to a vehicle model motion in the present invention.

Supplementally, the vehicle model 72 may be said to be a dynamic model in a broad sense. In contrast to this, the dynamic model showing the relationship between motions of the vehicle 1 and road surface reaction forces (more generally, external forces (including road surface reaction forces) acting on the vehicle 1) described above may be said to be a dynamic model in a narrow sense.

The control processing of the controller 10 in the first embodiment will now be explained with reference to FIG. 4. FIG. 4 is a block diagram showing the control processing function of the controller 10 of the vehicle 1 in the first embodiment. In FIG. 3, the portion excluding an actual automobile 70 (to be more precise, the portion excluding the actual automobile 70 and the sensors included in a sensor observer 82, which will be discussed later) provides the control processing function of the controller 10. The control processing function is implemented by a program or the like installed in the controller 10. The actual automobile 70 means an actual vehicle and it is equipped with the aforesaid actuator device 3 (the driving/braking device 3A with motive power distribution controlling function, the active steering device 3B, and the active suspension device 3C).

The controller 10 of the vehicle 1 of the present embodiment is provided with, as the control processing function thereof, a feed-forward manipulated variable determiner 74, an actuator drive controller model 76, an actuator drive controller 78, a μ estimator 80, the sensor observer 82, an error calculator 84, an error cancellation control law 86, the distributor 88, and a sensory feedback indicator 90 in addition to the aforesaid vehicle model 72.

The feed-forward manipulated variable determiner 74 and the actuator drive controller 78 constitute an actuator device control means 92. Further, the feed-forward manipulated variable determiner 74, the actuator drive controller model 76, and the vehicle model 72 constitute the vehicle model motion determining means 94 in the present invention. Further, the error cancellation control law 86 and the distributor 88 constitute the state amount error response control means 96. The sensor observer 82 constitutes an actual state amount grasping means in the present invention.

The following will explain control processing of the controller 10 in the present embodiment. The control processing is sequentially carried out at predetermined arithmetic processing cycles (control cycles).

First, drive manipulation inputs, including a steering angle, an accelerator manipulated variable, a brake manipulated variable, and a shift lever position, state amounts of the vehicle, such as a vehicle speed or a rotational speed of the engine, and an estimated road surface friction coefficient μestm are input to the feed-forward manipulated variable determiner 74. Then, based on the inputs, a feed-forward manipulated variable is determined by the feed-forward manipulated variable determiner 74. The state amounts of the vehicle input to the feed-forward manipulated variable determiner 74 include at least one of a state amount (a state amount of the actual automobile 70) detected or estimated by the sensor observer 82, which will be discussed later, and a state amount determined in the vehicle model 72 (a state amount of the vehicle 1 on the vehicle model 72). In the present embodiment, as will be discussed later, a state amount of the actual automobile 70 and a state amount of the vehicle 1 on the vehicle model 72 are controlled such that they approach each other, so that either one of the state amounts may be input to the feed-forward manipulated variable determiner 74. Further, the estimated road surface friction coefficient μestm is determined by the estimator 80, which will be discussed later. Incidentally, in the present embodiment, a state amount of the vehicle 1 and an estimated road surface friction coefficient μestm used by the feed-forward manipulated variable determiner 74 to determine a feed-forward manipulated variable are last time values (the values determined at a last time arithmetic processing cycle).

A feed-forward manipulated variable determined by the feed-forward manipulated variable determiner 74 is a manipulated variable input to the actuator drive controller 78 and the actuator drive controller model 76, the details of which will be discussed later. The feed-forward manipulated variable is constituted of, for example, a feed-forward wheel torque Tqff_i as a feed-forward amount of motive power distribution of each wheel Wi for the driving/braking device 3A with motive power distribution function (a basic required value of a driving/braking torque), a feed-forward steering control angle δff_i as a feed-forward amount of the steering control angle of each steering control wheel Wi for the active steering device 3B (a basic required value of a steering control angle), a feed-forward ground contact load Fff_z_i as a feed-forward amount of a ground contact load of each wheel Wi for the active suspension device 3C (a basic required value of a ground contact load), and a feed-forward suspension stroke as a feed-forward amount of a suspension stroke for the active suspension device 3C (a basic required value of a suspension stroke). The feed-forward ground contact load $Fff\_z\_i$ does not include a compensation share by feedback (a road surface reaction force compensation amount $Fcmpn\_i$, which will be discussed later). Incidentally, in place of the feed-forward wheel torque $Tqff\_i$, a basic required value of a driving/braking force of each wheel Wi may be used as a feed-forward amount for the driving/braking device 3A. Alternatively, a combination of a basic required value of a driving force of a drive wheel of each wheel Wi and a basic required value of a brake pressure may be used as a feed-forward amount for the driving/braking device 3A.

These feed-forward manipulated variables are determined so as to satisfy a requirement in that a response characteristics of a motion of the vehicle 1 in response to a drive manipulation input are improved and road surface reaction forces (Fx, Fy, and Fz) to be produced in the actual automobile 70 do not deviate from permissible ranges.

Regarding the improvement of the response characteristics of motions of the vehicle 1, to be more specific, distribution is performed such that the torque of outer wheels is larger than the torque of inner wheels at turning on the basis of a steering angle and a vehicle speed. Moreover, a differential operation may be added to a proportional operation so as to enhance the response of driving torque of driving wheels relative to an accelerator manipulated variable. More specifically, driving torques of the driving wheels may be determined on the basis of an accelerator manipulated variable and a temporal rate of change (differential value) thereof.

As specific arithmetic processing, a relationship between sets of drive manipulation inputs, state amounts of the vehicle 1, and road surface friction coefficients, and feed-forward manipulated variables (the feed-forward wheel torque $Tqff\_i$, the feed-forward steering angle $\delta ff\_i$, the feed-forward ground contact load $Fff\_z\_i$, and a feed-forward suspension stroke) that satisfy the aforesaid requirement relative thereto is determined beforehand by travel experiments, and is mapped and stored in the controller 10. Then, based on the map, the feed-forward manipulated variable determiner 74 may determine a feed-forward manipulated variable from a received drive manipulation input, a state amount of the vehicle 1, and an estimated road surface friction coefficient $\mu estm$.

Alternatively, a feed-forward manipulated variable may be determined as follows. For example, a feed-forward manipulated variable is determined by a control system similar to the control system section indicated by a dashed line in FIG. 6-99(a) on page 225 of the aforesaid non-patent document 1. More specifically, first, a drive manipulation input is supplied to a reference model (a model expressing vehicle response characteristics desired by a driver) to determine the state amounts (an angular velocity in the yaw direction, a posture angle in the roll direction, an angular velocity in the roll direction, and the like) of a desired motion to be followed by a vehicle model (the same vehicle model as the vehicle model 72). Then, based on a difference between a state amount of the desired motion and a state amount of the vehicle model, an input to the vehicle model is determined such that the vehicle 1 follows the desired motion, and the determined input is defined as the feed-forward manipulated variable. Incidentally, in this case, when determining the feed-forward manipulated variable, an actual state amount of the vehicle 1 is not directly fed back (in other words, the manipulated variable is not determined on the basis of a difference between an actual state amount of the vehicle 1 and a desired value thereof); therefore, the manipulated variable is called a feed-forward manipulated variable.

Incidentally, in the present embodiment, a feed-forward manipulated variable input to the actuator drive controller 78 and a feed-forward manipulated variable input to the actuator drive controller model 76 have been determined by the same feed-forward manipulated variable determiner 74; alternatively, however, the feed-forward manipulated variable determiner 74 may be divided into a feed-forward manipulated variable determiner for the actuator drive controller and a feed-forward manipulated variable determiner for the actuator drive controller model. In this case, however, the feed-forward manipulated variable determiner for the actuator drive controller and the feed-forward manipulated variable determiner for the actuator drive controller model determine the same feed-forward manipulated variable, so that the same feed-forward manipulated variable determiner is desirably shared, as with the present embodiment, in order to reduce the volume of calculation.

Further, in place of the feed-forward manipulated variables (the feed-forward wheel torque $Tqff\_i$, the feed-forward steering angle $\delta ff\_i$ the feed-forward ground contact load $Fff\_z\_i$ and the feed-forward suspension stroke), the manipulated variables (the desired values) of the actuators of the actuator device, which are equivalent thereto, may be determined as the feed-forward manipulated variable. For example, the manipulated variables of the actuators of the driving/braking device 3A that are required for the wheel torque imparted to each wheel Wi by the driving/braking device 3A to agree with the feed-forward wheel torque $Tqff\_i$ may be determined, and the determined actuator manipulated variables may be decided as the feed-forward manipulated variables for the driving/braking device 3A. In this case, the feed-forward manipulated variable determiner 74 may be omitted, and feed-forward manipulated variables may be determined by internal processing of the actuator drive controller 78 or the actuator drive controller model 76.

Subsequently, the feed-forward manipulated variables determined as described above are input to the actuator drive controller model 76. The actuator drive controller model 76 models the arithmetic processing function and a characteristic (a relationship between inputs and outputs of the actual actuator drive controller 78) of the actuator drive controller 78 (hereinafter referred to as the actual actuator drive controller 78 in some cases) that outputs the manipulated variables of the actuators of the actual actuator devices 3 of the vehicle 1 (controls the actual actuator devices 3). The actuator drive controller model 76 determines the model actuator manipulated variables (a driving/braking system actuator manipulated variable, a suspension actuator manipulated variable, and a steering actuator manipulated variable $\delta a\_i$ shown in FIG. 1), which are the manipulated variables for the actuator device on the vehicle model 72 (the driving/braking system model 52, the suspension dynamic characteristics model 54, and the steering control system model 60), on the basis of the input feed-forward manipulated variables, and it outputs the determined model actuator manipulated variables to each of the actuator devices 3 on the vehicle model 72. A road surface reaction force compensation amount $Fcmpn\_i$, which will be discussed later, is additionally input to the actual actuator drive controller 78, whereas the road surface reaction force compensation amount $Fcmpn\_i$ is not input to the actuator drive controller model 76. In other words, the actuator drive controller model 76 in the present embodiment determines model actuator manipulated variables with the road surface reaction force compensation amount $Fcmpn\_i$ steadily set to zero, and controls the actuator devices 3 on the vehicle model 72 by using the determined manipulated variables.

The actuator drive controller model 76 determines model actuator manipulated variables as follows. Using the feed-forward manipulated variables (the feed-forward wheel torque Tqff_i, the feed-forward steering control angle δff_i, the feed-forward ground contact load Fff_z_i, and the feed-forward suspension stroke) input to the actuator drive controller model 76 as desired values, the model actuator manipulated variables are determined such that a condition of the vehicle model 72 agrees with the desired values. In this case, normally, a model actuator manipulated variable for the driving/braking system model 52 may be determined by using the feed-forward wheel torque Tqff_i as the desired value, a model actuator manipulated variable for the steering control system model 60 may be determined by using the feed-forward steering control angle δff_i as the desired value, and a model actuator manipulated variable for the suspension dynamic characteristic model 54 may be determined by using the feed-forward ground contact load Fff_z_i as the desired value. If, however, there are dynamic interferences among the actuators of the actuator device models 52, 60, and 54, then it is desirable to determine the manipulated variables of the actuators of the respective actuator device models 52, 60, and 54 in an integrated manner. In the present embodiment, the operations of the respective actuator devices 3 influence each other to make road surface reaction forces acting on the wheels Wi fall within a permissible range, so that the manipulated variables of the actuators of the actuator models 52, 60, and 54 are determined in an integrated manner in the actuator drive controller model 76.

Subsequently, the sensor observer 82 detects or estimates an actual state amount, which is the actual state amount of the actual automobile 70. The sensor observer 82 is equipped with various sensors, such as an acceleration sensor for detecting an acceleration of the actual automobile 70 a rate sensor for detecting an angular velocity (yaw rate) of the actual automobile 70 a vehicle speed sensor for detecting a vehicle speed (ground speed) of the actual automobile 70 a suspension stroke sensor for detecting a stroke (a vertical displacement amount) of the suspension, a vehicle height sensor for detecting a height of the vehicle body 1B (a vertical position relative to a road surface), force sensors for detecting the ground contact loads (road surface reaction forces) of the wheels W1 to W4 or frictional forces between the wheels and a road surface, torque sensors for detecting the drive torques of the wheels W1 to W4, a visual sensor or a radar for detecting an object existing around (in front or the like) of the actual automobile 70 and a GPS or an inertial navigation system for detecting a position of the actual automobile 70. Based on outputs of these sensors, an actual state amount of the actual automobile 70 and an ambient condition, including an obstacle, of the actual automobile 70.

Further, regarding an actual state amount (e.g., a side slip angle) of the actual automobile 70 that cannot be directly detected by a sensor, the sensor observer 82 estimates an actual state amount of the actual automobile 70 by an observer on the basis of, for example, the aforesaid drive manipulation inputs, actuator manipulated variables of the actuator devices 3, and detections values of sensors. The actual state amount of the actual automobile 70 directly detected by the sensors or estimated by the observer as described above is an actual state amount. In the embodiments in the present description, detected or estimated actual state amounts include a vehicle speed, a yaw rate (an angular velocity of about the yaw axis), a side slip angle, a position, a rotational speed of the engine, and the like of the actual automobile 70.

Subsequently, a state amount error, which is a difference between a current actual state amount (a current time value of an actual state amount) of the vehicle 1 and a last time state amount of the vehicle model 72 (a last time value of a state amount of the vehicle 1 on the vehicle model 72), is determined by the error calculator 84. Specific state amount errors include a roll angle error θerr_x, which is an error of a posture angle of the vehicle body 1B in the roll direction (about the X axis), a roll angular velocity error ωerr_x, which is an error of the angular velocity of the posture angle in the roll direction, a pitch angle error θerr_y, which is an error of a posture angle of the vehicle body in the pitch direction (about the Y axis), a pitch angular velocity error ωerr_y, which is an error of the angular velocity thereof in the pitch direction, a yaw angle error θerr_z, which is an error of a posture angle of the vehicle body 1B in the yaw direction (about the Z axis), a yaw angular velocity error ωerr_z, which is an error of an angular velocity (yaw rate) of the posture angle thereof in the yaw direction, XYZ axial components Pberr_x, Pberr_y, and Pberr_z of a positional error of the vehicle body 1B, and XYZ axial components Vberr_x, Vberr_y, and Vberr_z of an error of a translational speed of the vehicle body 1B. Hereinafter, the angular velocities in the roll direction (about the X axis), the pitch direction (about the Y axis), and the yaw direction (about the Z axis) of the portion above the spring (the vehicle body 1B) will be described by ω followed by subscripts indicating axes of rotation, as ωx, ωy, and ωz, instead of p, q, and r, respectively.

In the present embodiment, the difference between the current actual state amount of the actual automobile 70 and the last time state amount of the vehicle 1 on the vehicle model 72 has been defined as the state amount error; alternatively, however, a difference between an actual state amount of the actual automobile 70 detected or estimated by the sensor observer 82 at an arithmetic processing cycle of an n (n=1, 2, ... ) number of times before and a last time state amount of the vehicle 1 on the vehicle model 72 may be defined as a state amount error. Further, at each arithmetic processing cycle, the arithmetic processing procedure may be changed so that a current time state amount of the vehicle 1 on the vehicle model 72 is calculated before detecting or estimating the current actual state amount of the actual automobile 70 (the processing of the sensor observer 82), thereby determining the difference between the current actual state amount and the current time state amount of the vehicle 1 on the vehicle model 72 or the difference between the current actual state amount and a state amount of the vehicle 1 on the vehicle model 72 an n number of times before (the state amount at the arithmetic processing cycle an n number of times before). Which of the methods is optimum depends on a transmission delay of a control system.

Subsequently, the state amount error is input to the error cancellation control law 86 wherein error canceling compensation amounts Fstab, Mstab for converging the error to zero are determined. The error canceling compensation amount Fstab means a translational force component of a required value of an external force (vector) to be applied to the actual automobile 70 (more specifically, to the total center of gravity of the vehicle 1 or the center of gravity of the vehicle body 1B in the actual automobile) in order to bring an error of at least either one of a position and a speed (translational speed) of the vehicle 1 out of the aforesaid state amount error close to zero. Further, the error canceling compensation amount Mstab means a moment component of a required value of an external force (vector) to be applied to the actual automobile 70 in order to bring an error of at least either one of a posture angle and an angular velocity thereof out of the aforesaid state amount error close to zero.

To be specific, these error canceling compensation amounts Fstab and Mstab are determined according to the following expressions 15a to 15f. In other words, they are determined from a state amount error according to a PD control law as a feedback control law.

$$Fstab\_x = Kpx \cdot Pberr\_x + Kvx \cdot Verr\_x \quad \text{Expression 15a}$$

$$Fstab\_y = Kpy \cdot Pberr\_y + Kvy \cdot Verr\_y + K\theta zy \cdot \theta err\_y + K\omega zy \cdot \omega err\_y \quad \text{Expression 15b}$$

$$Fstab\_z = Kpz \cdot Pberr\_z + Kvz \cdot Verr\_z \quad \text{Expression 15c}$$

$$Mstab\_x = K\theta x \cdot \theta err\_x + K\omega x \cdot \omega err\_x \quad \text{Expression 15d}$$

$$Mstab\_y = K\theta y \cdot \theta err\_y + K\omega y \cdot \omega err\_y \quad \text{Expression 15e}$$

$$Mstab\_z = K\theta z \cdot \theta err\_z + K\omega z \cdot \omega err\_z + Kpyz \cdot Pberr\_y + Kvyz \cdot Verr\_y \quad \text{Expression 15f}$$

where Kpx, Kvx, Kpy, Kvy, Kpz, Kvz, Kθx, Kωx, Kθy, Kωy, Kθz, Kωz, Kpyz, Kvyz, Kθzy, and Kωzy denote predetermined gains, and at least one of these is set to a value that is not zero.

The component Pberr_y in the Y-axis direction of a position error means the deviation of a movement trajectory of the actual automobile 70 from a movement trajectory of the vehicle 1 on the vehicle model 72, that is, course deviation. The component Pberr_y in the Y-axis direction of the position error changes with a product of the yaw angle error θerr_z (error of a posture angle in the yaw direction) of the vehicle 1 and a speed (translational speed) of the vehicle 1. This means that a motion of a posture angle in the yaw direction of the vehicle 1 influences the component in the Y-axis direction of a position error. Kθzy, Kωzy, Kpyz, and Kvyz are gains for enhancing control stability and responsiveness, taking the above influences into account. Especially, setting Kpyz and Kvyz to values that are not zero causes an operation to emerge to reduce a course deviation by manipulating a steering control angle if the course deviation of the vehicle 1 takes place.

In a third embodiment and the embodiments thereafter, which will be discussed hereinafter, an operation for reducing a course deviation by manipulating a steering angle if the course deviation of the vehicle 1 takes place may be generated as a scenario in a scenario preparer. In this case, even if Kpyz, Kvyz, Kθzy, and Kωzy are set to zero, the actuator devices 3 of the actual automobile 70 operate to reduce a course deviation by manipulating a steering angle if the course deviation takes place.

The above gains may take fixed values; preferably, however, they are variably set according to an estimated road surface friction coefficient μestm and a vehicle speed, a side slip angle, a slippage rate and the like of the actual automobile 70 or the vehicle 1 on the vehicle model 72 in order to enhance control stability and responsiveness.

Subsequently, the error canceling compensation amounts Fstab, Mstab, the last time values Fmdl_i_p of the road surface reaction forces (specifically, the driving/braking force Fmdl_x_i, the lateral force Fmdl_y_i, and the ground contact load Fmdl_z_i) of the tires Wi and the estimated road surface friction coefficient μestm on the vehicle model 72 are input to the distributor 88. Then, based on these inputs, the distributor 88 determines a road surface reaction force compensation amount Fcmpn_i and virtual external forces Fvirt and Mvirt. A desired road surface reaction force defined by the model actuator manipulated variable (last time value) input to the vehicle model 72 may be supplied to the distributor 88 in place of Fmdl_i_p. For instance, the last time value of the feed-forward ground contact load Fff_z_i included in a suspension model actuator manipulated variable for the suspension dynamic characteristics model 54 may be used in place of the ground contact load Fmdl_z_i (last time value) out of Fmdl_i_p. In a case where road surface reaction forces are detected by the sensor observer 82, detection values thereof may be supplied in place of Fmdl_i_p to the distributor 88.

The road surface reaction force compensation amount Fcmpn_i determined by the distributor 88 means a correction amount of a road surface reaction force to be generated on the actual automobile 70 (a correction amount for a road surface reaction force relative to a feed-forward manipulated variable) to bring a state amount error close to zero. Further, the virtual external forces Fvirt and Mvirt mean virtual external forces to be additionally applied to the vehicle 1 (more specifically, the vehicle body 1B (the portion above the spring)) on the vehicle model 72 to bring a state amount error close to zero. Fvirt of the virtual external forces Fvirt and Mvirt means a translational force component, while Mvirt means a moment component.

The arithmetic processing of the distributor 88, which determines these road surface reaction force compensation amount Fcmpn_i and the virtual external forces Fvirt and Mvirt, will be explained in detail below.

First, a permissible range (so-called friction circle) of a road surface friction force (a friction force between each tire Wi and a road surface) is set on the basis of the estimated road surface friction coefficient μestm and each last time vehicle model tire ground contact load Fmdl_z_i_p, which is the last time value of the ground contact load Fmdl_z_i of each tire Wi on the vehicle model 72. However, the permissible range is set to be slightly smaller than a friction limit value. Specifically, an upper limit value Fhmax of the magnitude of a friction force vector of each tire Wi is set. The permissible range set as described above will be hereinafter referred to as a friction force permissible range. The friction force permissible range is a permissible range that restricts the upper limit value of the magnitude of a resultant force of a driving/braking force and a lateral force acting on each tire Wi from a road surface. Incidentally, the friction force permissible range may be set to be elliptical.

Further, as another permissible range, a permissible range of a ground contact load of each tire Wi (hereinafter referred to as the ground contact load permissible range) is set to prevent the wheels Wi from floating and running idle. Specifically, a lower limit value Fzmin_i of a ground contact load of each tire Wi is set. The ground contact load permissible range set as described above is a permissible range that restricts a lower limit value of a ground contact load of each tire Wi. The lower limit value Fzmin_i of the ground contact load permissible range may be set for each wheel Wi, or the same value may be set for all wheels W1 to W4.

Subsequently, road surface reaction force compensation amounts Fcmpn_i are determined such that the resultant forces (a translational force and a moment) of the road surface reaction force compensation amounts Fcmpn_i of all tires W1 through W4 that act on the total center of gravity of the vehicle 1 or the center of gravity of the vehicle body 1B agree with or approximate the error canceling compensation amounts Fstab and Mstab as much as possible, while the sum (the sum of vectors) of the last time vehicle model tire road surface reaction force Fmdl_i_p, which is the last time value of the road surface reaction force of each tire Wi on the vehicle model 72, and the road surface reaction force compensation amount Fcmpn_i satisfies the friction force permissible range and the ground contact load permissible range (more specifically, satisfies the following inequalities 16 and 17).

More specifically, the road surface reaction force compensation amount Fcmpn_i is determined such that a performance function E (Ferr_x, Ferr_y, Ferr_z, Merr_x, Merr_y, and Merr_z) defined by expression 20, which includes XYZ axial components Ferr_x, Ferr_y, and Ferr_z of a road surface reaction force translational force component compensation amount error defined by expression 18a, expression 18b, and expression 18c and XYZ axial components Merr_x, Merr_y, and Merr_z of a road surface reaction force moment component compensation amount error defined by expression 19a, expression 19b, and expression 19c, is minimized, while satisfying the inequalities of expression 16 and expression 17. In general, the road surface reaction force compensation amount Fcmpn_i that satisfies such a condition cannot by analytically determined, so that it is determined by a search technique.

$$(Fmdl\_x\_i\_p + Fcmpn\_x\_i) \cdot$$
$$(Fmdl\_x\_i\_p + Fcmpn\_x\_i) +$$
$$(Fmdl\_y\_i\_p + Fcmpn\_y\_i) \cdot$$
$$(Fmdl\_y\_i\_p + Fcmpn\_y\_i) \leq$$
$$Fhmax\_i \cdot Fhmax\_i \, (i = 1, 2, 3, 4)$$
Expression 16

$$Fmdl\_z\_i\_p + Fcmpn\_z\_i \geq Fzmin\_i (i = 1, 2, 3, 4)$$ Expression 17

$$Ferr\_x = \sum Fcmpn\_x\_i - Fstab\_x$$ Expression 18a $$Ferr\_y = \sum Fcmpn\_y\_i - Fstab\_y$$ Expression 18b $$Ferr\_z = \sum Fcmpn\_z\_i - Fstab\_z$$ Expression 18c $$Merr\_x = (Fcmpn\_y\_1 + Fcmpn\_y\_2) \cdot hf +$$
$$(Fcmpn\_y\_3 + Fcmpn\_y\_4) \cdot hr +$$
$$(Fcmpn\_z\_1 + Fcmpn\_z\_2) \cdot bf/2 +$$
$$(Fcmpn\_z\_3 + Fcmpn\_z\_4) \cdot br/2 - Mstab\_x$$
Expression 19a $$Merr\_x = (Fcmpn\_z\_1 + Fcmpn\_z\_2) \cdot Lf +$$
$$(Fcmpn\_z\_3 + Fcmpn\_z\_4) \cdot Lr \sum Fcmpn\_x\_i \cdot h_{RC} -$$
$$Mstab\_y$$
Expression 19b $$Merr\_z = (Fcmpn\_y\_1 + Fcmpn\_y\_2) \cdot Lf -$$
$$(Fcmpn\_y\_3 + Fcmpn\_y\_4) \cdot Lr +$$
$$(Fcmpn\_x\_2 + Fcmpn\_x\_1) \cdot bf/2 +$$
$$(Fcmpn\_x\_4 + Fcmpn\_x\_3) \cdot br/2 - Mstab\_z$$
Expression 19c $$E(Ferr\_x, Ferr\_y, Ferr\_z, Merr\_x, Merr\_y, Merr\_z) =$$
$$Kferrx \cdot Fferr\_x + Fferr\_x + Kferry \cdot Ferr\_y \cdot Ferr\_y +$$
$$Kferrz \cdot Ferr\_z \cdot Ferr\_z + Kmerrx \cdot Merr\_x \cdot Merr\_x +$$
$$Kmerry \cdot Merr\_y \cdot Merr\_y + Kmerr\_z \cdot Merr\_z \cdot Merr\_z$$
Expression 20

Incidentally, Σ in expressions 18a through 18c and 19b means the total sum on i (=1, 2, 3, 4)(the total sum on all wheels W1 through W4). Further, hf, hr, $h_{RC}$, Lf, Lr, bf, and br are the same as those shown in the aforesaid expressions 10a through 10c and 11a through 11c.

Subsequently, the road surface reaction force translational force component compensation amount error Ferr (vector) and the road surface reaction force moment component compensation amount error Merr (vector) determined as described above are defined as a translational force component Fvirt of a virtual external force and a moment component Mvirt of the virtual external force. More specifically, the virtual external force translational force component Fvirt and the virtual external force moment component Mvirt are determined according to the following expressions 21 and 22.

$$Fvirt = Fferr$$ Expression 21

$$Mvirt = Mferr$$ Expression 22

Subsequently, the feed-forward manipulated variable and the road surface reaction force compensation amount Fcmpn_i are input to the actuator drive controller (the actual actuator drive controller) 78. Then, the actual actuator drive controller 78 takes a road surface reaction force obtained by adding the road surface reaction force compensation amount Fcmpn_i to a road surface reaction force corresponding to a feed-forward manipulated variable (a road surface reaction force expected to be produced by a feed-forward manipulated variable. This means a basic required value of a road surface reaction force) (a road surface reaction force obtained by correcting a road surface reaction force corresponding to a feed-forward manipulated variable by the road surface reaction force compensation amount Fcmpn_i) as a desired value so as to determine the manipulated variables for the actuators of the actuator devices 3 (the driving/braking device 3A with motive power distribution control function, the active steering device 3B, and the active suspension device 3C) of the actual automobile 70 such that a road surface reaction force actually produced agrees with or approximates the desired value, and controls the actuator devices 3 on the basis of the manipulated variables.

Alternatively, the road surface reaction force Fmdl_i and the road surface reaction force compensation amount Fcmpn_i may be input to the actuator drive controller 78, and the actuator devices (the driving/braking device 3A with motive power distribution control function, the active steering device 3B, and the active suspension device 3C) of the actual automobile 70 may be controlled such that a road surface reaction force that is the sum of the road surface reaction force Fmdl_i and the road surface reaction force compensation amount Fcmpn_i of the vehicle model 72 is actually generated.

In any case, the lateral force Fy_i, the driving/braking force Fx_i, the ground contact load Fz_i, and the like mutually interfere with each other, e.g., the lateral force Fy_i of each tire Wi is influenced by the driving/braking force Fx_i as shown in FIG. 6-19 on page 184 of the aforesaid non-patent document 1, and the degree of interference changes with a friction coefficient (a friction coefficient between a road surface and a tire). Therefore, it is desirable to integrally control (manipulate) the actuators of all the actuator devices 3A, 3B, and 3C on the basis of the estimated road surface friction coefficient μestm estimated by the μ estimator 80.

Subsequently, the drive manipulation input, the model actuator manipulated variable, the virtual external force translational force component Fvirt, the virtual external force moment component Mvirt, and the estimated road surface friction coefficient μestm are input to the vehicle model 72, and the arithmetic processing of the vehicle model 72 is carried out as described above. Thus, the current model vehicle body motion state amount, which is the current time value of a state amount of the vehicle body motion model 56 (a model vehicle body motion state amount), and a current model road surface reaction force, which is the current time value of a road surface reaction force acting on the vehicle 1 on the vehicle model 72, are determined.

Subsequently, estimated friction coefficients μestm (current time values), which are the estimated values of the friction coefficients between the wheels W1 to W4 and a road surface, are calculated by the μ estimator 80. This μ estimator 80 receives, for example, actual state amounts of the actual automobile 70 (e.g., the accelerations of the actual automobile 70 in the longitudinal and lateral directions, the rotational speeds of the wheels W1 to W4, and the yaw rate of the actual automobile 70) detected or estimated by the sensor observer 82 and the steering control angles (past values, such as last time values) of the steering control wheels W1 to w4 and the actuator manipulated variables (past values, such as last time values) that specify driving/braking forces out of the actuator manipulated variables determined by the actuator drive controller 78, which will be discussed later in detail, and the estimated road surface friction coefficients µestm (current time values) are calculated from the above inputs. In this case, a variety of techniques have been publicly known as the techniques for estimating friction coefficients, so that such publicly known techniques may be used to determine µestm. For example, a friction coefficient can be estimated on the basis of a peak value of an acceleration of the vehicle body 1B. in the present embodiment, a current time value of the estimated road surface friction coefficient µestm determined as described above of the estimated road surface friction coefficient µestm determined as described above is used in the next arithmetic processing cycle of the controller 10.

The estimated road surface friction coefficient µestm is desirably determined separately for each wheel of W1 to W4; alternatively, however, it may be, for example, a representative estimated value on the set of all wheels W1 to W4, or a representative estimated value on each set of the set of the front wheels W1, W2 and the set of the rear wheels W3, W4, or a representative estimated value on each set of the set of the left wheels W1, W3 and the set of the right wheels W2, W4. Further, the estimated road surface friction coefficient µestm may be updated at a fixed time interval that is longer than an arithmetic processing cycle (control cycle) of the controller 10 in order to prevent its value from frequently changing, or the estimated road surface friction coefficient µestm may be obtained through a filter, such as a low-pass filter, from an instantaneous estimated value of a friction coefficient at each arithmetic processing cycle. Further, the gentleness of changes in estimated road surface friction coefficients input to the vehicle model 72 and the gentleness of changes in estimated road surface friction coefficients input to the distributor 88 may be set to be different.

Further, the virtual external forces Fvirt and Mvirt are input to the sensory feedback indicator 90. A correction of a motion of the vehicle 1 of the vehicle model 72 by the virtual external forces Fvirt and Mvirt is not intended by a driver himself/herself of the vehicle 1; therefore, if the magnitudes of the virtual external forces Fvirt and Mvirt exceed predetermined values, then the driver is desirably informed of this by some means. The sensory feedback indicator 90 is adapted to carry out processing for the announcement. For example, an additional manipulated variable is added to a power steering actuator of the steering device 3B or a braking assist actuator of the driving/braking device 3A on the basis of a change amount of a feed-forward manipulated variable based on a virtual external force (a change amount of a feed-forward manipulated variable that is equivalent to the virtual external force), and the driver is informed of the correction of the motion of the vehicle 1 of the vehicle model 72 based on the virtual external forces Fvirt and Mvirt. To be more specific, for example, a torque that is proportional to a moment vertical component Mvirt_z of a virtual external force may be additionally generated in power steering. The announcement may be audibly or visually performed.

According to the first embodiment explained above, the motions of the actual automobile 70 and the vehicle on the vehicle model 72 are manipulated such that a state amount difference between the actual automobile 70 and the vehicle on the vehicle model 72 approximates zero, and a road surface reaction force falls within a permissible range, thus preventing state amount errors from becoming excessive. This reduces a situation in which an actuator manipulated variable for each actuator device 3 of the actual automobile 70 is restricted by a limiter, thus making it possible to properly control motions of the actual automobile 70 while effectively restraining influences of disturbance factors, such as undulation of a road surface or a change in friction coefficient on the actual automobile 70. Moreover, control robustness of the vehicle 1 against parameters of the vehicle model 72 or errors of the estimated road surface friction coefficient µestm can be enhanced.

In the aforesaid first embodiment, virtual external forces have been input to the vehicle model 72; alternatively, however, the virtual external forces determined by the distributor 88 as described above may be defined as the virtual road surface reaction force compensation amounts for correcting a road surface reaction force on the vehicle model 72 and may be input to the actuator drive controller model 76 in place of the vehicle model 72, as shown in FIG. 5. In this case, the actuator drive controller model 76 may determine a model actuator manipulated variable for the vehicle model 72, as in the case where the actual actuator drive controller 78 determines an actuator manipulated variable. The vehicle model 72 may be equipped with an actuator and a drive controller thereof that are not provided in the actual automobile 70. Operating the actuator, which is not provided in the actual automobile 70, on the vehicle model 72 makes it possible to obtain an operation equivalent to that obtained in a case where a virtual external force is imparted to the vehicle 1 on the vehicle model 72.

Supplementally, the first embodiment explained above is an embodiment of the first invention, the second invention, and the fourth invention through the eleventh invention described above. In this case, the virtual external forces Fvirt and Mvirt correspond to vehicle model manipulation control inputs, the road surface reaction force compensation amount Fcmpn_i corresponds to an actual automobile actuator manipulation control input, and a state amount error determined by the error calculator 84 corresponds to a first state amount error. Further, the model vehicle body motions correspond to model vehicle motions. Further, feed-forward manipulated variables output by the feed-forward manipulated variable determiner 74 correspond to actual automobile basic control inputs or road surface reaction force basic desired parameters. Further, model actuator manipulated variables output by the actuator drive controller model 76 correspond to model basic control inputs or model road surface reaction force parameters. Incidentally, in place of the virtual external forces Fvirt and Mvirt, manipulated variables for an actuator device on the vehicle model 72 that provide an advantage equivalent to that obtained by applying the virtual external forces to the vehicle 1 on the vehicle model 72 (i.e., correction amounts of the model actuator manipulated variables) may be determined, and the determined manipulated variables may be input to the vehicle model 72 as vehicle model manipulation control inputs. The vehicle model manipulation control inputs in this case may be determined by converting the virtual external forces Fvirt and Mvirt into manipulated variables of the dimension of the model actuator manipulated variables. This makes it possible to configure an embodiment of the third invention or the twelfth invention described above. Incidentally, instead of the virtual external forces Fvirt and Mvirt, model actuator manipulated variables, which will be equivalent to the virtual external forces Fvirt and Mvirt, may be directly determined.

Second Embodiment

A second embodiment of the controller for a vehicle in accordance with the present invention will now be explained. The second embodiment differs from the first embodiment only in a part of the construction of the vehicle 1 and a part of control processing of the controller 10; hence, for the same configuration part or the same function part as that of the first embodiment, the same reference numerals as those in the first embodiment will be used and detailed explanation thereof will be omitted.

The second embodiment uses a vehicle model that is simpler than that in the first embodiment, and controls only an active steering device 3B among actuator devices 3 of a vehicle 1 to bring a state amount difference between the vehicle model and the actual vehicle 1 close to zero.

In this case, in the present embodiment, the active steering device 3B allows only the steering control angles of front wheels W1 and W2 to be actively manipulated through the intermediary of an actuator, such as an electric motor. Hence, in the present embodiment, rear wheels W3 and W4 are not steer controlled.

In the present embodiment, a driving/braking device 3A may be a driving/braking device with motive power distribution controlling function, as with the first embodiment, or it may not be provided with the motive power distribution controlling function. Further, a driving force may be imparted only to two driving wheels (the front wheels W1 and W2 or the rear wheels W3 and W4) (so-called 2WD). Further, a suspension device 3C may be an active suspension device, as with the first embodiment, or it may be a passive suspension device having no actuator. In any case, in the present embodiment, active manipulation of actuators on the basis of a state amount difference between the vehicle model and the actual vehicle 1 is carried out only on the steering device 3B, as described above. In the following explanation, for the convenience of understanding of the present embodiment, the driving/braking device 3A is supposed to be a standard driving/braking device without the motive power distribution controlling function. And, the operation control of the driving/braking device 3A is supposed to be carried out by a separate controller from the controller 10 by publicly known regular control processing on the basis of an accelerator manipulated variable, a brake manipulated variable, and a shift lever position among drive manipulation inputs. The suspension device 3C is supposed to be a passive suspension device having no actuator.

The basic construction for the control processing function of the controller 10 in the present embodiment is the same as that shown in the block diagram of FIG. 4 mentioned above. However, in the present embodiment, the processing of a vehicle model 72, an error cancellation control law 86, and a distributor 88 is different from that in the first embodiment. In addition, the processing of a feed-forward manipulated variable determiner 74, an actuator drive controller 78, and an actuator drive controller model 76 is slightly different from that in the first embodiment.

Before explaining the control processing of the controller 10 in the present embodiment, the vehicle model 72 in the present embodiment will be explained with reference to FIG. 6. FIG. 6 is a block diagram showing the functional construction of the vehicle model 72 in the present embodiment. In the present embodiment, the vehicle model 72 is provided with a steering control system model 61 and a two-wheeled model 63. The steering control system model 61 is a model expressing the dynamic characteristics of the active steering device 3B in the present embodiment, as with that in the first embodiment. More specifically, the steering control system model 61 receives a steering angle θs and a steering actuator manipulated variable δa_i (δa_1 and δa_2 in the present embodiment) among drive manipulation inputs, then it determines, based on these inputs, steering control angles δmdl_1 and δmdl_2 of the front wheels W1 and W2, which are steering control wheels, and outputs them. Incidentally, the steering control angles δmdl_1 and δmdl_2 of the front wheels W1 and W2 are substantially equal, so that either one of these steering control angles δmdl_1 and δmdl_2 or a mean value thereof may be output from the steering control system model 61.

The two-wheeled model 63 is, for example, a publicly known model having two degrees of freedom shown in FIG. 6-63 of the aforesaid non-patent document 1 or in FIG. 3.5 of "Motions and control of automobiles (2nd edition)" (written by Masato Abe and published by Sankaido on Jul. 23, 2004). More specifically, as shown in FIG. 7, the two-wheeled model is a model that approximately expresses behaviors of the actual vehicle 1 in terms of behaviors of a vehicle having a single front wheel Wf and a single rear wheel Wr (that is, a two-wheeled vehicle). In FIG. 7, "reference course" and "reference yaw rate" relate to an embodiment to be described later, so that they may be ignored here. In this case, according to the present embodiment, a virtual external force for bringing a state amount of the two-wheeled model 63 close to a state amount of the actual automobile 70 is added, and the dynamics of the two-wheeled model 63 is described by the dynamics equations of expressions 50a through 50d given below.

[Mathematical Expression 3]

$$m \cdot V \cdot \frac{d\beta}{dt} + 2 \cdot (Kf + Kr) \cdot \beta + \left\{ m \cdot V + \frac{2}{V} \cdot (Lf \cdot Kf - Lr \cdot Kr) \right\} \cdot \omega z = 2 \cdot Kf \cdot \delta f + Fvirt \quad \text{Expression 50a}$$

$$2 \cdot (Lf \cdot Kf - Lr \cdot Kr) \cdot \beta + I \cdot \frac{d\omega z}{dt} + \frac{2 \cdot (Lf^2 \cdot Kf + Lr^2 \cdot Kr)}{V} \cdot \omega z = 2 \cdot Lf \cdot Kf \cdot \quad \text{Expression 50b}$$

$$m \cdot V \cdot \left( \frac{d\beta}{dt} + \omega z \right) = 2 \cdot Yf + 2 \cdot Yr \quad \text{Expression 50c}$$

$$I \cdot \frac{d\omega z}{dt} = 2 \cdot Lf \cdot Yf - 2 \cdot Lr \cdot Yr \quad \text{Expression 50d}$$

Here, m, I, V, β, ωz, and δf in expressions 50a through 50d denote a mass of the vehicle 1, an inertial moment about a yaw axis of the vehicle 1, a traveling speed (a vehicle speed; to be precise, the speed of the center of gravity point of the vehicle 1), a side slip angle of the center of gravity point of the vehicle 1 (an angle formed by a velocity vector of the center of gravity point of the vehicle 1 and the X-axis direction), a yaw rate of the vehicle 1 (an angular velocity of a posture angle about the yaw axis), and a mean value of a steering control angle of the front wheel W1 and a steering control angle of the front wheel W2 (the steering control angle of the front wheel Wf in FIG. 7), respectively. Further, Lf denotes a distance between the center of gravity point of the vehicle 1 and a front axle, Lr denotes a distance between the center of gravity point of the vehicle 1 and a rear axle, Kf denotes a cornering power per wheel of the front wheels W1 and W2 of the vehicle 1 (half the cornering power of the front wheels Wf in FIG. 7), and Kr denotes a cornering power per wheel of the rear wheels W3 and W4 of the vehicle 1 (half the cornering power of the rear wheels Wr in FIG. 7). Further, Yf denotes a cornering force per wheel of the front wheels W1 and W2, and Yr denotes a cornering force per wheel of the rear wheels W3 and W4. Further, Fvirt and Mvirt denote a translational force component and a moment component, respectively, of the aforesaid virtual external force.

The two-wheeled model 63 described by means of the above expression 50a through 50d receive the steering control angles δmdl_1 and δmdl_2 from the steering control system model 61 and also receives an accelerator manipulated variable, a brake manipulated variable, and a shift lever position among the aforesaid drive manipulation inputs, and an estimated road surface friction coefficient μestm, virtual external forces Fvirt, Mvirt, and a vehicle speed V. In this case, the estimated road surface friction coefficient μestm is input from the μ estimator 80, and the virtual external forces Fvirt, Mvirt are input from a distributor 88. Further, the vehicle speed V is input from a sensor observer 82. Based on these inputs, the two-wheeled model 63 sequentially calculates the side slip angle β, the yaw rate ωz, a driving/braking force Fmdl_x_i, and a lateral force Fmdl_y_i of each wheel Wi at each arithmetic processing cycle of the controller 10.

Specifically, the two-wheeled model 63 determines either one of the input steering control angles δmdl_1 and δmdl_2 or a mean value thereof as δf in the above expressions 50a and 50b. In a case where the steering control system model 61 outputs either one of the steering control angles δmdl_1 and δmdl_2 or a mean value thereof, the output steering control angle may be determined as δf. Further, the two-wheeled model 63 determines the cornering powers Kf and Kr from the input estimated road surface friction coefficient μestm on the basis of a preset data table or the like. Then, based on the last time values of these δf and Kf, Kr, the input vehicle speed V, and the side slip angle β and the yaw rate ωz, the two-wheeled model 63 calculates the current time values of the side slip angle β, the yaw rate ωz, dβ/dt, which is a rate of change (a differential value) of the side slip angle β, and dωz/dt, which is a rate of change (a differential value) of the yaw rate ωz, according to the above expressions 50a and 50b (more specifically, expressions obtained by breaking them up by a control cycle).

Further, the two-wheeled model 63 determines Yf and Yr on the basis of the last time values and the current time values of the side slip angle β and the yaw rate ωz determined as described above by solving a simultaneous equation of the above expressions 50c and 50d. Thus, Yf will be lateral forces Fmdl_y_1 and Fmdl_y_2 of the front wheels W1 and W2 (Fmdl_y_1=Fmdl_y_2=Yf) and Yr will be lateral forces Fmdl_y_3 and Fmdl_y_4 of the rear wheels W3 and W4 (Fmdl_y_3=Fmdl_y_4=Yr).

Incidentally, Yf and Yr may be determined according to the following expressions 51a and 51b.

$$Yf = -Kf \cdot (\beta + Lf \cdot \omega z/V - \delta) \quad \quad 51a$$

$$Yr = -Kr \cdot (\beta - Lr \cdot \omega z/V) \quad \quad 51b$$

Further, the two-wheeled model 63 calculates the driving/braking force Fmdl_x_i of each wheel Wi from an input vehicle speed (vehicle speed of an actual automobile 70), and an accelerator manipulated variable, a brake manipulated variable, and a shift lever position among drive manipulation inputs. In this case, Fmdl_x_1=Fmdl_x_2 and Fmdl_x_3=Fmdl_x_4.

In the present embodiment, of the side slip angle β and the yaw rate ωz calculated by the two-wheeled model 63, the yaw rate ωz is output as a state amount of a motion of the vehicle 1 on the vehicle model 72. Further, Fmdl_x_i and Fmdl_y_i calculated by the two-wheeled model 63 are output as road surface reaction forces (model road surface reaction forces) on the vehicle model 72.

More specific processing of the controller 10 in the present embodiment will now be explained, focusing mainly on the processing that is different from the processing in the first embodiment. First, a feed-forward manipulated variable determiner 74 determines a feed-forward manipulated variable to the steering device 3B from the drive manipulation input, the estimated road surface friction coefficient μestm, and a state amount of the vehicle 1 that have been received. In this case, in the present embodiment, a feed-forward manipulated variable determined by the feed-forward manipulated variable determiner 74 is, for example, the feed-forward steering control angle δff_i (the basic required value of a steering control angle of the front wheels W1 and W2) explained in the first embodiment. The feed-forward steering control angle δff_i is determined on the basis of a predetermined arithmetic expression or a preset map or the like from the steering angle θs among drive manipulation inputs and a vehicle speed among state amounts of the vehicle 1 that have been input to the feed-forward manipulated variable determiner 74. For instance, the feed-forward steering control angle δff_i is determined by multiplying a steering angle θs by a predetermined coefficient that has been set on the basis of a vehicle speed. The coefficient in this case is desirably set to be, for example, a smaller value as a vehicle speed increases. Incidentally, the coefficient may take a constant value.

Subsequently, the feed-forward manipulated variable (the feed-forward steering control angle δff_i) determined as described above is supplied to the actuator drive controller model 76. Then, based on the received feed-forward steering control angle δff_i the actuator drive controller model 76 determines a model actuator manipulated variable as an actuator manipulated variable for the active steering device 3B (the steering control system model 61) on the vehicle model 72 (the vehicle model in FIG. 6) and outputs the determined model actuator manipulated variable to the vehicle model 72. In this case, the feed-forward steering control angle δff_i is used as a desired value of a mean value or either one of the steering control angles of the front wheels W1 and W2 (outputs of the steering control system model 61) to determine the model actuator manipulated variable δa_i for the steering control system model 61 such that an output of the steering control system model 61 follows a steering control angle of this desired value.

Subsequently, the sensor observer 82 detects or estimates a state amount (actual state amount) of the actual automobile 70. This processing is the same as that in the first embodiment.

Subsequently, an error calculator 84 determines, as a state amount error, the difference between a yaw rate among current time state amounts of the actual automobile 70 and a yaw rate ωz calculated at the last time arithmetic processing cycle by the vehicle model 72 (the vehicle model in FIG. 6). Hereinafter, the state amount error will be referred to as the yaw rate error ωerr_z.

Subsequently, the yaw rate error ωerr_z is input to an error cancellation control law 86. This error cancellation control law 86 determines an error canceling compensation amount Fstab, Mstab as an external force to be applied to the actual automobile 70 so as to bring the yaw rate error ωerr_z to zero. However, in the present embodiment, Fstab, which is a translational force component of the error canceling compensation amount Fstab, Mstab, is set to zero (set to Fstab_x=Fstaby=Fstabz=0). Further, a component in the pitch direction Mstab_x and a component in the roll direction Mstab_y out of the moment component Mstab of the error canceling compensation amount Fstab, Mstab are also set to zero. Hence, only the component in the yaw direction Mstab_z of Mstab is determined by a feedback law on the basis of the yaw rate error ωrr_z. This component in the yaw direction Mstab_z (hereinafter referred to as the error canceling compensation amount yaw component Mstab_z) is determined from the yaw rate error werr_z according to a proportional control law in the present embodiment. More specifically, Mstab_z is determined according to expression 51 given below.

$$Mstab\_z = K\omega z \cdot \omega err\_z \qquad \text{Expression 51}$$

Kωz in expression 51 denotes a proportional gain and it is set to, for example, a predetermined value. Alternatively, however, Kωz may be variably set according to the estimated road surface friction coefficient μestm, the vehicle speed of the actual automobile 70 or the like. The error canceling compensation amount yaw component Mstab_z may be determined from ωrr_z according to a different feedback law, such as a PD control law.

Subsequently, the error canceling compensation amount yaw component Mstab_z, the last time values Fmdl_i_p of the road surface reaction force (the driving/braking force Fmdl_x_i and the lateral force Fmdl_y_i) of each tire Wi on the vehicle model 72, and the estimated road surface friction coefficient μestm is input to the distributor 88. Then, based on these inputs, the distributor 88 determines the road surface reaction force compensation amount Fcmpn_i (specifically, Fcmpn_x_i and Fcmpn_y_i) and the virtual external force Fvirt, Mvirt.

In the present embodiment, these road surface reaction force compensation amount Fcmpn_i and the virtual external force Fvirt, Mvirt are determined as follows.

First, a road surface reaction force compensation amount Fcmpn_i (Fcmpn_x_i, Fcmpn_y_i) is determined by a search technique such that a performance function E (Ferr_x, Ferr_y, Merr_z) of expression 20' given below that includes road surface reaction force compensation amount errors Ferr_x, Ferr_y, and Merr_z defined by expressions 18a, 18b, and 19c given above is minimized, while satisfying the inequality of expression 16 given above.

$$E(Ferr\_x, Ferr\_y, Merr\_z) = Kferrx \cdot Ferr\_x \cdot Ferr\_x + \qquad \text{Expression 20'}$$
$$Kferry \cdot Ferr\_y \cdot Ferr\_y + Kmerrz \cdot Merr\_z \cdot Merr\_z$$

In this case, a ground contact load of each tire Wi is set to a predetermined value established beforehand, and from this predetermined value and the estimated road surface friction coefficient μestm, Fhmax_i (an upper limit value of a friction force of each tire Wi) of the above inequality 16 is set. Fstab_x and Fstab_y in the above expressions 18a and 18b are both zero. The road surface reaction force compensation amounts Fcmpn_1 and Fcmpn_2 of the front wheels W1 and W2 are equal to each other, and the road surface reaction force compensation amounts Fcmpn_3 and Fcmpn_4 of the rear wheels W3 and W4 are equal to each other. In other words, Fcmpn_x_1=Fcmpn_x_2, Fcmpn_y_1=Fcmpn_y_2, Fcmpn_x_3=Fcmpn_x_4, and Fcmpn_y_3=Fcmpn_y_4. Therefore, a third term and a fourth term of the right side of the above expression 19c will be always zero, so that these third term and the fourth term may be deleted from expression 19c. Further, in expression 20', Kferrx and Kferry may be set to zero. In other words, in the performance function, Ferr_x and Ferr_y may be ignored.

Subsequently, the translational force component Fvirt and the moment component Mvirt of a virtual external force are determined according to the aforesaid expression 21 and expression 22. More specifically, Ferr_x and Ferr_y are determined as the virtual external force translational force component Fvirt, and Merr_z is determined as the virtual external force moment component. In this case, in the present embodiment, Ferr_x (=X-axial component of Fvirt) is equal to the resultant force of the X-axial components Fcmpn_x_i of the road surface reaction force compensation amounts Fcmpn_i of the wheels Wi, and Ferr_y (=Y-axial component of Fvirt) is equal to the resultant force of the Y-axial components Fcmpn_y_i of the road surface reaction force compensation amounts Fcmpn_i of the wheels Wi.

The above is the processing of the distributor 88 in the present embodiment.

Incidentally, the setting may be Fcmpn_x_1=Fcmpn_x_2=Fcmpn_x_3=Fcmpn_x_4=0, Fcmpn_y_1=Fcmpn_y_2, and Fcmpn_y_3=Fcmpn_y_4=0, and Kferrx and Kferry may be set to zero in expression 20'.

Subsequently, the feed-forward manipulated variable (the feed-forward steering angle δff_i) and the road surface reaction force compensation amount Fcmpn_i (Fcmpn_x_i, Fcmpn_y_i) are supplied to the actuator drive controller (the actual actuator drive controller) 78. Then, the actual actuator drive controller 78 determines the manipulated variable of an actuator of the active steering device 3B of an actual automobile 70 by using, as a desired value, a road surface reaction force that is obtained by adding the road surface reaction force compensation amount Fcmpn_i to a road surface reaction force produced in each wheel Wi (more precisely, a driving/braking force and a lateral force of a road surface reaction force) in response to a feed-forward manipulated variable and a current control state of the driving/braking device 3A, such that a road surface reaction force actually produced agrees with the desired value or approximates the desired value, thus controlling the active steering device 3B by using the determined actuator manipulated variable. At this time, a braking device of the driving/braking device 3A may be controlled in addition to controlling the active steering device 3B.

Subsequently, the drive manipulation input, the model actuator manipulated variable δa_i, the virtual external force Fvirt, Mvirt, the vehicle speed (the vehicle speed of the actual automobile 70), and the estimated road surface friction coefficient μestm are supplied to the vehicle model 72 (the vehicle model in FIG. 6). Then, the current time values of the road surface reaction force Fmdl_x_i, Fmdl_y_i, the side slip angle β, and the yaw rate ωz on the vehicle model 72 are calculated as described above by the vehicle model 72.

Subsequently, as with the aforesaid first embodiment, the processing of the μ estimator 80 and a sensory feed-forward indicator 90 is carried out.

In the control processing of the controller 10 in the present embodiment, the control processing other than that explained above is the same as that in the aforesaid first embodiment.

The above is the detailed explanation of the control processing of the controller 10 in the second embodiment. The present embodiment provides operations and advantages that are similar to those of the aforesaid first embodiment.

Supplementally, the second embodiment is an embodiment of the first invention, the second invention, and the fourth invention to the eleventh invention of the present invention. In this case, the correspondence relationship between the second embodiment and the present invention is the same as the correspondence relationship between the first embodiment and the present invention. In the second embodiment also, as in the case explained in relation to the first embodiment, in place of the virtual external force Fvirt, Mvirt, the manipulated variable for an actuator device on the vehicle model 72 (i.e., a correction amount of the model actuator manipulated variable), which provides the effect that is equivalent to applying the virtual external force to the vehicle 1 on the vehicle model 72, may be determined, and this may be input to the vehicle model 72 as a vehicle model manipulation control input. This makes it possible to construct an embodiment of the third invention or the twelfth invention.

Third Embodiment

A third embodiment of the present invention will now be explained with reference to FIG. 8 to FIG. 14. FIG. 8 is a block diagram showing a functional construction of a controller for a vehicle according to the third embodiment. As shown in FIG. 8, the third embodiment is provided with a scenario preparer 98 in place of the feed-forward manipulated variable determiner 74 in the first embodiment. Further, a sensory feedback indicator 90 receives outputs from a distributor 88, and information is transmitted from the scenario preparer 98 to the sensory feedback indicator 90. The rest of the construction is the same as that of the first embodiment.

The following explains an overview of the scenario preparer 98. The scenario preparer 98 generates a time series of the reference state amounts of future motions of a vehicle 1 expected to be desired by a driver after the present time on the basis of a time series of drive manipulation inputs (steering angles, accelerator manipulated variables, brake manipulated variables, shift lever positions, etc.) up to the present time (current time) at every control processing cycle of the controller 10. Further, the scenario preparer 98 prepares a time series of state amounts of the future motions of the vehicle 1 until after predetermined time from the present time such that a road surface reaction force acting on the vehicle 1 does not exceed a permissible range while following the time series of the reference state amounts generated by motions of the vehicle 1. At this time, a time series of manipulated variables (control inputs) supplied to an actuator drive controller and a time series of road surface reaction forces of the vehicle 1 in the future from the present time up to the predetermined time are prepared in addition to the time series of the state amounts of motions of the vehicle 1. Then, the scenario preparer 98 outputs a manipulated variable for the present time out of the prepared time series of the manipulated variables to the actuator drive controller as the current time value of a feed-forward manipulated variable for an actual actuator drive controller 78. Hereinafter, a time series of state amounts or the like prepared by the scenario preparer 98 will be generically referred to as a scenario or a scenario time series.

The scenario preparer 98 prepares a scenario by using a scenario vehicle model. The scenario vehicle model calculates a state amount at time ta from a state amount at arbitrary time ta−Δt (where Δt denotes an arithmetic processing cycle (control cycle)) and inputs at time ta (inputs to the scenario vehicle model) and outputs the calculated state amount.

In this case, in the scenario preparer 98, the time that is one control cycle before from the present time (the time of the current time control cycle of the controller 10) is defined as "the initial time," an input for calculating a state amount determined at the present time (a present time state amount) is defined as "a present time input," and a last time state amount for calculating a state amount determined at the present time (a present time state amount) is defined as an initial state amount. Then, a value after time of Δt from the initial time amount (i.e., a value associated with the present time) out of the time series of an input to a scenario actuator drive controller, which is an actuator drive controller for preparing a scenario (control input), is output as a current time value of a feed-forward manipulated variable.

A scenario is re-generated for each control cycle. If a virtual external force is zero, the state of the vehicle model 72 (the vehicle model 72 to which the virtual external force is input) changes according to a scenario generated immediately before, so that a scenario to be re-generated will provide the same behavior as that of the scenario that has been generated immediately before. If a virtual external force is not zero, then an initial state of a scenario is corrected to the one that matches a state of the vehicle 1 obtained as a result of having been subjected to the virtual external force.

The following will explain the details of the scenario preparer 98 with reference to FIG. 9 through FIG. 14. FIG. 9 is a block diagram showing a functional construction of the scenario preparer 98, and FIG. 10 and FIG. 11 are flowcharts showing the processing of the scenario preparer 98. In the following explanation, nick time of a scenario time series will be denoted by Δt (in the present embodiment, Δt is identical to a control cycle of the controller 10), and each time t of the time series will be expressed by k·Δt (k=0, 1, 2, ..., kmax). And, a value of a state amount or the like at time k·Δt in the scenario time series will be referred to as a k-th value. A 0-th value is a value at the initial time of a scenario time series, and a first value is a value at the present time (time Δt in the scenario time series). Further, time after a predetermined time (kmax−1)·Δt from the present time, that is, time kmax·Δt is defined as time Te.

The scenario preparer 98 is equipped with a future input time series determiner 100, a scenario reference dynamic characteristics model 102, a follow-up control law 106, a scenario actuator drive controller model 108, and a scenario vehicle model 110, as shown in FIG. 9. In addition, the scenario preparer 98 is also equipped with a scenario evaluator and a scenario follow-up control law changer, which are not shown.

The following will explain in detail the processing of the scenario preparer 98, together with the explanation of the processing of each section of the scenario preparer 98.

Referring to the flowcharts of FIG. 10, first, in S210, based on a time series of drive manipulation inputs (the current time values and the past values, such as last time values, of drive manipulation inputs) up to the present time (the time of a current time control cycle), a time series of future drive manipulation inputs, which are the drive manipulation inputs in a predetermined time Te from the present time, (the time series from K=1 to k=kmax) is determined. The processing in this S210 is the processing by a future input time series determiner 100.

Specifically, the time series of future drive manipulation inputs is prepared as follows. A steering angle (hereinafter referred to as a future steering angle in some cases) among drive manipulation inputs will be taken as an example in the following explanation. It is assumed that the time series of steering angle θs up to the present time is as shown by, for example, the dashed lines in the graph of FIG. 12. At this time, the time series of the future steering angle θs (the time series until time Te in the future (time after predetermined time from the present time)) is determined as shown by the solid lines in the graph of FIG. 12. In this case, if an environment (a traveling environment of the actual automobile 70) cannot be recognized, then a time series of the steering angle θs of a future drive manipulation input is determined such that the future steering angle θs becomes constant from the time at which some time has elapsed from the present time.

To be more specific, the time series of the future steering angle θs is determined from a value of the steering angle θs at the present time (a current time value) and a value (a current time value) of an angular velocity of the steering angle θs so as to indicate a behavior of, for example, a primary delay system. More specifically, if a value of the steering angle θs at the present time is denoted by θs1 and a value of an angular velocity is denoted by dθs1/dt, then the time series of the future steering angle θs is determined such that a primary delay waveform is obtained that is stabilized to θs1+Ts·dθs1/dt, θs1 being the starting point and Ts denoting a predetermined time constant. In this case, a value (a first value) at time t=Δt of the time series of the future steering angle is set to agree with a detected value of the steering angle θs at the present time, i.e., a current time value of θs. The angular velocity dθs1/dt may be determined by dividing a difference between the current time value and the last time value of a detected value of the steering angle θs by a control processing cycle Δt; alternatively, however, it may be determined by an FIR filter or an IIR filter on the basis of the current time value and a time series of a plurality of past values of detected values of the steering angle θs so as to remove noises.

A time series of drive manipulation inputs (an accelerator (gas) pedal manipulated variable and a brake pedal manipulated variable) other than the steering angle θs among the future drive manipulation inputs is also determined in the same manner as that for the time series of the future steering angle θs. Incidentally, of the future drive manipulation inputs, a time series of shift lever positions is determined such that, for example, it is maintained at a shift lever position (a current time value) at the present time.

Supplementally, if a traveling environment of the actual automobile 70 can be recognized by a visual sensor, a radar, a GPS, an inertial navigation device, map data, or the like, it is desirable to prepare a time series of future drive manipulation inputs on the basis of environmental information. For instance, if a driver suddenly steers the steering wheel when the actual automobile 70 is traveling on an expressway, this may be interpreted that the driver is trying to change lanes to avoid an obstacle or the like and a time series of future drive manipulation inputs may be prepared. Desirably, the time series of the future drive manipulation inputs basically provides drive manipulation inputs that make it possible to obtain a behavior of the vehicle 1 that approximates a future behavior of the actual automobile 70 intended by the driver.

Subsequently, the procedure proceeds to S212 to prepare a scenario reference state amount time series, which is a time series of reference state amounts in a scenario, a scenario actuator drive controller input time series, which is a time series of inputs (control inputs) to a scenario actuator drive controller 108, a scenario state amount time series, which is a time series of state amounts of motions of the vehicle 1 on a scenario vehicle model 110, and a scenario road surface reaction force time series, which is a time series of road surface reaction forces on the scenario vehicle model 110. The processing of S212 is the processing carried out by a scenario reference dynamic characteristics model 102, a scenario follow-up control law 106, the scenario actuator drive controller model 108, and the scenario vehicle model 110.

The processing of S212 is carried out by the subroutine processing shown by the flowchart of FIG. 11.

First, in S1002, an initial state amount (a state amount at time t=0) of the scenario reference dynamic characteristics model 102 is set to agree with a latest state amount (a last time value in the present embodiment) of the vehicle model 72. More specifically, the latest state amount of the vehicle model 72 is substituted into a 0-th state amount of the time series of state amounts of the scenario reference dynamic characteristics model 102 to initialize the scenario reference dynamic characteristics model.

Here, in the present embodiment, for example, the two-wheeled model 63 explained in the aforesaid second embodiment (the model having the dynamic characteristics described in the aforesaid expressions 50a and 50b) is used as the scenario reference dynamic characteristics model 102. However, in the scenario reference dynamic characteristics model 102, Fvirt and Mvirt in expressions 50a and 50b are steadily set to zero. And, in S1002, the values of initial state amounts (a side slip angle β, a yaw rate ωz, a position of the center of gravity of the vehicle 1 (a position in an XY plane), and a posture angle (a posture angle about the yaw axis) of the vehicle 1) of the scenario reference dynamic characteristics model 102 are set to be the same as the values of latest state amounts on the vehicle model 72. For example, as shown in FIG. 13, it is assumed that, regarding the yaw rate (ωz among the state amounts of the scenario reference dynamic characteristics model 102, the time series of the yaw rate ωz of a reference state amount in a past scenario until initial time (the time of a last time control cycle) (more specifically, the time series of a yaw rate at the time of each control cycle determined by the scenario reference dynamic characteristics model 102 at each control cycle in the past up to the last time control cycle) is as shown by the solid lines in the graph of FIG. 13. It is also assumed that the time series of the yaw rate among the state amounts of the vehicle model 72 up to the initial time is as shown by the dashed lines in the graph of FIG. 13. At this time, in the time series of the yaw rate ωz of reference state amounts to be newly prepared at a current time control cycle, the value at the initial time (the 0-th value) is set to the same value as that of the yaw rate in the state amounts of the vehicle model 72 (the yaw rate in the latest state amounts) regardless of past scenarios. The same applies to other state amounts of the scenario reference dynamic characteristics model 102. Thus, the scenario reference dynamic characteristics model 102 prepares the time series of reference state amounts by using latest state amounts of the vehicle model 72 as the starting points at each control cycle.

Supplementally, FIG. 13 illustrates a case where a scenario has not been updated from the time at the left end to the initial time on the time axis. If a scenario is updated at each control cycle, then the time series of a yaw rate of reference state amounts in a past scenario is set to agree with the time series of a yaw rate in state amounts of the vehicle model 72 before the initial time; therefore, the values of both time series are usually different only at the present time.

The side slip angle β in the scenario reference dynamic characteristics model 102 is the side slip angle at the center of gravity of the vehicle 1, and an initial state amount thereof is determined from state amounts of the aforesaid model vehicle body motion of the vehicle model 72 (specifically, a speed of the vehicle body 1B in the X-axis direction and a speed thereof in the Y-axis direction among the state amounts of the model vehicle body motion).

Supplementally, in the scenario reference dynamic characteristics model 102, the value of a road surface friction coefficient is set to, for example, a predetermined value established in advance (a friction coefficient of a dry road surface or the like), and the values of the cornering powers Kf and Kr in the aforesaid expressions 50a and 50b on the basis of the values of the road surface friction coefficient. However, the value of the road surface friction coefficient in the scenario reference dynamic characteristics model 102 does not have to be necessarily fixed; the road surface friction coefficient in the scenario reference dynamic characteristics model 102 may be determined on the basis of, for example, the aforesaid estimated road surface friction coefficient μestm. In this case, the road surface friction coefficient in the scenario reference dynamic characteristics model 102 desirably does not suddenly change or frequently change. Hence, the road surface friction coefficient in the scenario reference dynamic characteristics model 102 may be determined on the basis of a result obtained by, for example, passing the estimated road surface friction coefficient μestm through a low-pass filter.

Subsequently, the procedure proceeds to S1004 wherein the initial state amount (the state amount at time t=0) of the scenario vehicle model 110 is set so as to agree with the latest state amount (the last time value in the present embodiment) of the vehicle model 72. More specifically, the latest state amount of the vehicle model 72 is substituted into the 0-th state amount of the time series of the state amounts of the scenario vehicle model 110 to initialize the scenario vehicle model 110.

Here, the scenario vehicle model 110 in the present embodiment is a model having the same structure as that of the aforesaid vehicle model 72. And, in S1004, the initial state amounts of the scenario vehicle model 110 (the state amounts of a motion of the vehicle 1 on the scenario vehicle model 110 (the state amounts of a model vehicle body motion) and a road surface reaction force) are set to be the same as the latest state amounts of the vehicle model 72. Therefore, the scenario vehicle model 110 will prepare the time series of the state amounts and road surface reaction forces of motions (model vehicle body motions) of the vehicle 1 on the scenario vehicle model 110 at each control cycle, a latest state amount of the vehicle model 72 being the starting point.

Subsequently, the procedure proceeds to S1006 wherein 1 is substituted into k, then the loop processing of S1008 to S1032 is carried out.

In S1008, a k-th value (a value at time t=k·Δt) of the time series of the future drive manipulation inputs determined in the aforesaid S210 is input to the scenario reference dynamic characteristics model 102, and new reference state amounts are determined by the scenario reference dynamic characteristics model 102. The processing in this S1008 is the processing carried out by the scenario reference dynamic characteristics model 102.

Here, in the present embodiment, the scenario reference dynamic characteristics model 102 determines a reference yaw rate, which is a reference value of the yaw rate of the vehicle 1, and a reference course as a reference of a traveling route of the vehicle 1, as reference state amounts, as illustrated in, for example, FIG. 7 mentioned above, and outputs the determined reference state amounts. The reference course is a spatial route specified by the time series of positions of the vehicle 1 on the scenario reference dynamic characteristics model 102. These reference state amounts are determined, for example, as follows.

From the steering angle θs among the future drive manipulation inputs supplied to the scenario reference dynamic characteristics model 102, the steering control angles (δf in the aforesaid expressions 50a and 50b) of the steering control wheels (the front wheels W1 and W2 in the present embodiment) are determined on the basis of a predetermined correlation (e.g., a ratio of a steering control angle to a steering angle) between the steering angle and steering control angles of the steering control wheels (the front wheels W1 and W2) of the vehicle 1. Then, based on the steering control angle δf and the state amounts ((k−1)th state amounts) of the scenario reference dynamic characteristics model 102 at time t=(k−1)·Δt, the yaw rate ωz and the side slip angle β at time t=k·Δt are determined according to the aforesaid expressions 50a and 50b (more specifically, expressions representing these expressions 50a and 50b by a discrete system). Then, the determined yaw rate ωz is obtained as a new reference yaw rate.

Further, in the scenario reference dynamic characteristics model 102, a reference yaw rate ωz is integrated from time (k−1)·Δt to time t=k·Δt, and the integrated value is added to a posture angle about the yaw axis of the vehicle 1 among the state amounts of the scenario reference dynamic characteristics model 102 at the time (k−1)·Δt. Thus, the posture angle (the azimuth of the vehicle 1) about the yaw axis of the vehicle 1 at the time t=k·Δt is determined. Then, based on the determined posture angle and the side slip angle β calculated as described above, the vehicle speed V, and the position (more precisely, the position of the center of gravity of the vehicle 1 in the XY plane) at time t=(k−1)·Δt, the position of the vehicle 1 (more precisely, the position of the center of gravity of the vehicle 1 in the XY plane) at time t=k·Δt is determined. A route specified by the time series of this position is obtained as a reference course.

As the vehicle speed V required for determining the reference state amount at the time k·Δt, the vehicle speed (a (k−1) th vehicle speed) at the time (k−1)·Δt out of the time series (scenario state amount time series) of the state amounts of motions of the vehicle 1 on the scenario vehicle model 110 is used. In this case, the 0-th vehicle speed in the scenario state amount time series agrees with the latest value (the last time value in the present embodiment) of the vehicle speed on the vehicle model 72. Further, a vehicle speed after the 0-th is determined by sequential integration calculation in the same manner as the procedure for determining posture angles from an accelerator (gas) pedal manipulated variable, a brake pedal manipulated variable, and a shift lever position or the like among the future drive manipulation inputs input to the scenario reference dynamic characteristics model 102 and the posture angle and the side slip angle β or the like that have been determined as described above.

Subsequently, the procedure proceeds to S1010 wherein the new reference state amounts determined in S1008 are stored and retained as the k-th values of the time series of the reference state amounts in the scenario.

Subsequently, the processing from S1012 to S1024 is carried out by the scenario follow-up control law 106. The scenario follow-up control law 106 determines a manipulated variable (control input) for the scenario actuator drive controller model 108 such that a road surface reaction force produced on the scenario vehicle model 110 does not exceed a predetermined permissible range, while bringing the state amounts of a motion of the vehicle 1 on the scenario vehicle model 110 close to the reference state amounts. The functional construction of the scenario follow-up control law 106 is shown by the block diagram in FIG. 14. As illustrated, the scenario follow-up control law 106 is provided with a scenario follow-up feed-forward law 106*a*, a subtraction processor 106*b*, a scenario follow-up feedback law 106*c*, an addition processor 106*d*, and a scenario road surface reaction force limiter 106*e*. Further, a manipulated variable converter 106*f* may be added, as necessary. In the present embodiment, however, the manipulated variable converter 106*f* is omitted.

The following will explain in detail the processing of the scenario follow-up control law 106 with reference to the flowcharts of FIG. 14 and FIG. 11.

First, in S1012, based on the k-th values of the time series of the future drive manipulation inputs, a feed-forward road surface reaction force as the basic required value of the road surface reaction force to be produced in the vehicle 1 is determined by the scenario follow-up feed-forward law 106a. In the present embodiment, as shown in FIG. 14, the scenario follow-up feed-forward law 106a receives not only future drive manipulation inputs but also a vehicle speed (a (k−1)th value) among the state amounts of the scenario vehicle model 110. Then, from the scenario follow-up feed-forward law 106a, a feed-forward road surface reaction force is determined on the basis of these inputs.

In this case, the feed-forward road surface reaction force is determined, for example, as follows. Based on the future drive manipulation inputs and the vehicle speed supplied to the scenario follow-up feed-forward law 106a, the same processing as that of the feed-forward manipulated variable determiner 74, the actuator drive controller model 76, and the vehicle model 72 explained in the aforesaid first embodiment is carried out to determine road surface reaction forces Fmdl_i, Mmdl_i of the wheels Wi. The determined road surface reaction forces Fmdl_i, Mmdl_i are decided as the feed-forward road surface reaction forces. In this case, the last time value of the estimated road surface friction coefficient µestm determined by the aforesaid µ estimator 80 is used as the value of a road surface friction coefficient.

Supplementally, in place of the feed-forward road surface reaction force, a feed-forward manipulated variable may be determined, as with the feed-forward manipulated variable determiner 74 in the aforesaid first embodiment. In this case, the feed-forward manipulated variable may be determined, taking a state amount of the scenario vehicle model 110 into account. For instance, the ratio of a feed-forward steering control angle (a steering control angle of the front wheels W1 and W2) to a steering angle in the feed-forward manipulated variable may be set on the basis of a vehicle speed among the state amounts of the scenario vehicle model 110 (the above ratio is reduced as the vehicle speed increases), and the feed-forward steering control angle (the steering control angle of the front wheels W1 and W2) may be determined on the basis of the set ratio from a steering angle among future drive manipulation inputs.

Subsequently, the procedure proceeds to S1014 wherein a model restoration required force is determined by the scenario follow-up feedback law 106c on the basis of a difference between the (k−1)th value of the scenario state amount time series and the k-th value of the reference state amount time series. In this case, the difference between the scenario state amount and the reference state amount is calculated by the subtraction processor 106b in FIG. 14, and it is input to the scenario follow-up feedback law 106c. The model restoration required force determined by the scenario follow-up feedback low 106c is a road surface reaction force to be applied to the vehicle 1 in order to bring a scenario state amount time series close to a scenario reference state amount time series, it has a meaning as a correction amount for correcting the aforesaid feed-forward road surface reaction force in the present embodiment. The model restoration required force is determined according to, for example, a proportional control law from a difference between a scenario state amount (the (k−1)th value) and a scenario reference state amount (the k-th value). To be more specific, the model restoration required force is determined by multiplying a difference between a yaw rate (the (k−1)th value) of the vehicle 1 on the scenario vehicle model 110 and a reference yaw rate (the k-th value) by a predetermined proportional gain. Instead of the model restoration required force, correction amounts of a steering control angle and a driving/braking force corresponding to a feed-forward road surface reaction force (or a feed-forward manipulated variable) determined in S1010 may be determined. Further, as the scenario follow-up feedback law, the PD control law or the like may be used. Further, the model restoration required force may be determined on the basis of not only a yaw rate error but also a deviation amount of a position of the vehicle 1 on the scenario vehicle model 110 from a reference course (the distance between a position of the vehicle 1 and a reference course).

Subsequently, the procedure proceeds to S1016 wherein a sum of the feed-forward road surface reaction force and the model restoration required force determined as described above is determined as a provisional manipulated variable. This processing is the processing of the addition processor 106d in FIG. 14. The provisional manipulated variable has a meaning as a provisional value of a control input to the scenario actuator drive controller model 108 (an scenario actuator drive controller input) in the present embodiment.

Subsequently, the procedure proceeds to S1018 wherein a road surface reaction force expected to be generated on the scenario vehicle model 110 if the aforesaid provisional manipulated variable is input as a desired to the scenario actuator drive controller model 108 is determined. Here, in the present embodiment, the scenario actuator drive controller model 108 receives a desired value of a road surface reaction force and determines inputs (actuator manipulated variables for the actuator devices 3 (the driving/braking system model 52, the suspension dynamic characteristics model 54, and the steering control system model 60 in FIG. 2) on the scenario vehicle model 110) to the scenario vehicle model 110 so as to generate the road surface reaction force of the input desired value in the wheels W1 to W4. And, in S1018, an actuator manipulated variable for the scenario vehicle model 110 is determined from the aforesaid provisional manipulated variable by the same processing as that for the scenario actuator drive controller model 108, and based on the actuator manipulated variable, the same arithmetic processing as that for the vehicle model 72 to determine a road surface reaction force generated on the scenario vehicle model 110. This processing in S1018 and the processing in S1020 and S1022, which will be discussed later, are the processing of the road surface reaction force limiter 106e in FIG. 14.

Subsequently, the procedure proceeds to S1020 wherein it is determined whether the road surface reaction force determined as described above exceeds a permissible range. In this case, the permissible range of road surface reaction forces is set according to the same procedure as the procedure for setting the permissible ranges (the friction force permissible range and the ground contact load permissible range mentioned above) in the aforesaid distributor 88.

And, if a determination result in S1020 is YES, then the procedure proceeds to S1022 wherein the aforesaid provisional manipulated variable is corrected so that the road surface reaction force does not exceed the permissible range (a road surface reaction force generated on the scenario vehicle model 110 falls within the permissible range in S1020).

If the determination result in S1020 is NO or after the processing in S1022, the procedure proceeds to S1024 wherein a current provisional manipulated variable (the provisional manipulated variable determined in S1016 or the provisional manipulated variable corrected in S1022) is determined as a manipulated variable (control input) for the scenario actuator drive controller model 108.

Supplementally, the processing of S1016 to S1024 may be the same processing as, for example, the processing for determining a road surface reaction force compensation amount in the distributor 88 and the processing for determining an input (a desired value) to the actual actuator drive controller 76 by adding a road surface reaction force compensation amount to a feed-forward manipulated variable thereafter. The processing, however, does not have to be the same.

Meanwhile, if a control input to the scenario actuator drive controller model 108 is not a desired value of a road surface reaction force (if the control input is a feed-forward steering control angle or the like), then in S1024, the aforesaid provisional manipulated variable of the dimension of a road surface reaction force (an output of the road surface reaction force limiter 106e in FIG. 14) may be converted into a control input for the scenario actuator drive controller model 108, and the control input may be determined as a manipulated variable. The manipulated variable converter 106f in FIG. 14 carries out the conversion processing in this case.

The processing of S1012 to S1024 described above is the processing of the scenario follow-up control law 106. Thus, the scenario follow-up control law 106 determines a control input (manipulated variable) for the scenario actuator drive controller model 108 such that a state amount of a motion of the vehicle 1 on the scenario vehicle model 110 (a yaw rate in the present embodiment) is brought close to a scenario reference state amount (a reference yaw rate) while at the same time a road surface reaction force on the scenario vehicle model 110 does not exceed a predetermined permissible range.

Subsequently, the procedure proceeds to S1026 wherein a road surface reaction force to be produced in the scenario vehicle model 110 if the aforesaid manipulated variable determined in S1024 is input to the scenario actuator drive controller model 108 and a scenario state amount, which is a state amount of a motion of the vehicle 1 on the scenario vehicle model 110, are determined. This processing is the processing carried out by the scenario actuator drive controller model 108 and the scenario vehicle model 110. More specifically, the manipulated variable determined in S1024 is input as a scenario actuator drive controller input to the scenario actuator drive controller model 108, and an actuator manipulated variable for an actuator device 3 of the scenario vehicle model 110 is determined by the model 108. Subsequently, the actuator manipulated variable and a steering angle (the k-th value) of the aforesaid future drive manipulation inputs are supplied to the scenario vehicle model 110. Then, the scenario vehicle model 110 calculates a road surface reaction force and a scenario state amount (a state amount corresponding to a model vehicle body motion state amount in FIG. 2) by the same processing as that of the vehicle model 72.

Subsequently, the procedure proceeds to S1028 wherein the manipulated variable determined in S1024 and the scenario state amount and the road surface reaction force determined in S1026 are stored and retained as the k-th value of the scenario actuator drive controller input time series, the k-th value of the scenario state amount time series, and the k-th value of the scenario road surface reaction force time series, respectively. Thus, the scenario actuator drive controller input, the scenario state amount, and the scenario road surface reaction force at time t=k·Δt are set.

Subsequently, the procedure proceeds to S1030 wherein it is determined whether a value of k has reached kmax. And, if the determination result is NO, then the value of k is incremented by 1 in S1032, and the processing from S1008 is repeated. If the determination result in S1030 is YES, then the subroutine in FIG. 11 is terminated.

The above is the details of the processing in S212 of FIG. 10.

Returning to the explanation of FIG. 10, the procedure then proceeds to S214 wherein it is determined whether a course deviation, which is the amount of a deviation of a traveling route of the vehicle 1 specified by the scenario state amount time series from a reference course of the scenario reference state amount time series, satisfies a predetermined permissible range (whether the amount of a deviation is smaller than a predetermined value). In this case, the course deviation is determined as the distance between a position of the vehicle 1 at each time in the scenario state amount time series and a reference course. This processing is carried out in a scenario evaluator (not shown) provided in the scenario preparer 98. And, if the determination result in S214 is NO, then the procedure proceeds to S216 wherein the scenario actuator drive controller input time series, the scenario road surface reaction force time series, and the scenario state amount time series are corrected so that the course deviation satisfies a permissible range associated therewith. For instance, if the course deviation deviates from a permissible range (e.g., in a case where sliding off a course is likely to take place when making a steady turn), then the time series of scenario actuator drive controller inputs is set in the scenario follow-up control law 106 such that, even if the time series of a brake manipulated variable out of the time series of future drive manipulation inputs is maintained at zero, a negative driving/braking, i.e., a braking force, is generated in the first half of a scenario so as to decelerate the vehicle before making the turn. This processing is carried out in the scenario follow-up control law changer provided in the scenario preparer 98. Further, a scenario road surface reaction force time series and a scenario state amount time series are newly determined through the intermediary of the scenario actuator drive controller model 108 and the scenario vehicle model 110 on the basis of the time series of the scenario actuator drive controller input that has been set as described above. Thus, a course deviation in a scenario can be restrained.

Incidentally, it may be determined in S214 whether a scenario road surface reaction force satisfies a predetermined permissible range. In this case, the permissible range of the scenario road surface reaction force is set to, for example, a permissible range that is narrower than the permissible range in S1222 of FIG. 18.

After the processing of S216 or if the determination result in S214 is YES, then the procedure proceeds to S218 wherein a value at time t=Δt, that is, a value corresponding to the present time, in the time series of the scenario actuator drive controller model inputs is output as the current time value of the feed-forward manipulated variable (a feed-forward manipulated variable as an output of the scenario preparer in FIG. 8).

The above is the details of the scenario preparer 98.

In the present embodiment, the actuator drive controller 78 of the actual vehicle 1 receives the feed-forward manipulated variable and the road surface reaction force compensation amount Fcmpn_i determined as described above, and takes the resultant force thereof (more specifically, the resultant force of a feed-forward road surface reaction force corresponding to a feed-forward manipulated variable and the road surface reaction force compensation amount Fcmpn_i) as the desired value of a road surface reaction force, and determines a manipulated variable of an actuator of each actuator device 3 (a driving/braking device 3A with motive power distribution control function, an active steering device 3B, and an active suspension device 3C) of the actual automobile 70 such that an actual road surface reaction force agrees with or approximates the desired value. And, the actuator of each actuator device 3 is operated on the basis of the manipulated variable.

Further, a sensory feedback indicator 90 in the present embodiment informs a driver of not only, for example, a change amount of a feed-forward manipulated variable (a feed-forward road surface reaction force) based on a virtual external force but also a change by adding an additional manipulated variable to an actuator of power steering or a braking assist device in response to the course deviation in the scenario preparer 98.

The control processing of the controller 10 other than that explained above is the same as that in the aforesaid first embodiment.

The third embodiment explained above provides the same operations and advantages as those of the first embodiment and determines a feed-forward manipulated variable according to a scenario while creating the scenario. This arrangement controls a motion of the vehicle 1 so that a road surface reaction force falls within a permissible range while predicting a future behavior of the vehicle 1, thus making it possible to further enhance the robustness of vehicle control. Moreover, a scenario is determined such that the aforesaid model restoration required force causes a scenario state amount time series to follow a scenario reference state amount time series, thus making it possible to prevent a state amount of a model vehicle body motion of the vehicle model 72 from getting away from a reference state amount that is close to an ideal state amount. This allows motions of the actual automobile 70 to approximate ideal motions.

Supplementally, the third embodiment is an embodiment of the first invention, the second invention, the fourth invention to the eleventh invention, and the thirteenth invention of the present invention. In this case, feed-forward manipulated variables output by the scenario preparer 98 correspond to basic control inputs for an actual automobile. The future input time series determiner 100 corresponds to a future drive manipulated variable determining means in the thirteenth invention (a future drive manipulation input corresponds to a future drive manipulated variable). The scenario reference dynamic characteristics model 102 corresponds to a reference motion determining means in a seventeenth invention or an eighteenth invention. The aforesaid model restoration required force corresponds to a model restoration compensation amount, and a difference in state amount for determining the model restoration required force (a difference in yaw rate in the third embodiment) corresponds to a second state amount error. In the third embodiment, as with the case explained in relation to the first embodiment, in place of the virtual external forces Fvirt, Mvirt, a manipulated variable for an actuator device on the vehicle model 72 (i.e., a correction amount of the aforesaid model actuator manipulated variable), which provides an advantage equivalent to that obtained by applying the virtual external force to the vehicle 1 on the vehicle model 72, may be determined and the determined manipulated variable may be supplied to the vehicle model 72 as a vehicle model manipulation control input. This makes it possible to construct the third invention or the twelfth invention.

Fourth Embodiment

A fourth embodiment in accordance with the present invention will now be explained with reference to FIG. 15 through FIG. 20. The present embodiment differs from the aforesaid third embodiment only in a part of the control processing of the controller 10, so that the same reference numerals as those of the third embodiment will be used for the same components or the same functional parts, and detailed explanation thereof will be omitted.

FIG. 15 is a block diagram showing the functional construction of a controller 10 in the fourth embodiment. As illustrated, the present embodiment is equipped with, in addition to the functional construction of the controller 10 in the third embodiment, a reference dynamic characteristics model 120 that prepares a reference state amount of a motion of a vehicle 1 for each control cycle on the basis of a drive manipulation input (a steering angle in the present embodiment). This reference dynamic characteristics model 120 is a model having the same structure as that of the scenario reference dynamic characteristics model 102 explained in the third embodiment. And, a reference state amount (a latest reference state amount) output from the reference dynamic characteristics model 120 is input to the scenario preparer 98 as an initial state amount of the aforesaid scenario reference dynamic characteristics model of the scenario preparer 98.

Further, in the fourth embodiment, the scenario preparer 98 determines a current state acceptance manipulated variable as a control input for bringing a state amount of the reference dynamic characteristics model 120 close to a state amount of a vehicle model 72, and supplies the determined manipulated variable to the reference dynamic characteristics model 120.

Of the functional construction of a controller 10, the processing of sections other than the reference dynamic characteristics model 120 and the scenario preparer 98 is the same as that in the third embodiment. The following will explain the processing of the reference dynamic characteristics model 120 and the scenario preparer 98 in the fourth embodiment.

FIG. 16 is a block diagram showing the functional construction of the scenario preparer 98 in the fourth embodiment. As illustrated, the scenario preparer 98 is equipped with a future input time series determiner 100, a scenario reference dynamic characteristics model 102, a follow-up control law 106, a scenario actuator drive controller model 108, and a scenario vehicle model 110, as with the aforesaid third embodiment. However, according to the fourth embodiment, in the follow-up control law 106, a scenario current state acceptance manipulated variable, which is a current state acceptance manipulated variable in a scenario, is generated at each time of the scenario, and the scenario current state acceptance manipulated variable is input to the scenario reference dynamic characteristics model 102, as will be discussed hereinafter.

The following will explain the details of the processing of the scenario preparer 98 and the reference dynamic characteristics model 120 in the present embodiment. FIG. 17 and FIG. 18 are flowcharts showing the processing of the reference dynamic characteristics model 120 and the scenario preparer 98 in the present embodiment.

The following will provide the explanation. In S310, a time series of future drive manipulation inputs is determined. This processing is the same as the processing in S210 of FIG. 10 described above, and it is carried out by the future drive input time series determiner 100.

Subsequently, in S312, a current state acceptance manipulated variable determined in a last time control cycle and a current time drive manipulation input (a current time value of a steering angle) are input to the reference dynamic characteristics model 120 so as to determine a new reference state amount. This processing is the processing in the reference dynamic characteristics model 120.

Here, in the present embodiment, the current state acceptance manipulated variable is, for example, a control input of the dimension of a moment about a yaw axis, and it is input to the reference dynamic characteristics model 120 as Mvirt in the aforesaid expression 50b. Further, Fvirt in the aforesaid expression 50a in the reference dynamic characteristics model 120 is steadily set to zero. The current state acceptance manipulated variable may include a translational force component, such as a lateral force. And, the reference dynamic characteristics model 120 determines a reference yaw rate and a reference course as new reference state amounts by the processing of the same procedure as that in the scenario reference dynamic characteristics model 102 in the aforesaid third embodiment. However, in this case, when calculating a side slip angle $\beta$ and a yaw rate $\omega z$ according to expressions 50a and 50b, the current state acceptance manipulated variable input to the reference dynamic characteristics model 120 is set as the value of Mvirt in expression 50b. Only this aspect is different from the processing of the scenario reference dynamic characteristics model 102 in the third embodiment.

Subsequently, in S314, the scenario preparer 98 determines a scenario reference state amount time series, a scenario actuator drive controller input time series, a scenario current state acceptance manipulated variable time series, a scenario road surface reaction force time series, and a scenario state amount time series. This S314 is processing that corresponds to S212 of FIG. 10 described above, and the meanings of the scenario reference state amount time series, the scenario actuator drive controller input time series, the scenario road surface reaction force time series, and the scenario state amount time series are the same as those in S212. The time series of scenario current state acceptance manipulated variable is a control input for bringing a state amount of the scenario reference dynamic characteristics model 102 close to a state amount of the scenario vehicle model 110 on a scenario (for preventing the state amounts of the two from getting apart from each other), and it corresponds to a current state acceptance manipulated variable input to the aforesaid reference dynamic characteristics model 120. Processing after this S314 is the processing carried out by the scenario preparer 98.

The processing in S314 is carried out by the subroutine processing shown by the flowchart of FIG. 17. This processing in FIG. 17 differs from the aforesaid processing in FIG. 11 only in a part of processing; therefore, the processing thereof that is different from the processing in FIG. 11 will be mainly explained.

First, in S1202, the initial state amounts (the state amounts at time t=0 of the scenario reference dynamic characteristics model 102 are set to agree with latest state amounts of the aforesaid reference dynamic characteristics model 120. More specifically, in the present embodiment, the 0th values of the time series of the state amounts of the scenario reference dynamic characteristics model 102 are initialized with the latest state amounts of the reference dynamic characteristics model 120. The latest state amounts of the reference dynamic characteristics model 120 are the state amounts determined in the aforesaid S312 and are the current time state amounts of the reference dynamic characteristics model 120.

Supplementally, in the aforesaid third embodiment, the state amounts of the scenario reference dynamic characteristics model 102 have been initialized with the latest vehicle model state amounts.

Subsequently, in S1204, the same processing as that in S1004 of FIG. 11 described above is carried out to initialize the scenario vehicle model 110.

Subsequently, the procedure proceeds to S1206 wherein the current state acceptance manipulated variables output from the scenario preparer 98 at the last time control cycle (the first values of the scenario current state acceptance manipulated variable time series determined at the last time control cycle) are stored and retained as the 0th values of the scenario current state acceptance manipulated variables at the current time control cycle. This processing is a processing added in the present embodiment.

Subsequently, after the value of k is set to 1 in S1208, the loop processing from S1210 to S1236 is carried out.

In S1210, the k-th values of the future drive manipulation input time series (the values at t=k·$\Delta$t) and the (k−1)th values of the scenario current state acceptance manipulated variable time series (the values at t=(k−1)·$\Delta$t) are input to the scenario reference dynamic characteristics model 102 so as to determine new reference state amounts. This processing is carried out by the scenario reference dynamic characteristics model 102 in the present embodiment. The processing is carried out according to the same procedure as that for determining reference state amounts by the aforesaid reference dynamic characteristics model 120. However, as Mvirt of the aforesaid expression 50b in this case, the (k−1)th values of the scenario current state acceptance manipulated variable time series are used. By the processing in S1210, a reference yaw rate and a reference course are determined as new reference state amounts.

Subsequently, the procedure proceeds to S1212 wherein the new reference state amounts determined in S1210 are stored and retained as the k-th values of the time series of the reference state amounts in the scenario. This processing is the same as that in S1010 of FIG. 11.

Subsequently, the processing from S1214 to S1228 is carried out by the scenario follow-up control law 106 in the present embodiment. In the present embodiment, processing for determining scenario current state acceptance manipulated variables at each time of the scenario is carried out in addition to carrying out the processing similar to that of the scenario follow-up control law 106 in the third embodiment. The functional construction of the scenario follow-up control law 106 in the present embodiment is illustrated by the block diagram of FIG. 19. The scenario follow-up control law 106 has a scenario current state acceptance manipulated variable determiner 106g in addition to the functional construction of FIG. 14 described above.

The following will explain in detail the processing by the scenario follow-up control law 106 in the present embodiment with reference to FIG. 19 and the flowchart of FIG. 18.

First, from S1214 to S1226, the same processing as that of S1012 to S1024 in FIG. 11 is carried out. These processing is the processing by the scenario follow-up feed-forward law 106a, the subtraction processor 106b, the scenario follow-up feedback law 106c, the addition processor 106d, the scenario road surface reaction force limiter 106e, and the manipulated variable converter 106f, as explained in the aforesaid third embodiment. However, as with the third embodiment, the processing by the manipulated variable converter 106f is omitted in the present embodiment.

Subsequently, the procedure proceeds to S1228 wherein a scenario current state acceptance manipulated variable is determined according to a feedback law, such as the PD control law on the basis of the difference between the (k−1)th value of the scenario state amount time series and the k-th value of the reference state amount time series (the time series output from the scenario reference dynamic characteristics model 102)(this is determined by the subtraction processor 106b of FIG. 19). This processing is the processing carried out by the scenario current state acceptance manipulated variable determiner 106g of FIG. 19.

By the processing in S1228, a scenario current state acceptance manipulated variable is determined as a moment amount about the yaw axis according to the PD control law from, for example, the difference between a yaw rate among scenario reference state amounts and a yaw rate among reference state amounts. Alternatively, a scenario current state acceptance manipulated variable may be determined on the basis of not only a difference in yaw rate but also the amount of deviation of the position of the vehicle 1 from a reference course among scenario reference state amounts.

The processing from S1214 to S1228 described above is the processing by the scenario follow-up control law 106 in the present embodiment.

Subsequently, the procedure proceeds to S1230 wherein the same processing as that in S1026 of FIG. 11 described above is carried out to determine a road surface reaction force and a scenario state amount generated on a scenario vehicle model.

Subsequently, the procedure proceeds to S1232 wherein the manipulated variable determined in S1226, the scenario current state acceptance manipulated variable determined in S1228, and the scenario state amount and the road surface reaction force determined in S1230 are stored and retained as the k-th value of the scenario actuator drive controller input time series, the k-th value of the scenario current state acceptance manipulated variable time series, the k-th value of the scenario state amount time series, and the k-th value of the scenario road surface reaction force time series, respectively. Thus, the scenario actuator drive controller input, the scenario current state acceptance manipulated variable, the scenario state amount, and the scenario road surface reaction force at time t=k·Δt are determined.

Subsequently, the loop processing of S1210 to S1236 is carried out until the values of k reach kmax via the processing in S1234 and S1236, which are the same processing as those in S1030 and S1032 of FIG. 11.

The above is the details of the processing in S314 of FIG. 17. In the present embodiment, the initial state amounts of the scenario reference dynamic characteristics model 102 are set to the latest state amounts of the reference dynamic characteristics model 120 to which the current state acceptance manipulated variables determined as described above are input. Thus, the time series of a reference state amount (e.g., a reference yaw rate) output from the scenario reference dynamic characteristics model 102 at each control cycle is different from the case of the aforesaid third embodiment, and it is created with an intermediate value between a latest value of a yaw rate in a past scenario up to the initial time and a latest value of a yaw rate on the vehicle model 72 up to the initial time as the starting point thereof as shown by, for example, the solid lines in the graph after the initial time in FIG. 20.

Returning to the explanation of FIG. 17, the processing in S316 and S318 are then carried out. These processing are the same as the processing in S214 and S216 of FIG. 10.

Subsequently, the procedure proceeds to S320 wherein the value of the scenario current state acceptance manipulated variable time series at time t=Δt determined in S314 is output as a current state acceptance manipulated variable (a current state acceptance manipulated variable to be input to the aforesaid reference dynamic characteristics model 120). Supplementally, this value is used for processing in S1210 at the next control cycle, as described above.

Subsequently, the same processing as that in S218 of FIG. 10 is carried out in S322, and a current time value of a feed-forward manipulated variable (a feed-forward manipulated variable as an output of the scenario preparer 98 in FIG. 15) is output.

The control processing by the controller 10 other than those explained above is the same as that in the aforesaid third embodiment.

The fourth embodiment described above provides the same advantages as those of the third embodiment and also gradually brings a reference state amount created by the reference dynamic characteristics model 120 close to a state amount of the vehicle model 72 by the aforesaid current state acceptance manipulated variable. This makes it possible to make a motion of the actual automobile 70 follow a motion of the vehicle 1 on the vehicle model 72 while bringing a state amount of a model vehicle body motion of the vehicle model 72 close to a reference state amount. As a result, the control robustness of the actual automobile 70 can be further enhanced relatively easily.

Supplementally, the fourth embodiment is an embodiment of the first invention, the second invention, the fourth invention to the eleventh invention, the thirteenth invention, and the fifteenth invention to the eighteen invention in the present invention. In this case, a feed-forward manipulated variable output by the scenario preparer 98 corresponds to a basic control input for an actual automobile. The future input time series determiner 100 corresponds to a future drive manipulated variable determining means in the thirteenth invention (a future drive manipulation input corresponds to a future drive manipulated variable). The reference dynamic characteristics model 120 corresponds to a reference motion determining means in the fifteenth invention or the seventeenth invention. The scenario reference dynamic characteristics model 102 corresponds to a second vehicle model in the fifteenth invention, and the scenario vehicle model 110 corresponds to a third vehicle model in the fifteenth invention. Further, the scenario follow-up control law 106, the scenario actuator drive controller model 108, and the scenario vehicle model 110 correspond to a future vehicle behavior predicting means. And, a scenario road surface reaction force time series and a scenario state amount lastly output from the scenario vehicle model 110 correspond to a future behavior of the first vehicle model (the vehicle model 72). The fourth embodiment, as with the case explained in relation to the first embodiment, in place of the virtual external forces Fvirt, Mvirt, a manipulated variable for an actuator device on the vehicle model 72 (i.e., a correction amount of the aforesaid model actuator manipulated variable), which provides an advantage equivalent to that obtained by applying the virtual external force to the vehicle 1 on the vehicle model 72, may be determined and the determined manipulated variable may be supplied to the vehicle model 72 as a vehicle model manipulation control input. This makes it possible to construct the third invention or the twelfth invention.

Fifth Embodiment

A fifth embodiment in accordance with the present invention will now be explained with reference to FIG. 21 through FIG. 24. The present embodiment differs from the fourth embodiment only in a part of the processing of the controller 10, so that the same reference numerals as those in the fourth embodiment will be used for the same components or the same functional parts as those in the fourth embodiment, and detailed explanation thereof will be omitted.

FIG. 21 is a block diagram showing the functional construction of a controller 10 in the present embodiment. In the present embodiment, the actuator drive controller model 76 and the vehicle model 72 provided in the fourth embodiment are omitted. Further, the error calculator 84, the error cancellation control law 86, and the distributor 88 are omitted outside the scenario preparer 98, whereas functions equivalent thereto are incorporated in the scenario preparer 98. And, in the present embodiment, an actuator drive controller 78 controls each actuator device 3 of an actual automobile 70 on the basis of manipulated variables (control inputs) output from the scenario preparer 98 to the actuator drive controller 78.

The functional construction of the controller 10 other than that described above is the same as that shown in FIG. 15.

A schematic functional construction of the scenario preparer 98 is the same as that shown in FIG. 16 described above. However, in the present embodiment, the processing of a scenario follow-up control law 106 is different from that explained in the fourth embodiment.

FIG. 22 and FIG. 23 are flowcharts showing the processing of the scenario preparer 98 and a reference dynamic characteristics model 120 in the present embodiment. The following will explain it. First, processing in S410 and S412 are carried out. These processing are the same as the processing in S310 and S312 of FIG. 17.

Subsequently, the procedure proceeds to S414 wherein the scenario preparer 98 determines a scenario reference state amount time series, a scenario actuator drive controller input time series, a scenario current state acceptance manipulated variable time series, a scenario road surface reaction force time series, and a scenario state amount time series. This S414 is processing that corresponds to S314 of FIG. 17 mentioned above. The processing after this S414 is the processing carried out by the scenario preparer 98.

The processing in S414 is carried out by the subroutine processing shown by the flowchart in FIG. 23. This processing in FIG. 23 differs from the aforesaid processing in FIG. 18 only in a part of processing, so that the explanation will be focused-on the processing that is different from the processing in FIG. 18.

First, in S1402, the same processing as S1202 in FIG. 18 is carried out to initialize a scenario reference dynamic characteristics model.

Subsequently, the procedure proceeds to S1404 wherein a scenario vehicle model 110 is initialized. In this case, according to the present embodiment, when initializing the scenario vehicle model 110, a state amount of the scenario vehicle model 110 is set to agree with an actual state amount of an actual automobile 1 obtained by the aforesaid sensor observer 82.

Subsequently, the procedure proceeds to S1406 and S1408 wherein the same processing in S1206 and S1208, respectively, of FIG. 18 are carried out.

Subsequently, the loop processing of S1410 to S1436 is carried out. In the loop processing, first, in S1410 and S1412, the same processing as S1210 and S1212 of FIG. 18 (the processing by the scenario reference dynamic characteristics model 102) is carried out to determine new reference state amounts at time $t=k \cdot \Delta t$.

Subsequently, the processing from S1414 to S1428 is carried out by a scenario follow-up control law 106 in the present embodiment. The functional construction of the scenario follow-up control law 106 in the present embodiment is shown by the block diagram in FIG. 24. The scenario follow-up control law 106 is equipped with a scenario follow-up feed-forward law 106a, a subtraction processor 106b, an error cancellation control law 106h, a distributor 106i, and an addition processor 106j. In this case, the scenario follow-up feed-forward law 106a and the subtraction processor 106b are functional sections that perform the aforesaid same processing as those shown in FIG. 19. Meanwhile, the error cancellation control law 106h, the distributor 106i, and the addition processor 106j are functional sections that are peculiar to the scenario follow-up control law 106 in the present embodiment.

The following will explain in detail the processing by the scenario follow-up control law 106 in the present embodiment with reference to FIG. 24 and the flowchart of FIG. 23.

First, in S1414, the processing by the scenario follow-up feed-forward law 106a is carried out to determine a feed-forward road surface reaction force. This processing is the same as the aforesaid processing in S1214 of FIG. 18.

Subsequently, the procedure proceeds to S1416 wherein the error cancellation control law 106h determines an error canceling compensation amount on the basis of the difference between a (k−1)th value of a scenario state amount time series and a k-th value of a reference state amount time series (a time series output from the scenario reference dynamic characteristics model 102)(this is determined by the subtraction processor 106b). This error canceling compensation amount corresponds to an error canceling compensation amount in the first through the fourth embodiments described above, and it means a control input for bringing a state amount of a motion of the vehicle 1 on the scenario vehicle model 110 close to a reference state amount (an output from the scenario reference dynamic characteristics model 102). In the present embodiment, from, for example, a difference between a yaw rate of the vehicle 1 on the scenario vehicle model 110 and a yaw rate out of reference state amounts, an error canceling compensation amount is determined by a feedback law, such as the PD control law. In this case, the error canceling compensation amount is, for example, a control input of the dimension of a moment about a yaw axis.

Incidentally, an error canceling compensation amount may be determined on the basis of not only a difference in yaw rate but also the amount of deviation of the position of the vehicle 1 on the scenario vehicle model 110 from a reference course among reference state amounts (course deviation).

Subsequently, the processing from S1418 to S1428 is carried out by the distributor 106i and the addition processor 106j. First, in S1418, the distributor 106i takes the sum of a feed-forward road surface reaction force and an error canceling compensation amount as a provisional manipulated variable (a provisional value of a control input to the scenario actuator drive controller model 108). More specifically, a road surface reaction force expected be obtained when a road surface reaction force is additionally generated on the basis of an actuator manipulated variable to satisfy an error canceling compensation amount is defined as the road surface reaction force associated with the error canceling compensation amount, and the sum of this and the feed-forward road surface reaction force is defined as a provisional manipulated variable.

Subsequently, the procedure proceeds to S1420 wherein the distributor 106i determines a road surface reaction force expected to be generated on the scenario vehicle model 110 when the provisional manipulated variable is input as a desired value to the scenario actuator drive controller model 108. This processing is carried out according to the same procedure as that in S1220 of FIG. 18 described above.

Subsequently, the procedure proceeds to S1422 wherein it is determined whether the road surface reaction force determined in S1420 exceeds a predetermined permissible range. In this case, the permissible range of road surface reaction force is set in the same manner as in the case of the processing by the distributor 88 explained in the aforesaid first embodiment on the basis of a road surface reaction force (ground contact load) at time t=(k−1)·Δt on the scenario vehicle model 110 and an estimated road surface friction coefficient μestm (a last time value in the present embodiment) input to the scenario preparer 98 from a μ estimator 80.

At this time, if the determination result in S1422 is YES, then the procedure proceeds to S1424 wherein the aforesaid provisional manipulated variable is corrected such that the road surface reaction force does not exceed the permissible range (such that the road surface reaction force generated on the scenario vehicle model 110 falls within the permissible range in S1420).

More specifically, the distributor 106i determines a road surface reaction force compensation amount Fcmpn_i, Mcmpn_i by the same processing as the processing by the distributor 88 explained in the aforesaid first embodiment. Then, in the addition processor 106j, a result obtained by adding the road surface reaction force compensation amount Fcmpn_i, Mcmpn_i to the feed-forward road surface reaction force is obtained as the manipulated variable after the correction of the aforesaid provisional manipulated variable. In this case, the road surface reaction force compensation amount Fcmpn_i, Mcmpn_i is determined such that the sum of it and the feed-forward road surface reaction force falls within the aforesaid permissible range in S1420 and that the difference between the sum and the provisional manipulated variable (=the difference between the road surface reaction force compensation amount and the aforesaid error canceling compensation amount determined in S1416) is minimized.

If the determination result in S1420 is NO or after the processing in S1422, the procedure proceeds to S1426 wherein the current provisional manipulated variable (the provisional manipulated variable determined in S1418 or the provisional manipulated variable corrected in S1424) is determined as the manipulated variable (control input) for the scenario actuator drive controller model 108. Incidentally, if a control input to be actually input to the scenario actuator drive controller model 108 is not a control input of the dimension of a road surface reaction force, then the manipulated variable determined in S1420 is converted (in FIG. 24, a manipulated variable converter is not shown).

Subsequently, the procedure proceeds to S1428 wherein a scenario current state acceptance manipulated variable is determined on the basis of the difference between the manipulated variable determined in S1426 and the aforesaid provisional manipulated variable. This processing is carried out by the distributor 106i. Specifically, the difference between the manipulated variable and the provisional manipulated variable is multiplied by a predetermined gain Kmdl to determine the scenario current state acceptance manipulated variable. Before determining the difference between the manipulated variable and the provisional manipulated variable, the manipulated variable and the provisional manipulated variable are respectively converted into forces acting on the total center of gravity of the vehicle 1, and then the difference is determined.

Supplementally, the gain Kmdl may take a constant value, but if k is 2 or more, then the gain Kmdl may be set to zero. If the gain Kmdl is always set to zero regardless of the value of k, then the scenario current state acceptance manipulated variable will be always zero, so that the reference dynamic characteristics model 120 and the scenario reference dynamic characteristics model will not be influenced by actual state amounts of the actual automobile 70.

The processing from S1414 to S1428 described above is the processing by the scenario follow-up control law 106 in the present embodiment.

Subsequently, in S1430 and S1432, the aforesaid same processing as S1230 and S1232 in FIG. 18 is carried out. Further, the loop processing of S1410 to S1436 is carried out until a value of k reaches kmax via S1434 and S1436, which are the same processing as those in S1234 and S1236 of FIG. 18.

The above is the details of the processing in S414 of FIG. 22.

Returning to the explanation of FIG. 22, subsequently, the processing in S416, S418, and S420 are carried out. These processing are the same as the processing in S316, S318, and S420 of FIG. 17.

Subsequently, the procedure proceeds to S422 wherein the scenario preparer 98 outputs the value at time t=Δt of the scenario actuator drive controller input time series (that is, the value associated with the present time) as the manipulated variable (control input) for the actual actuator drive controller 78.

In this case, according to the present embodiment, the actuator drive controller 78 controls the operation of each actuator device 3 of the actual automobile 70 on the basis of the manipulated variable (the manipulated variable output in S422).

The control processing by the controller 10 other than that explained above is the same as that in the aforesaid fourth embodiment.

According to the fifth embodiment, a motion of the actual automobile 70 is controlled on the basis of a current state acceptance manipulated variable such that a state amount of a motion of the actual automobile 70 follows a reference state amount while restraining the deviation of a reference state amount output from the reference dynamic characteristics model 120 from the state amount of the motion of the actual automobile 70. Furthermore, a motion of the actual automobile 70 is controlled such that a road surface reaction force falls within a permissible range, while predicting a future behavior of the vehicle 1. Thus, as with the third embodiment, the robustness of vehicle control can be enhanced while bringing a motion of the actual automobile 70 close to an ideal motion.

Supplementally, the fifth embodiment is an embodiment of the first invention, the second invention, the fourth invention to the eleventh invention, the thirteenth invention, and the fourteenth invention. In this case, according to the embodiment, the reference dynamic characteristics model 120 corresponds to a first vehicle model, the scenario reference dynamic characteristics model 102 corresponds to a second vehicle model, and a scenario vehicle model 110 corresponds to a third vehicle model. Further, in the present embodiment, the scenario preparer 98 includes a vehicle model motion determining means and a state amount error reaction control means. More specifically, in the present embodiment, an initial state amount of a scenario vehicle model is set to agree with a latest state amount of the actual automobile 70, so that the difference between a scenario state amount and a reference state amount determined in S1416 when k=1 will correspond to a first state amount error. And, a manipulated variable and a current state acceptance manipulated variable determined on the basis of this difference by the processing of S1418 to S1428 correspond to a control input for manipulating an actual automobile actuator and a control input for manipulating a vehicle model, respectively. Further, the scenario follow-up control law 106, the scenario actuator drive controller model 108, and the scenario vehicle model 110 in the scenario preparer 98 correspond to a future vehicle behavior predicting means. In addition, a scenario road surface reaction force time series and a scenario state amount lastly output from the scenario vehicle model 110 correspond to a future behavior of the third vehicle model (the scenario vehicle model 110). In the fifth embodiment, a control input (manipulated variable) to the scenario actuator controller model 108 has been a control input of the dimension of a road surface reaction force; alternatively, however, a control input of the dimension of a manipulated variable of an actuator device 3 on the scenario vehicle model 110 may be determined.

Several modifications related to the embodiments explained above will now be explained.

In the first to the fifth embodiments described above, a virtual external force has been applied to the vehicle body 1B (the portion above the spring of the vehicle 1) of the vehicle 1 of the vehicle model 72; however, it is also possible to apply a virtual external force to the wheels W1 to W4 on the vehicle model 72. This, however, causes the behaviors or road surface reaction forces of the wheels W1 to W4 in the vehicle model 72 to significantly deviate from the behaviors or road surface reaction forces of the wheels W1 to W4 of the actual automobile 70; therefore, a virtual external force is desirably applied to the vehicle body 1B on the vehicle model 72. The same applies to the scenario vehicle model 110.

Further, in the embodiments, instead of applying a virtual external force to the vehicle body 1B, an additional ground contact load corresponding to the virtual external force may be applied to the wheels W1 to W4 on the vehicle model 72. In other words, a ground contact load corresponding to a virtual external force to be applied to the vehicle body 1B of the vehicle model 72 may be generated by operating an actuator of a suspension system model. With this arrangement, if the actual vehicle 1 is subjected to an unexpected road surface reaction force due to an unexpected undulation of a road surface and the actual vehicle 1 develops a behavior of an unexpected posture or height, a virtual external force will be determined such that the vehicle 1 of the vehicle model 72 follows the behavior. And, applying an additional ground contact load to the vehicle model 72 accordingly will cause the road surface reaction force (especially a ground contact load) of the vehicle model 72 to substantially agree with an actual road surface reaction force. The same applies to the scenario vehicle model 110.

Further, in the first to the fourth embodiments described above, if an actual actuator device 3 is incapable of independently manipulating all components of a road surface reaction force, then this restriction may be added as a condition of the processing by the distributor 88 to determine a road surface reaction force compensation amount Fcmpn_i. For example, if the actual vehicle 1 does not have the active suspension device 3C, then the following expression 28 may be added as a condition of the arithmetic processing by the distributor 88.

$$\text{Fcmpn\_z\_i}=0 \quad (i=1, 2, 3, 4) \qquad \text{Expression 28}$$

Further, if, for example, the steering device 3B does not actively steer control the rear wheels W3 and W4, then the following expression 29 may be added as a condition of the arithmetic processing by the distributor 88.

$$\text{Fcmpn\_y\_3}=\text{Fcmpn\_y\_4}=0 \qquad \text{Expression 29}$$

Further, if, for example, the driving/braking device 3A is not capable of actively controlling the torque distribution between the two front wheels W1 and W2, then the following expression 30 may be added as a condition of the arithmetic processing by the distributor 88.

$$\text{Fcmpn\_x\_1}=\text{Fcmpn\_x\_2}=0 \qquad \text{Expression 30}$$

The same modifications related to the distributor 88 as described above apply to the distributor 106i in the fifth embodiment.

In the aforesaid embodiments, the explanations have been given, taking an automobile equipped with an engine as an example; however, as previously mentioned, the present invention can be of course applied to hybrid cars and electric cars. Furthermore, the present invention can be applied also to a vehicle having a plurality of wheels, such as a two-wheeled or a three-wheeled vehicle, in addition to the four-wheeled-wheels.

The method for determining (the method for distributing) a road surface reaction force compensation amount and a virtual external force in the distributor 88 and the method for preparing a scenario in the scenario preparer 98 in the first to the fourth embodiments described above may use selecting means, such as switches, which are operated to make selective changes, or it may adopt an arrangement for automatic change according to situations, or it may adopt an arrangement whereby the steering characteristics of a driver is learnt and changes are made according thereto. The same applies to the distributor 106i in the fifth embodiment.

In the distributor 88 of the first to the fourth embodiments described above, some components of an error canceling compensation amount may be fed back only one of the actual automobile 70 (specifically, the actual actuator drive controller 78) or the vehicle model 72. For instance, if the suspension device 3C of the actual automobile 70 is not an active suspension device, then all components about the axis in the roll direction (the X axis) of the moment component Mstab of an error canceling compensation amount may be fed back to the vehicle model 72.

Further, if a predetermined component of an error canceling compensation amount is within a predetermined range (a dead zone)(if it is close to zero), then a result obtained by multiplying the predetermined component of an error canceling compensation amount by (−1) may be defined as the predetermined component of a virtual external force and an actuator manipulated variable (an output of the actual actuator drive controller 78) of the actual automobile 70 relative to the predetermined component of the error canceling compensation amount may be set to zero. In other words, if a predetermined component of an error canceling compensation amount lies in a predetermined dead zone, then the actuator manipulated variable of the actual automobile 70 related to the predetermined component is set to zero so as to restrain the actuator from being frequently actuated. This makes it possible to restrain wasteful energy consumption or prolong the life of the actuator.

As the vehicle model 72, models other than those in the embodiments described above may be used. For example, in the first embodiment, and the third embodiment to the fifth embodiments described above, if a tilt of the vehicle body (a posture angle in the roll direction and a posture angle in the pitch direction) is ignored, then the aforesaid two-wheeled model may be used in place of the vehicle model 72. In this case, a permissible range for a resultant force of road surface reaction forces acting on the two front wheels and a permissible range for a resultant force of road surface reaction forces acting on the two rear wheels may be set as the permissible range of road surface reaction forces.

Further, the vehicle model 72 may be a perturbation model (linearization model) for perturbation from a predetermined state (e.g., a present actual state).

Further, the vehicle model 72 may be a model that produces air resistances based on vehicle speeds.

Regarding the actuator drive controller model 76 and the models (the aforesaid driving/braking system model and the like) of the actuator devices 3, the actuators of an actual actuator drive controller and an actual actuator device that are modeled generally have response delays or nonlinearity. However, those models may be adapted to indicate ideal responses (responses that are free of delays or nonlinearity) relative to desired inputs (a desired road surface reaction force, an axle torque, and the like). In this case, a transfer function from a desired input to an output of an actuator is 1. In other words, the model in this case is a straight wire.

As a means for detecting or estimating a condition of a road surface, a means for detecting or estimating a tilt of a road surface may be provided in addition to the µ estimator 80. And, a feed-forward manipulated variable or a motion of a vehicle model may be determined, taking also the tilt of the road surface into account. This makes it possible to control motions of the vehicle 1 further accurately.

Further, a dummy actuator, which does not exist as an actual actuator, and its drive controller may be included in a vehicle model and an actuator drive controller model.

Vehicle parameters, including the effective radius of each tire, tire characteristics, such as inertias, and the weight distribution of a vehicle body (the position of total center of gravity and an inertia about the center of gravity) used for calculating motions of a vehicle model do not necessarily have to be set to fixed predetermined values. The values of the parameters may be identified and corrected while a vehicle is traveling.

In the processing by the scenario preparer 98 in the third to the fifth embodiments described above, if an estimated friction coefficient is low, then a ratio of the curvature of a reference course to a steering angle is desirably set to be small. This makes it possible to restrain a spin caused by oversteering by a driver.

In the third to the fifth embodiments described above, a scenario has been prepared on the basis of drive manipulation inputs; alternatively, however, a destination may be set by a navigation system and a scenario may be prepared on the basis thereof. In this case, the navigation system is a manipulating device operated by a driver to steer a vehicle. The manipulating device may be place apart from the vehicle, and the vehicle may be remotely steered through the intermediary of a radio communication system.

INDUSTRIAL APPLICABILITY

As described above, the present invention is usefully applied to permit proper control of motion state amounts, such as a yaw rate and a traveling course, of a vehicle with high control robustness.

Figure 1:
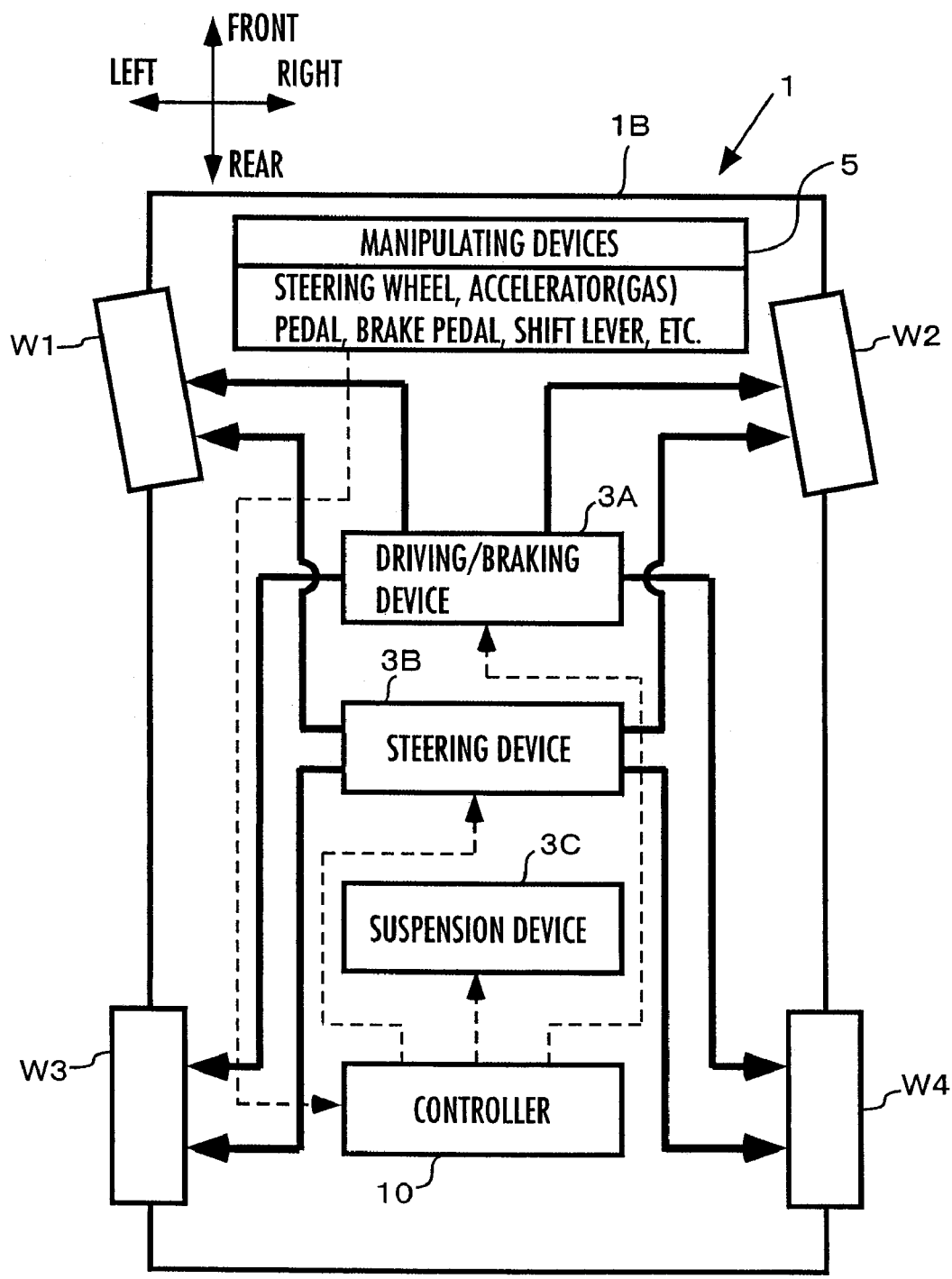
FIG. 1 is a block diagram showing a schematic construction of a vehicle in an embodiment of the present invention.
Figure 2:
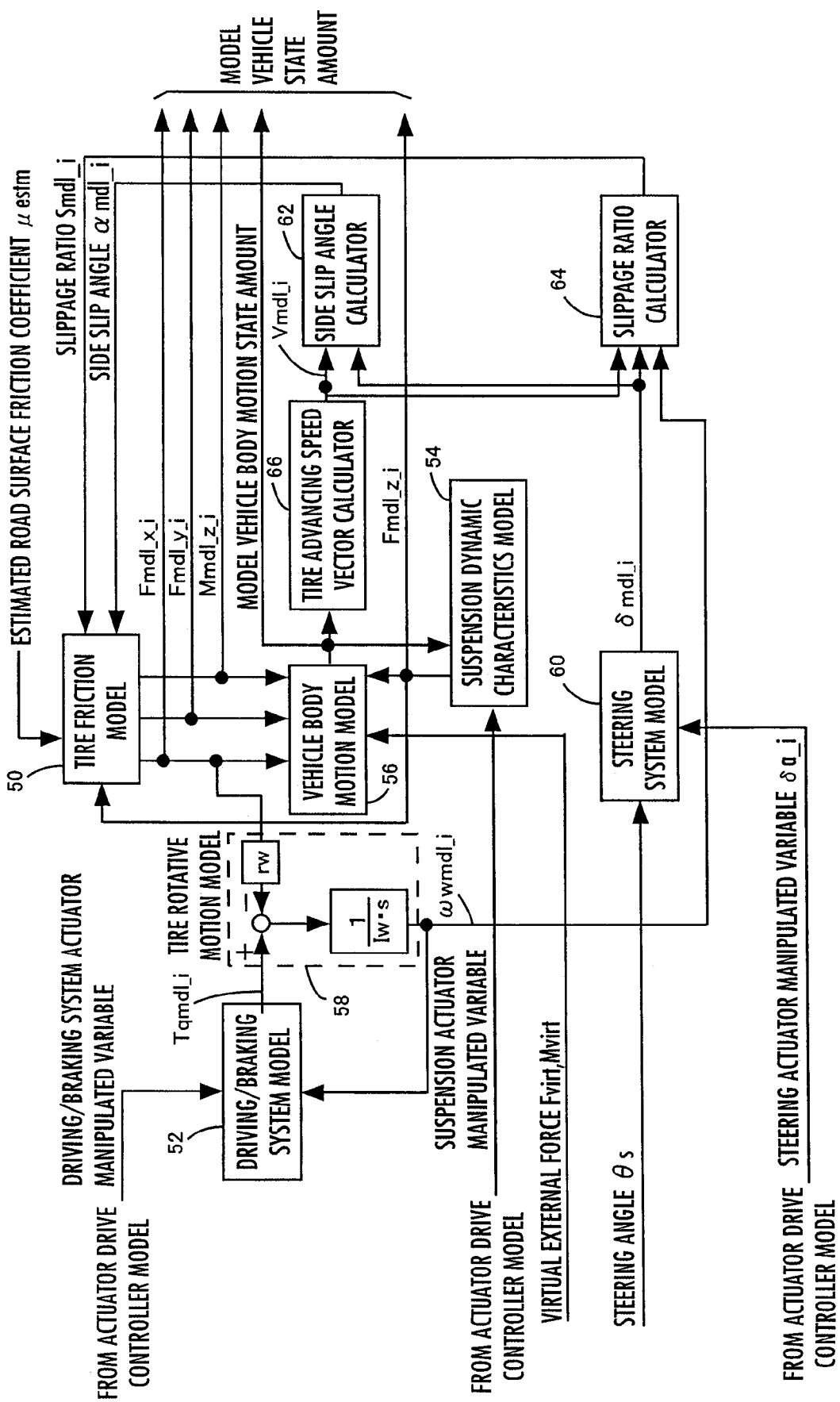
FIG. 2 is a block diagram showing a functional construction of a vehicle model in an embodiment of the present invention.
Figure 3:
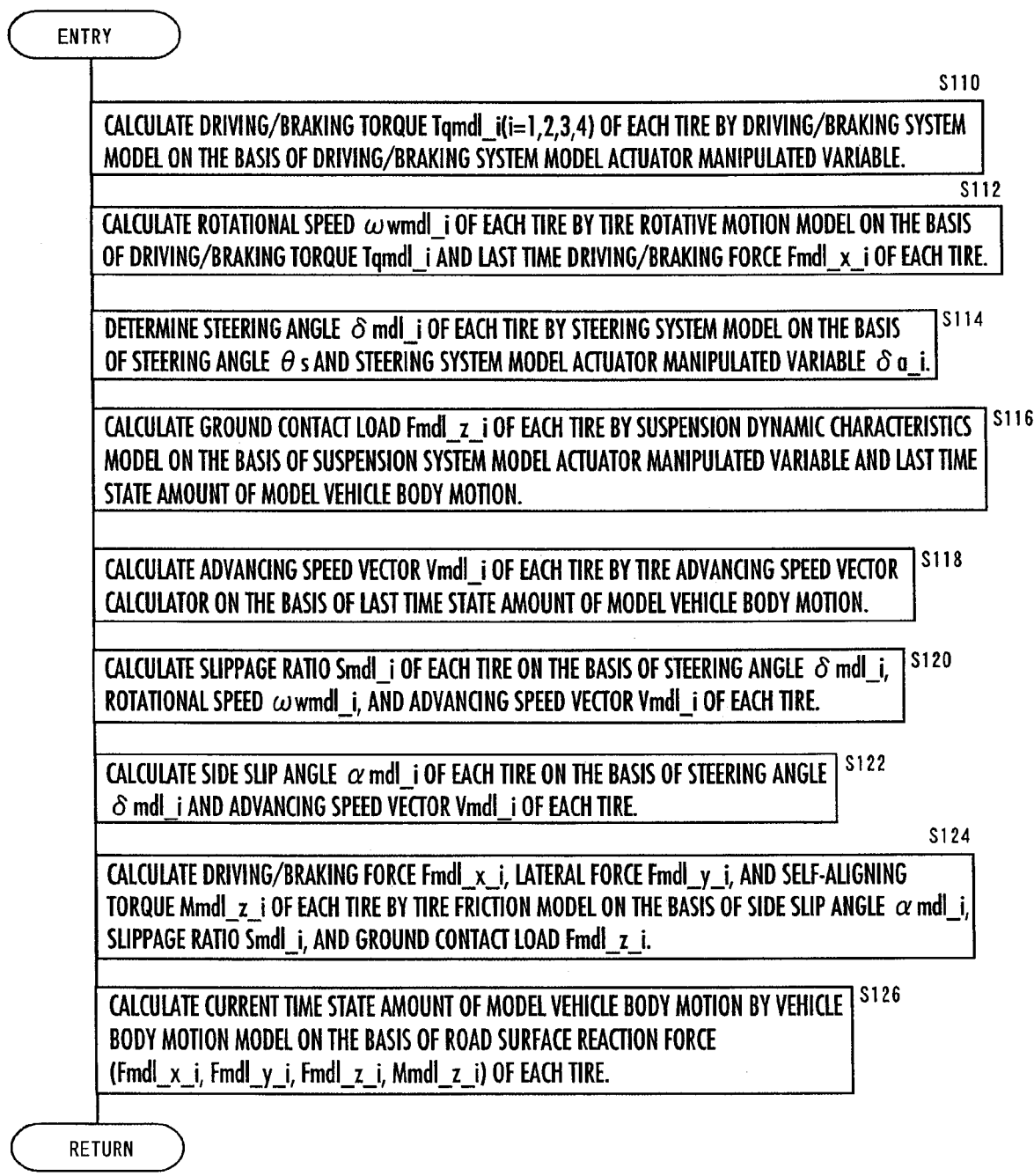
FIG. 3 is a flowchart showing arithmetic processing of the vehicle model of FIG. 2.
Figure 4:
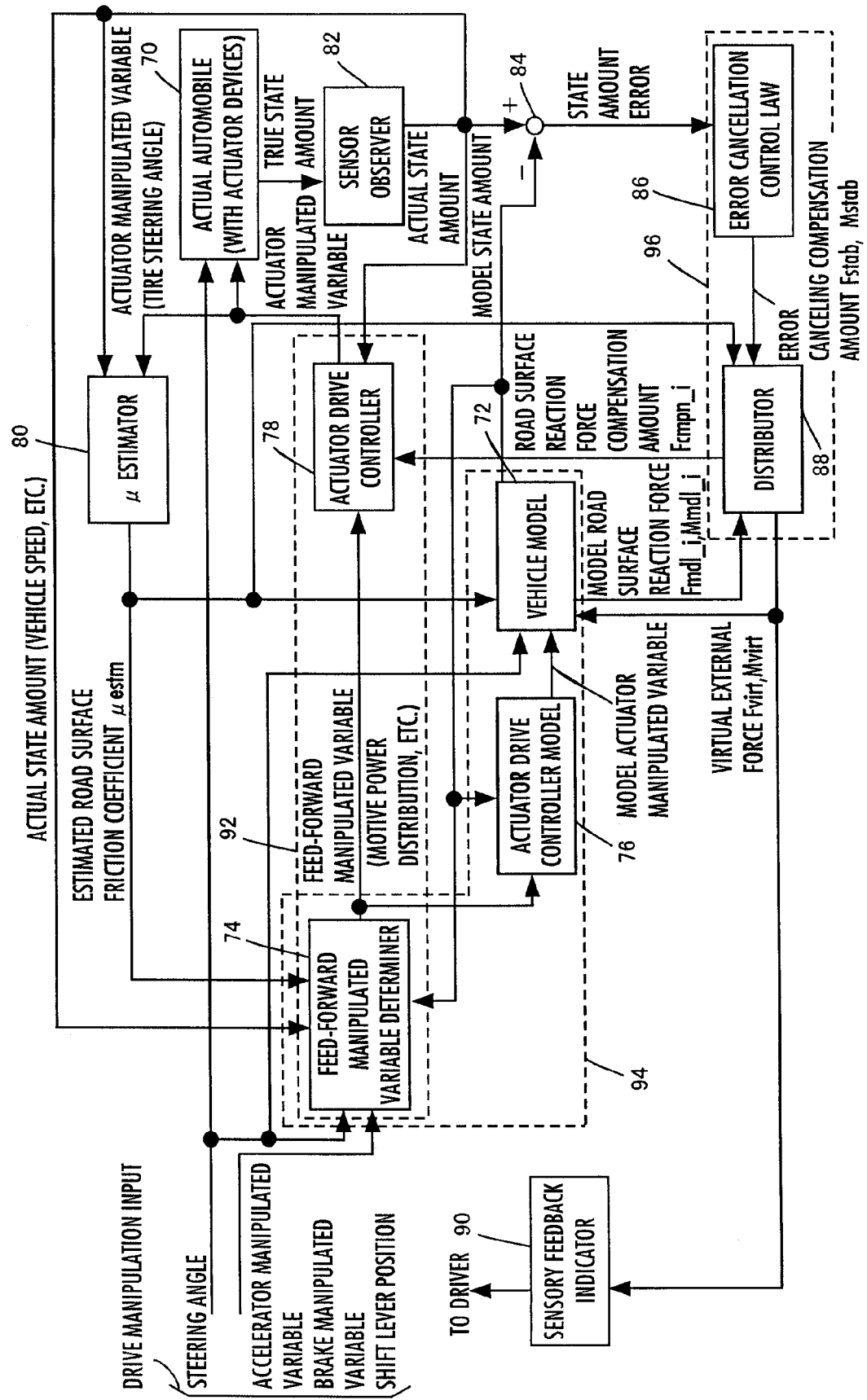
FIG. 4 is a block diagram showing a functional construction of an entire controller of a vehicle in a first embodiment.
Figure 5:
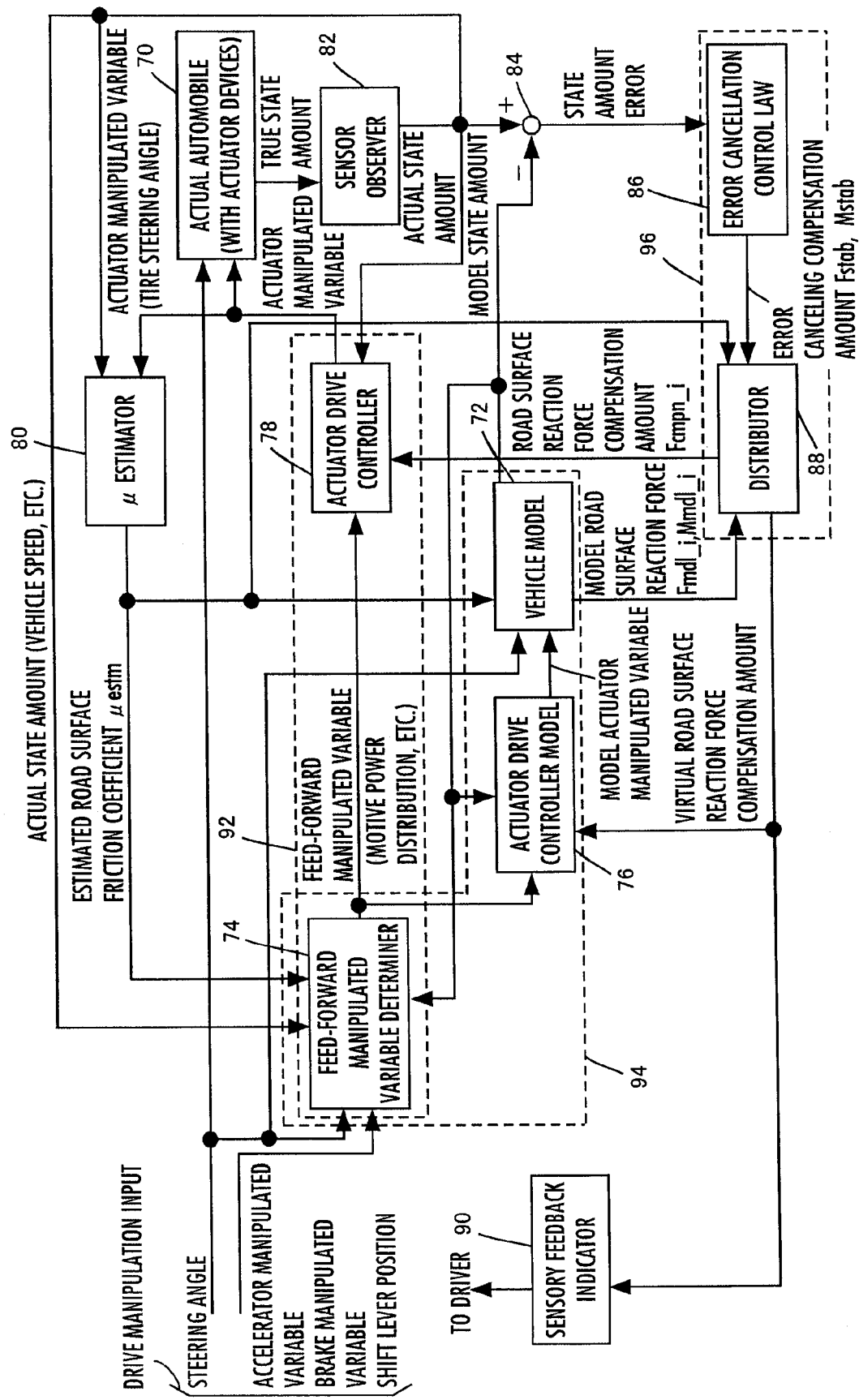
FIG. 5 is a block diagram showing a functional construction of an entire controller of a vehicle related to a modification of the first embodiment.
Figure 6:
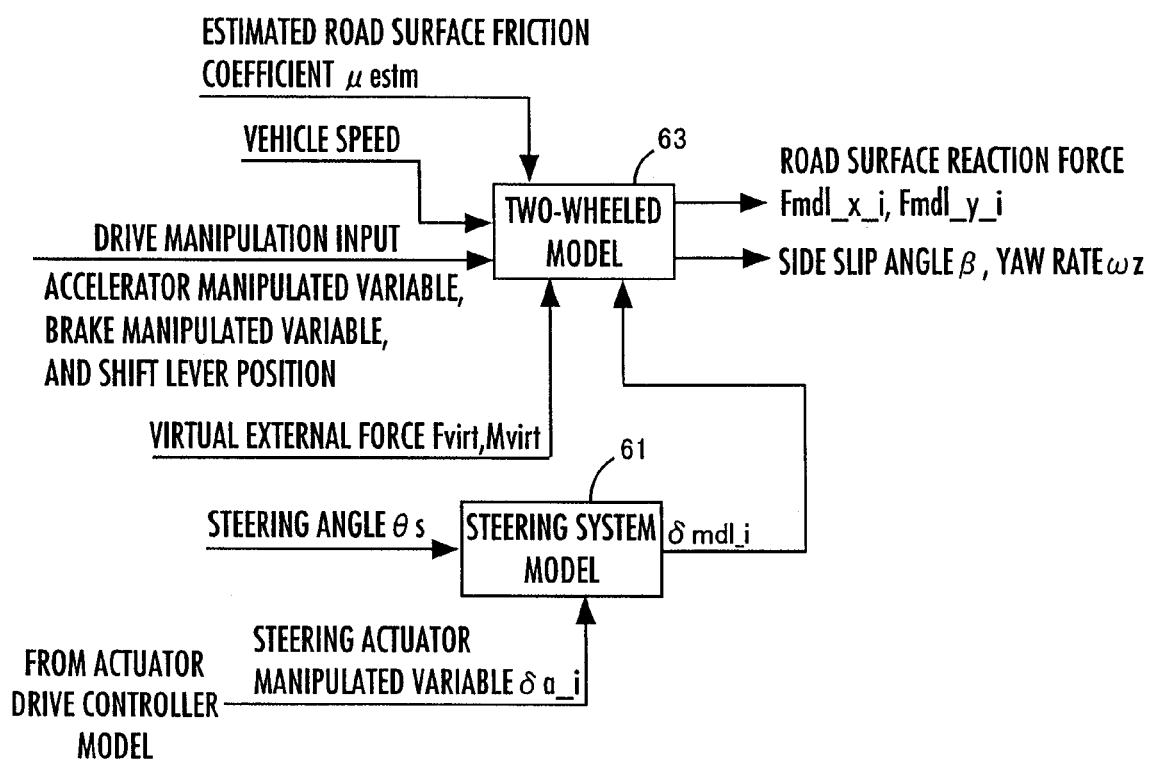
FIG. 6 is a block diagram showing a functional construction of a vehicle model in a second embodiment.
Figure 7:
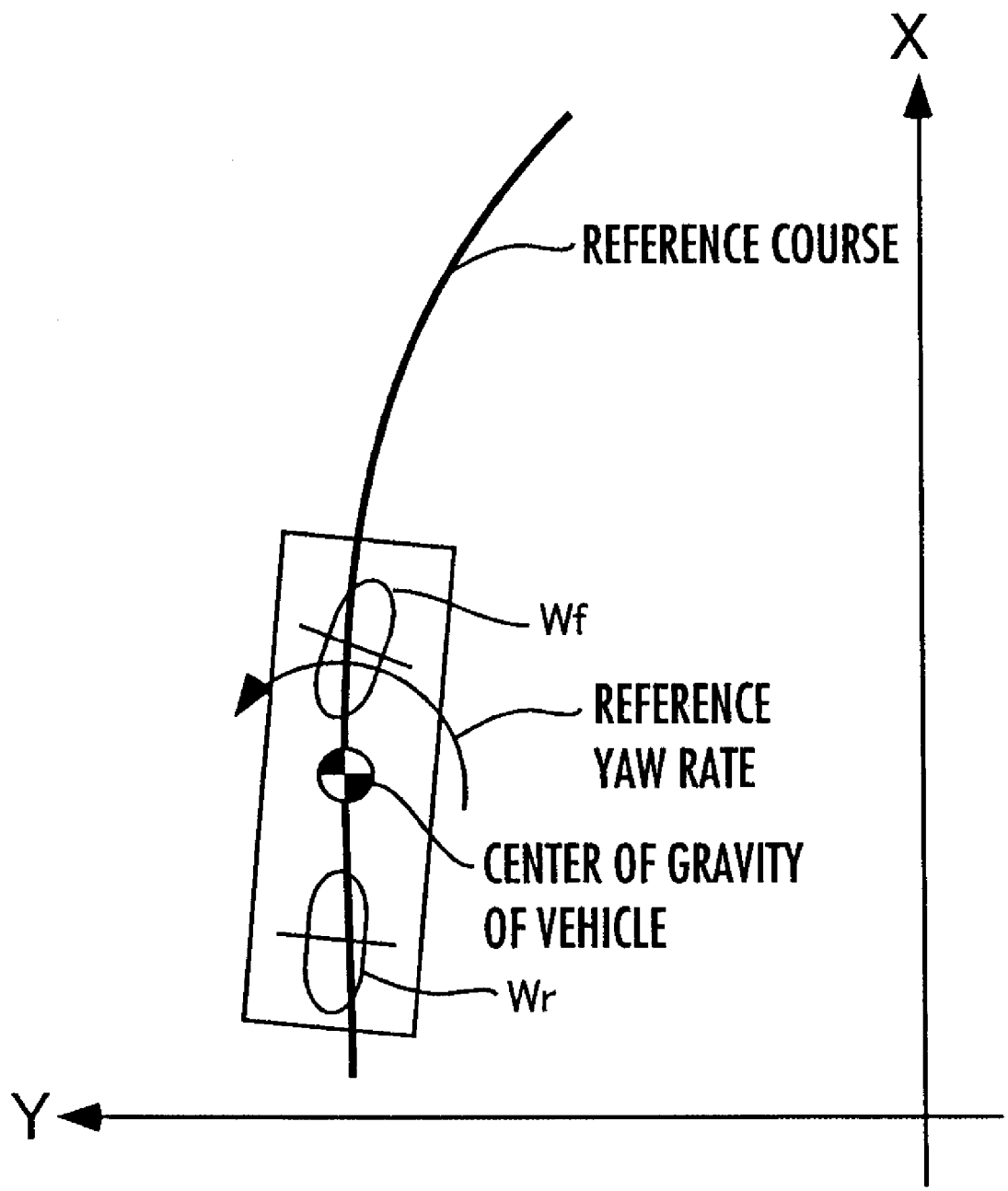
FIG. 7 is a diagram for explaining a two-wheeled model (a model of two degrees of freedom) in the second embodiment or a third to a fifth embodiments.
Figure 8:
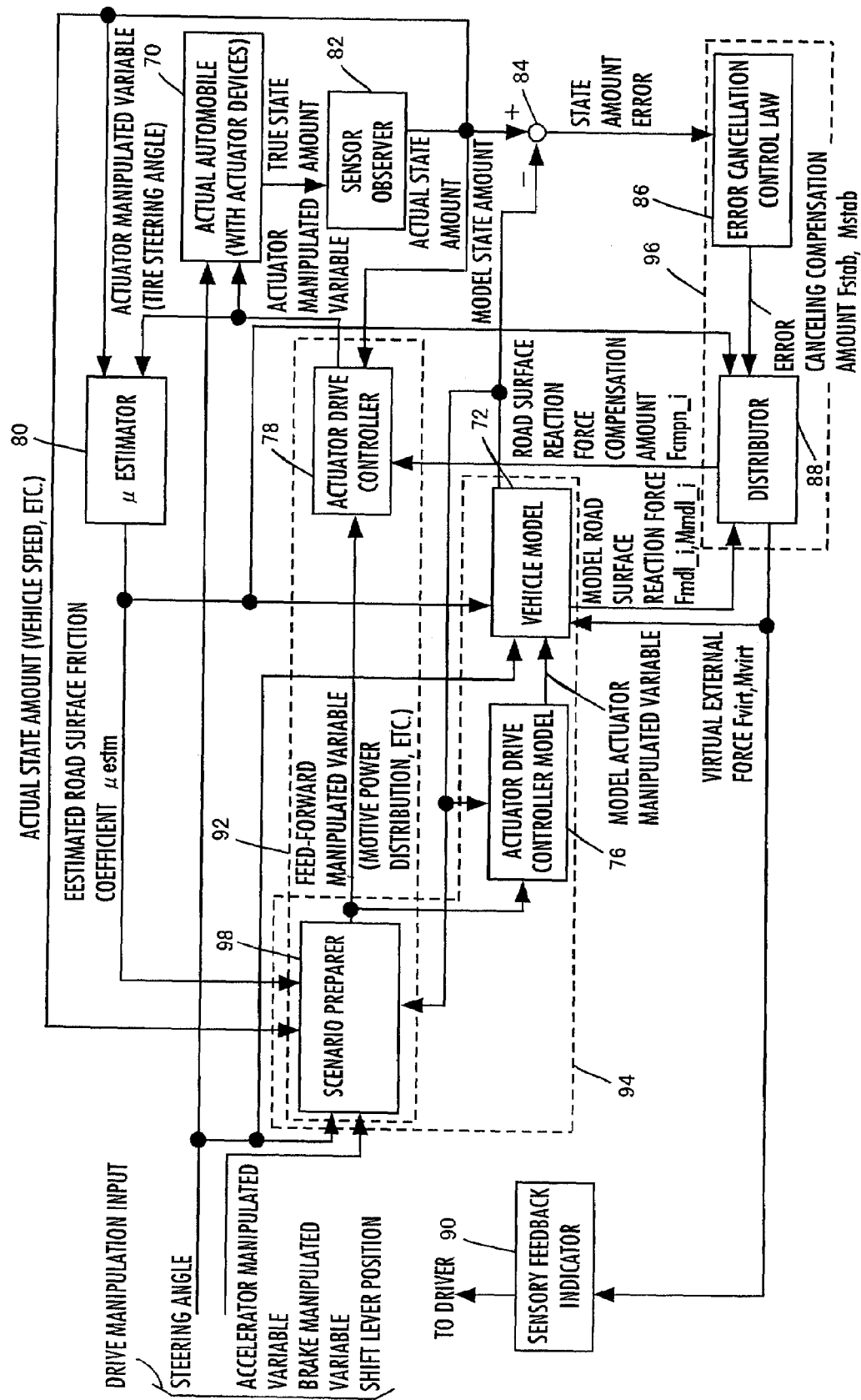
FIG. 8 is a block diagram showing a functional construction of an entire controller of a vehicle in a third embodiment.
Figure 9:
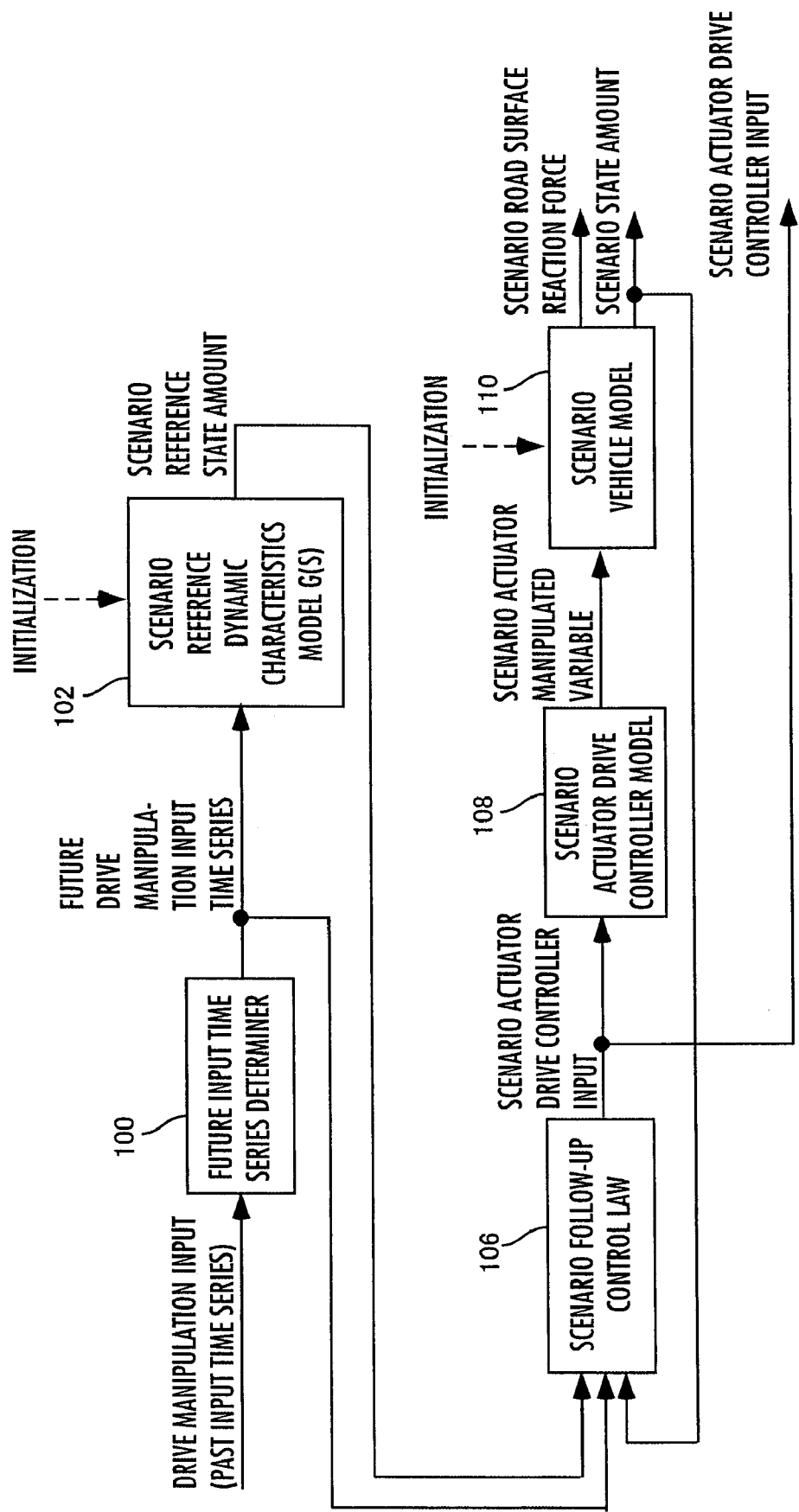
FIG. 9 is a block diagram showing a functional construction of a scenario preparer provided in the controller of the third embodiment.
Figure 10:
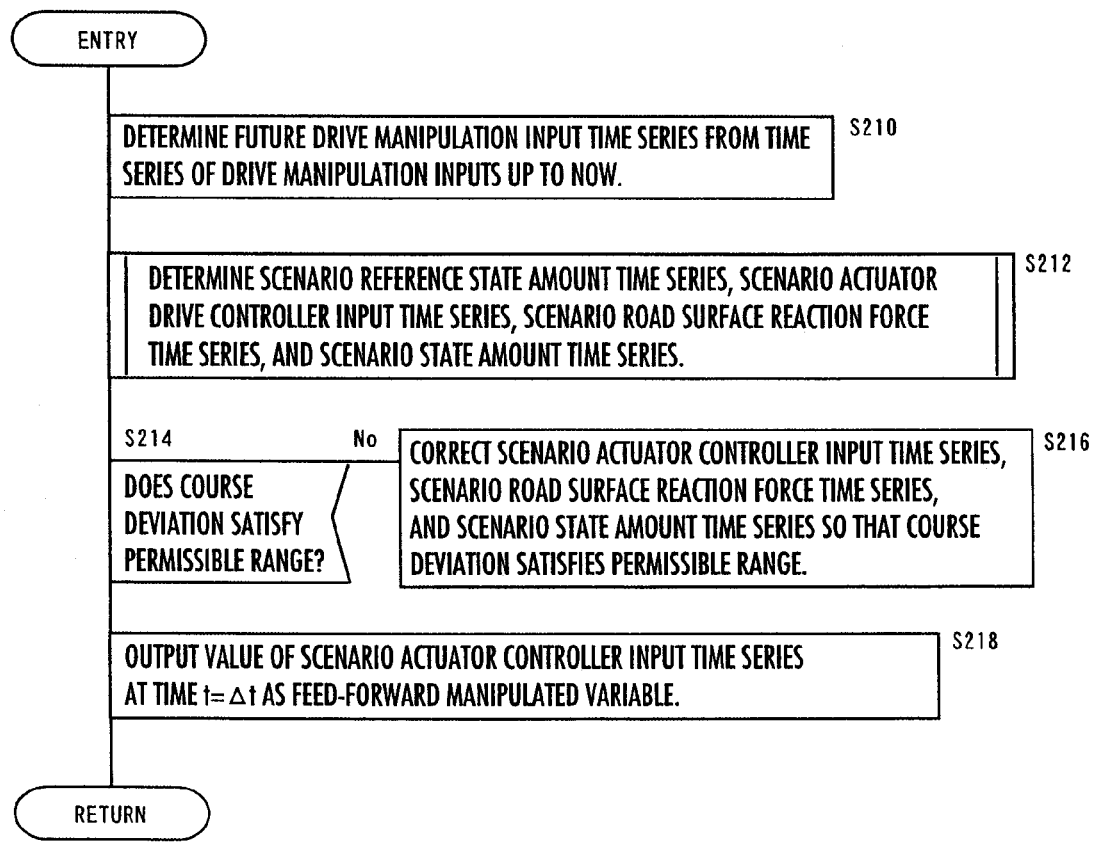
FIG. 10 is a flowchart showing the processing by the scenario preparer in the third embodiment.
Figure 11:
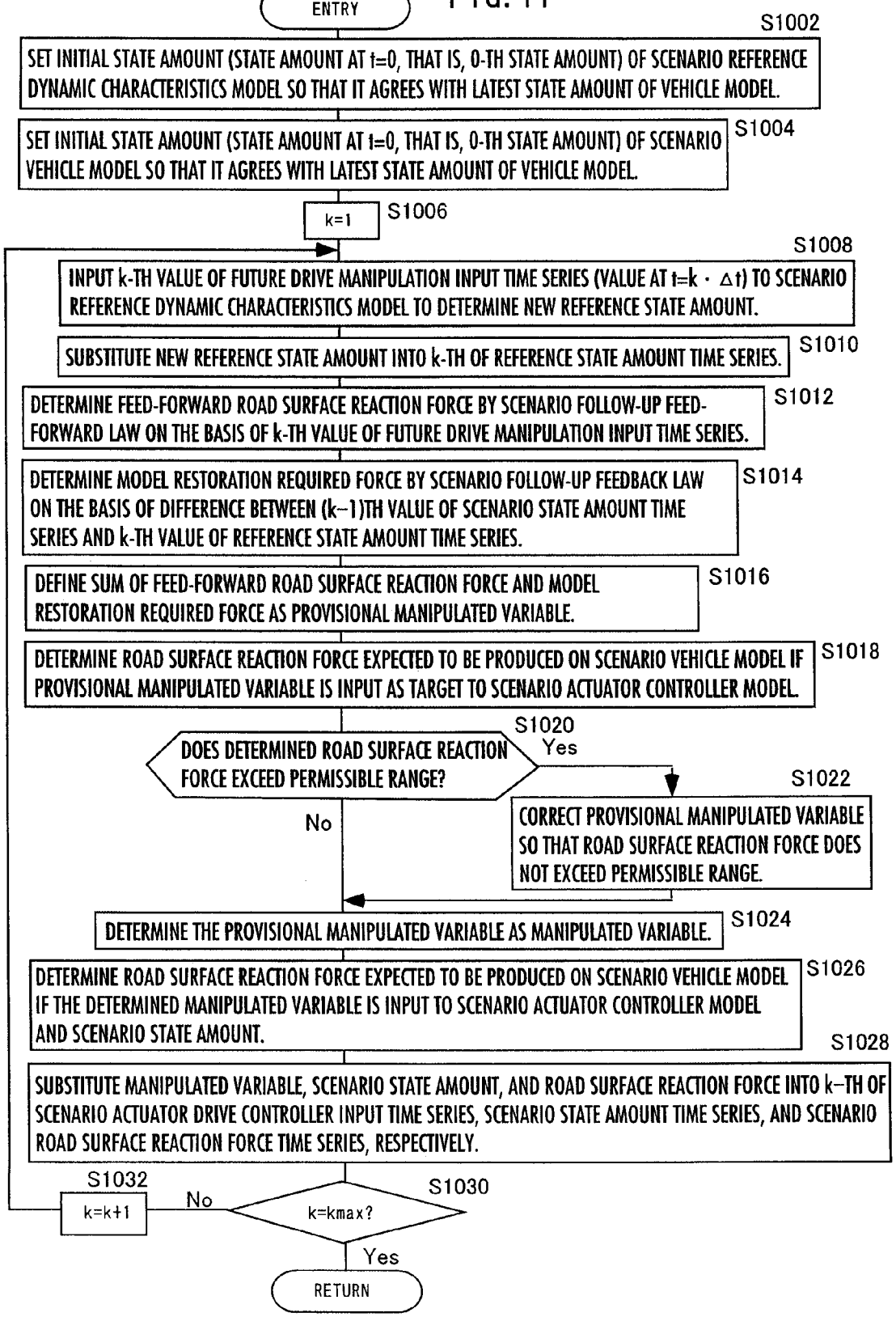
FIG. 11 is a flowchart showing the subroutine processing in S212 of the flowchart in FIG. 10.
Figure 12:
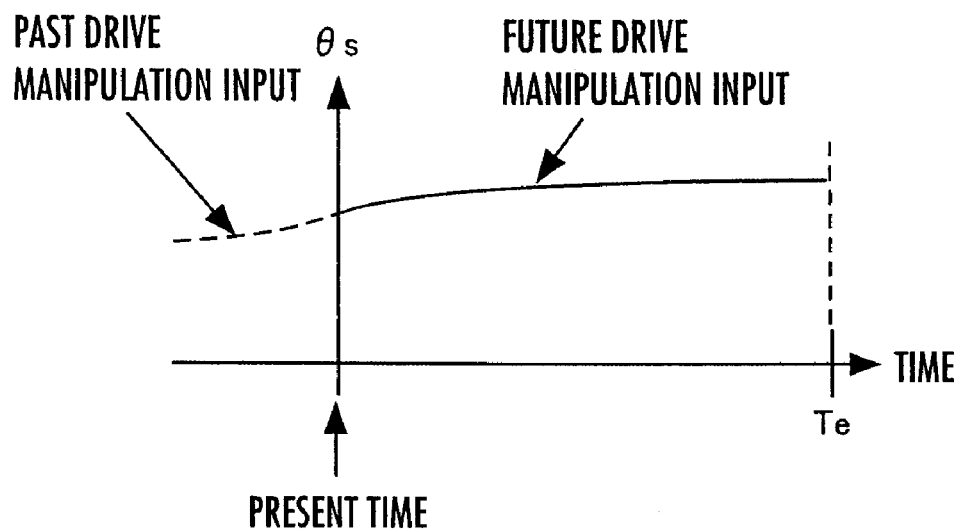
FIG. 12 is a graph for explaining the processing by the scenario preparer in the third embodiment.
Figure 13:
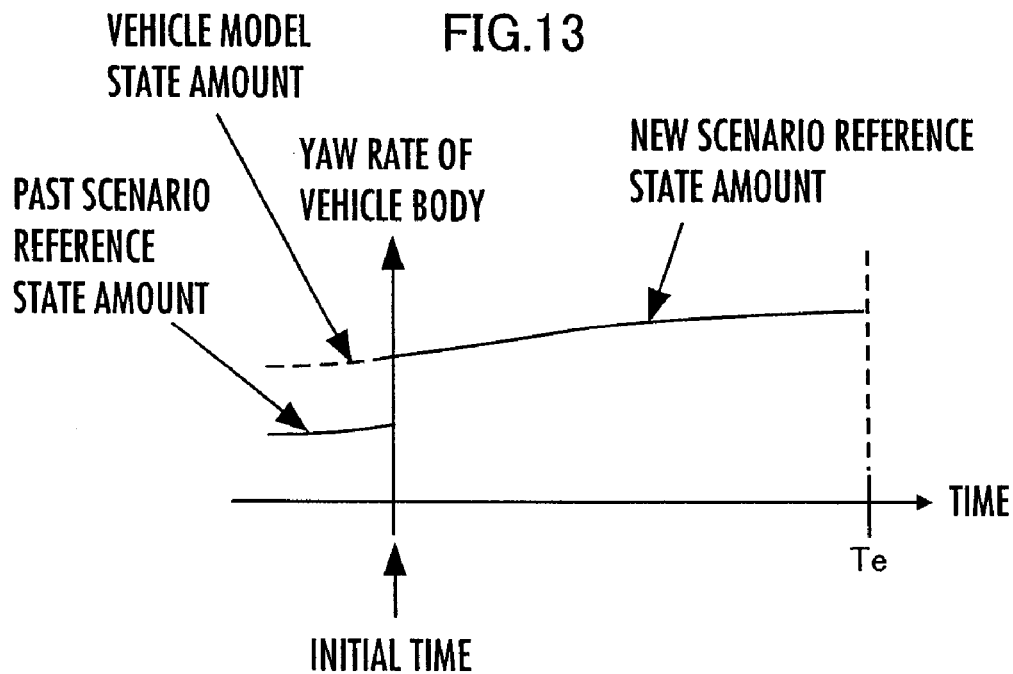
FIG. 13 is a graph for explaining the processing by the scenario preparer in the third embodiment.
Figure 14:
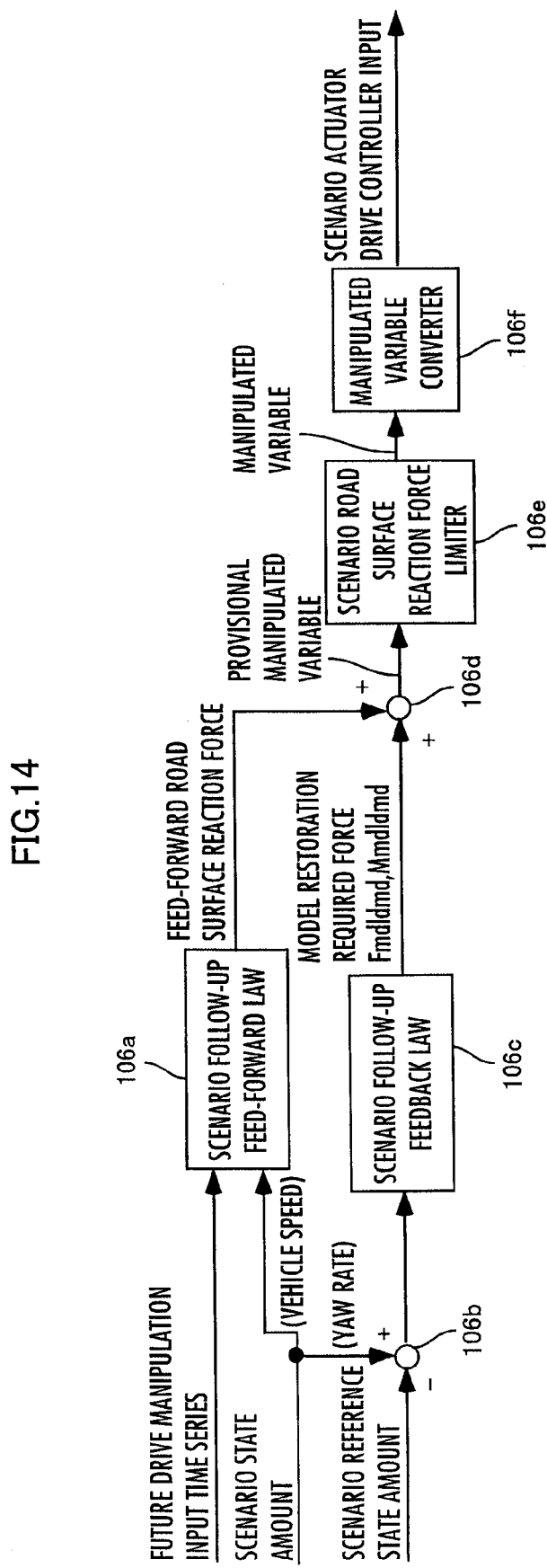
FIG. 14 is a block diagram showing a functional construction of a scenario follow-up control law shown in FIG. 9.
Figure 15:
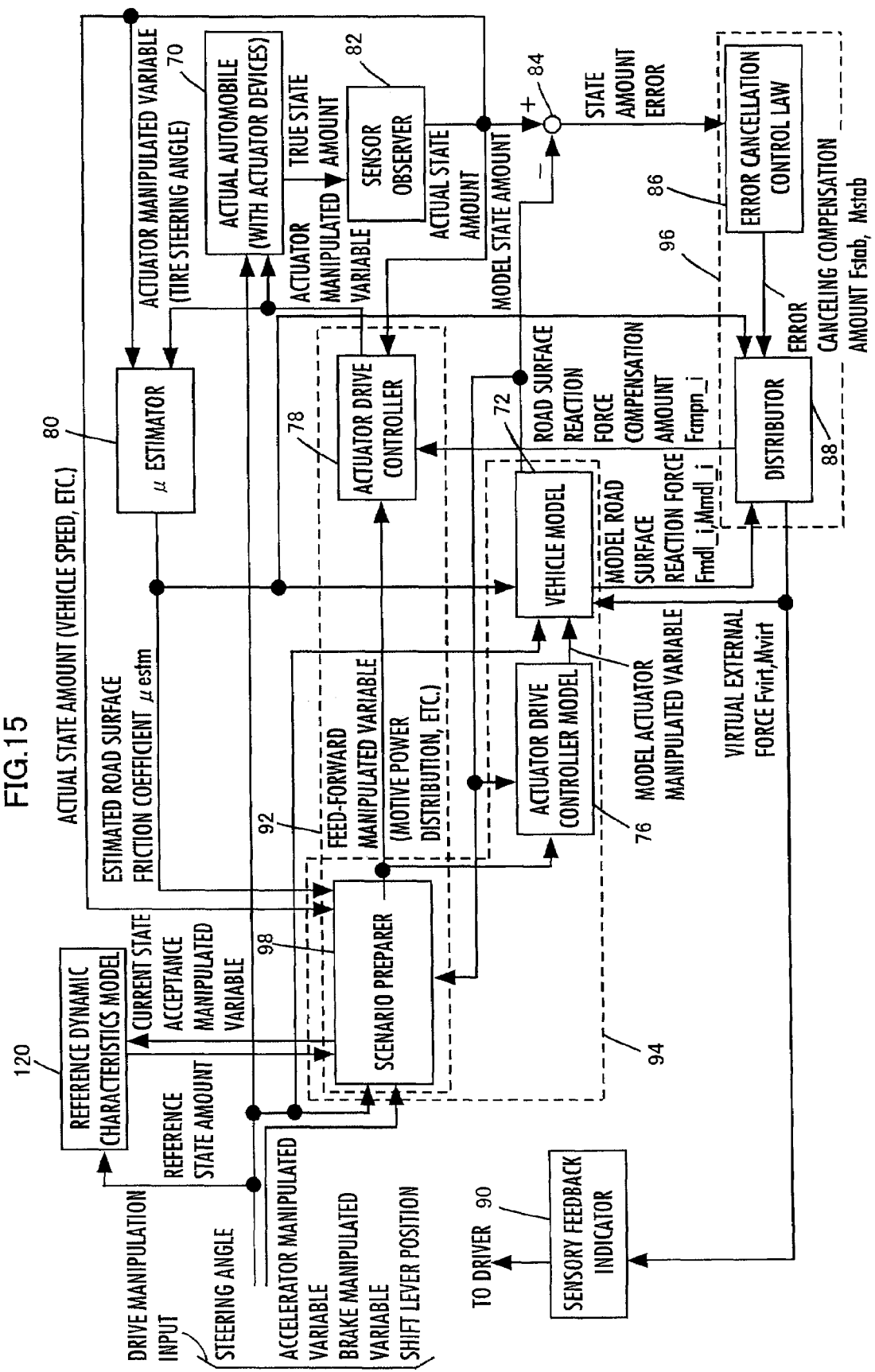
FIG. 15 is a block diagram showing a functional construction of an entire controller of a vehicle in a fourth embodiment.
Figure 16:
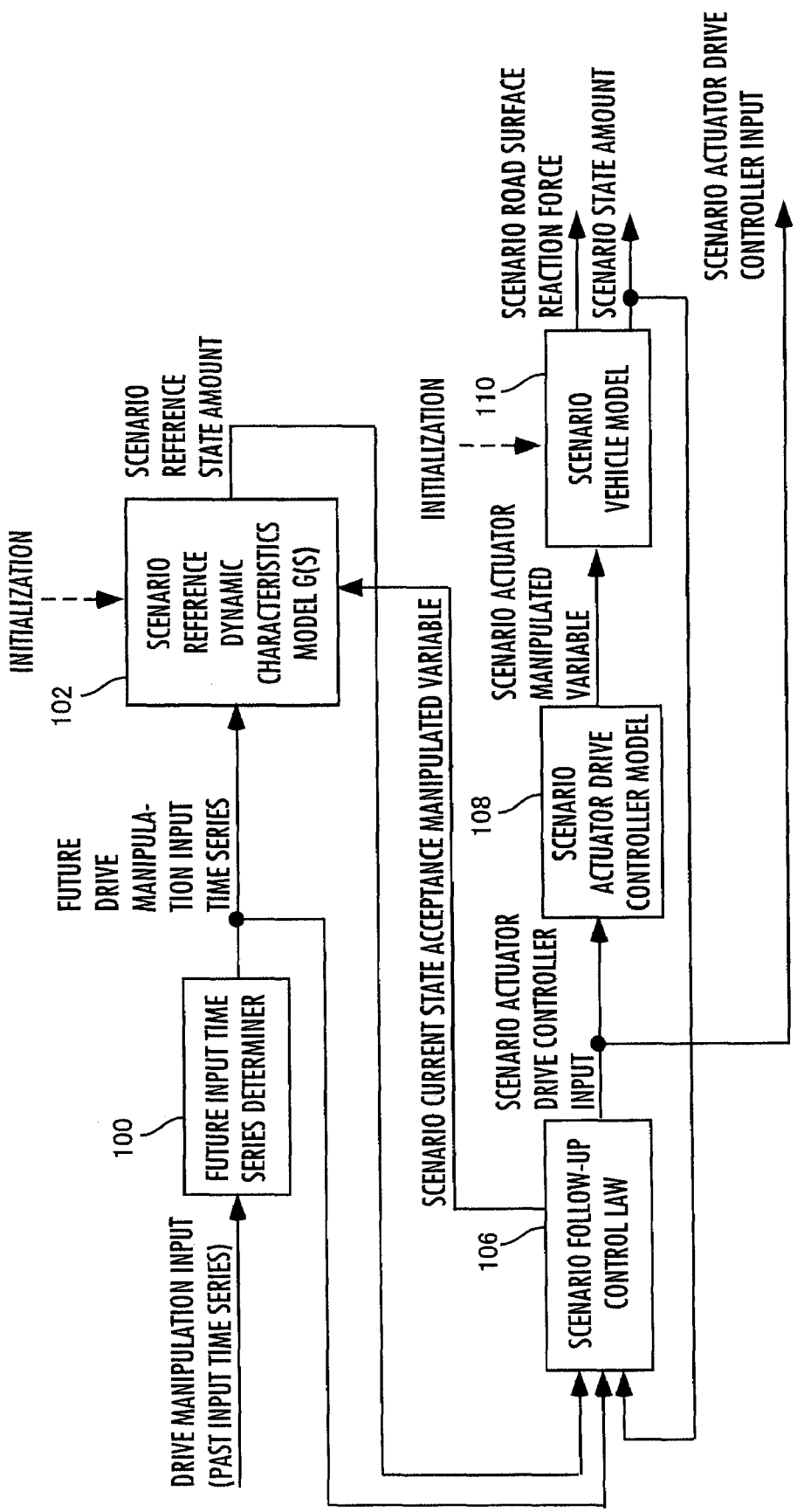
FIG. 16 is a block diagram showing a functional construction of a scenario preparer provided in the controller of the fourth embodiment.
Figure 17:
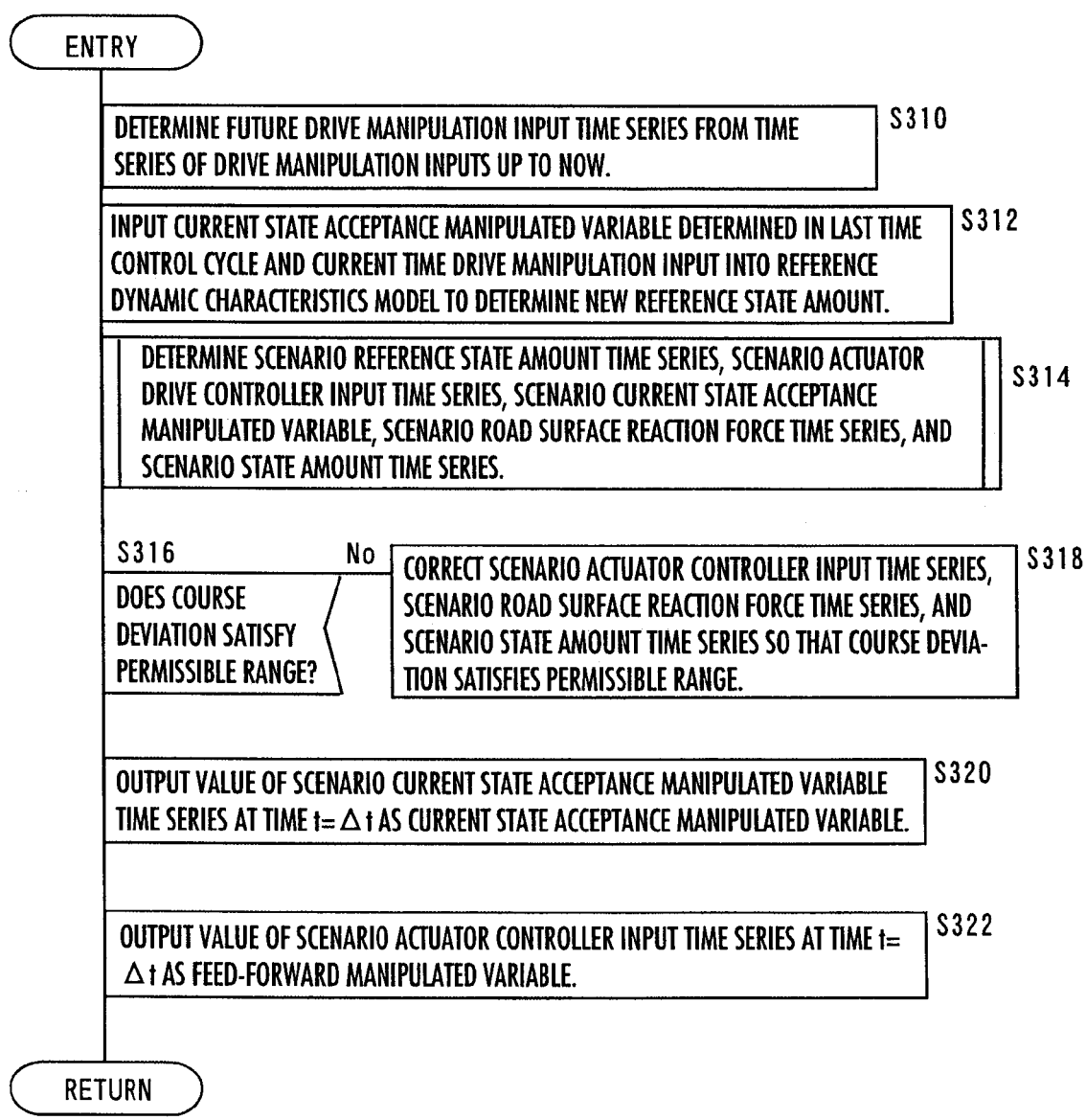
FIG. 17 is a flowchart showing the processing by the scenario preparer in the fourth embodiment.
Figure 18:
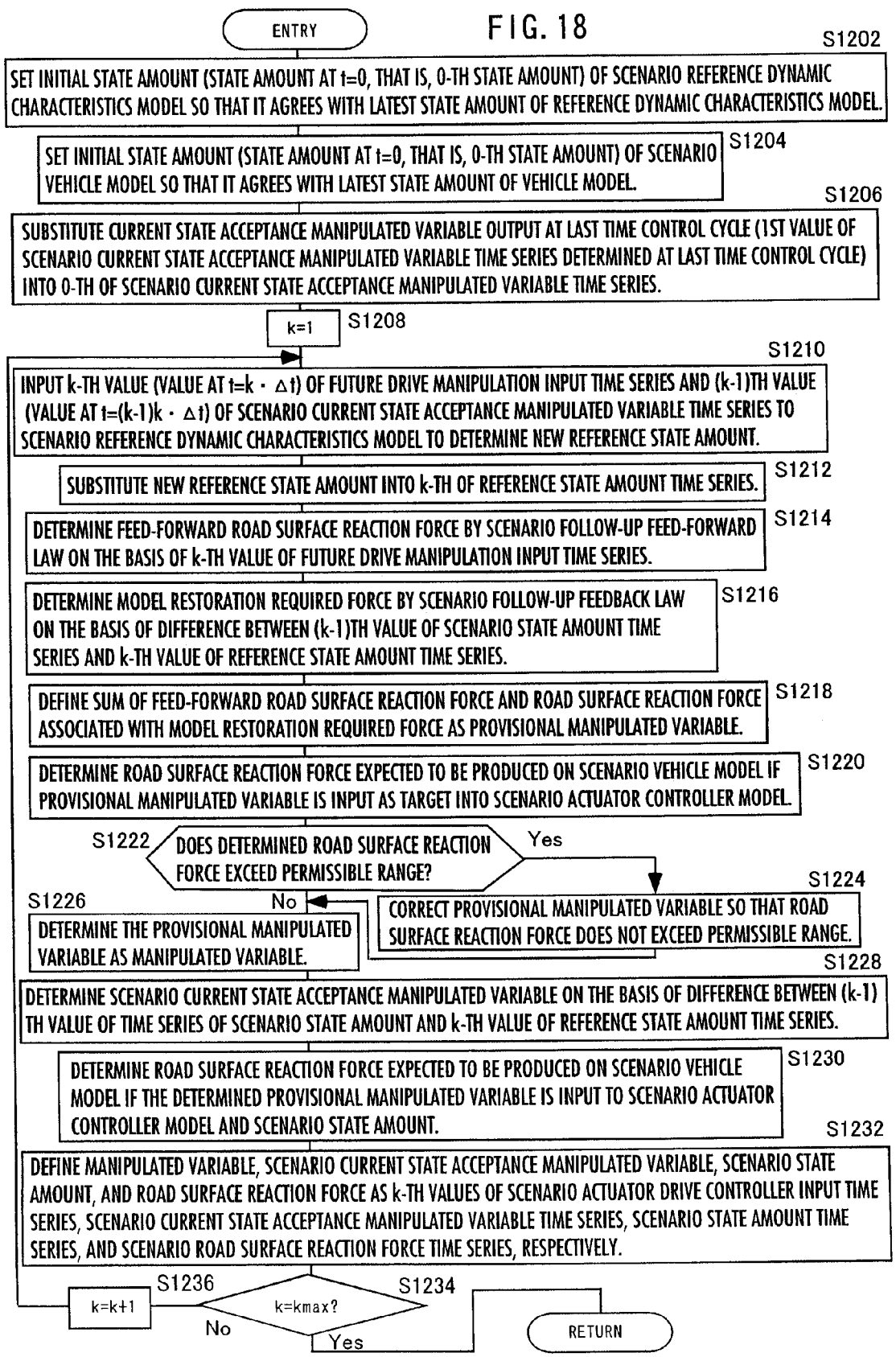
FIG. 18 is a flowchart showing the subroutine processing in S314 of the flowchart of FIG. 17.
Figure 19:
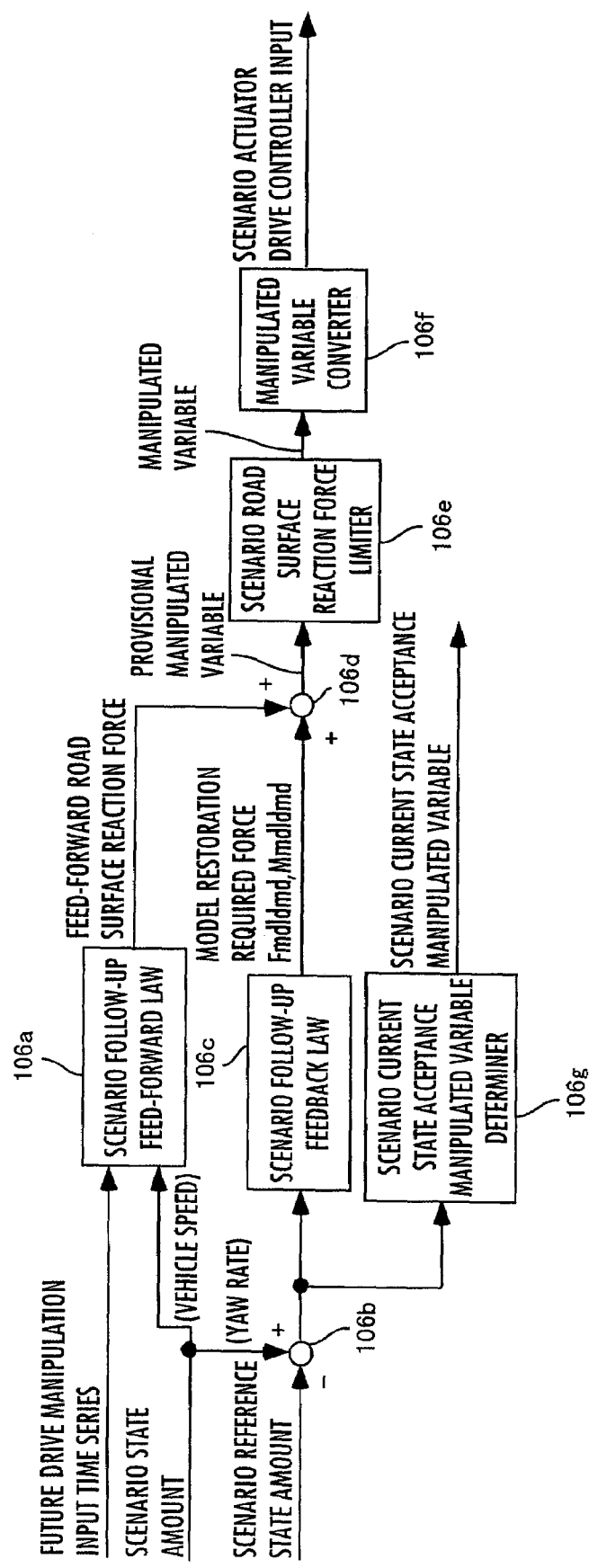
FIG. 19 is a block diagram showing a functional construction of a scenario follow-up control law in the fourth embodiment.
Figure 20:
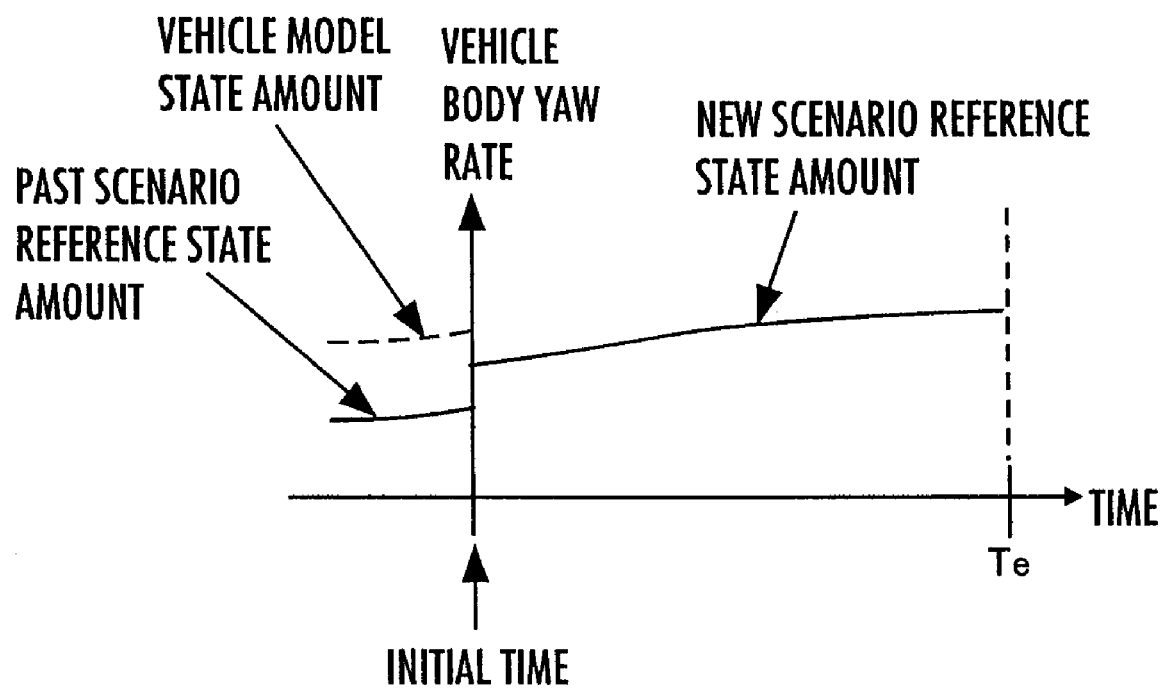
FIG. 20 is a graph for explaining the processing by the scenario preparer in the fourth embodiment.
Figure 21:
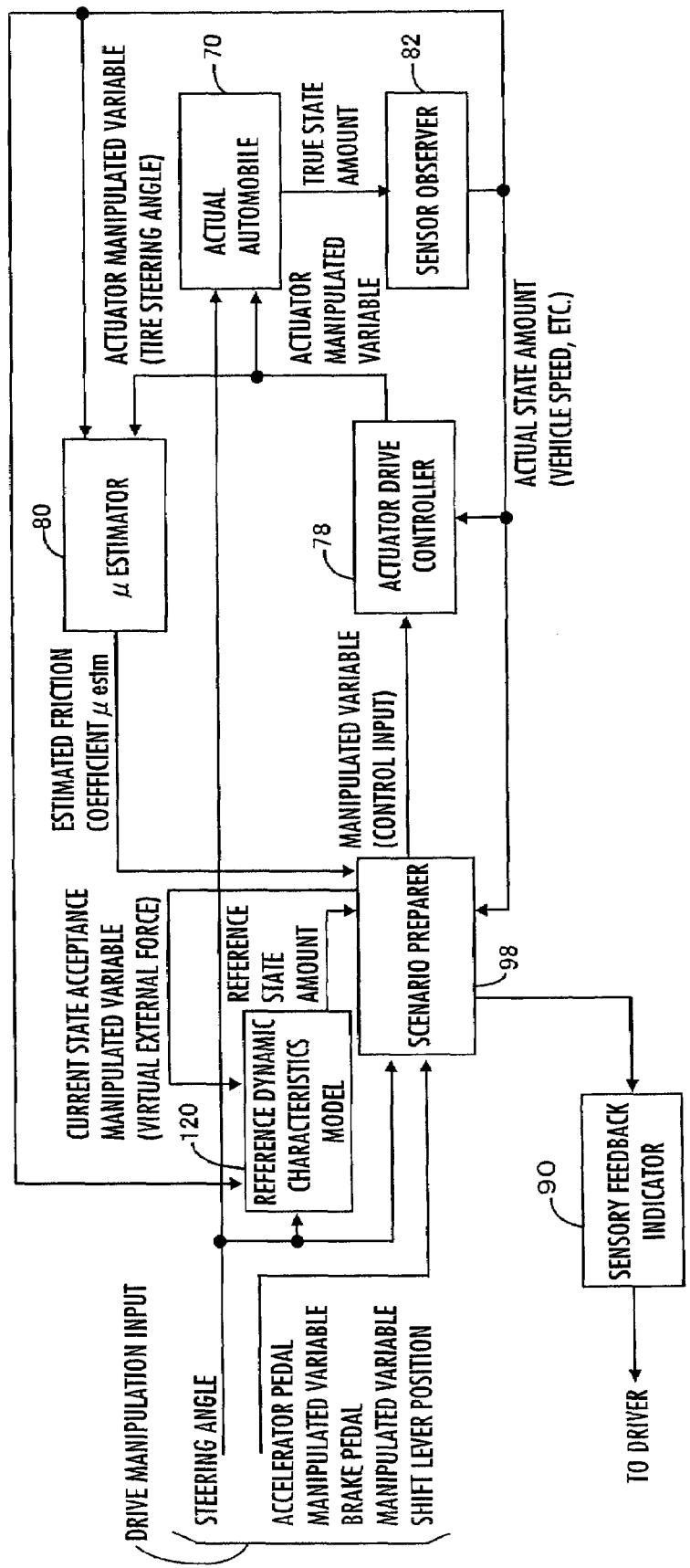
FIG. 21 is a block diagram showing a functional construction of an entire controller of a vehicle in a fifth embodiment.
Figure 22:
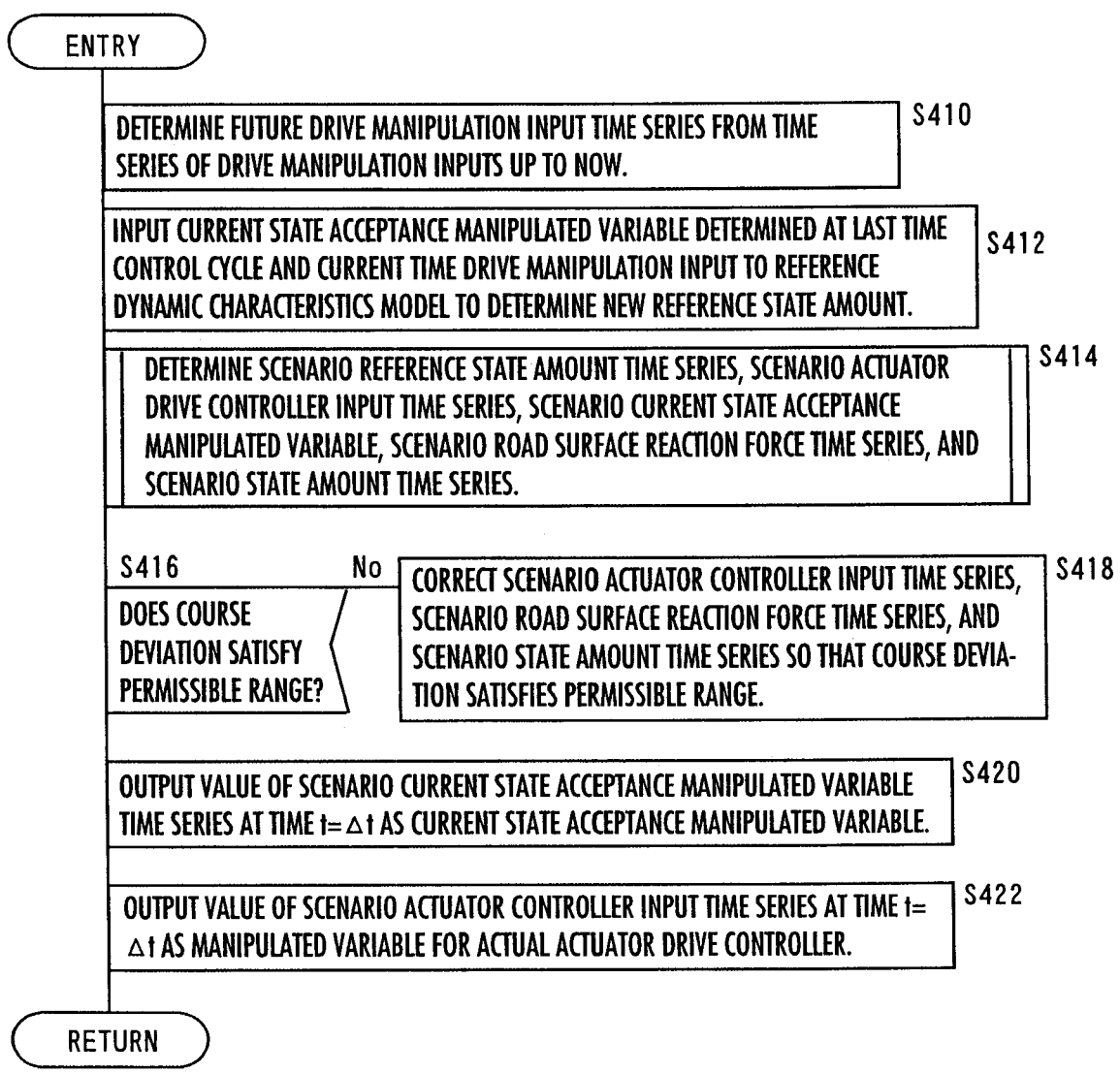
FIG. 22 is a flowchart showing the processing by the scenario preparer in the fifth embodiment.
Figure 23:
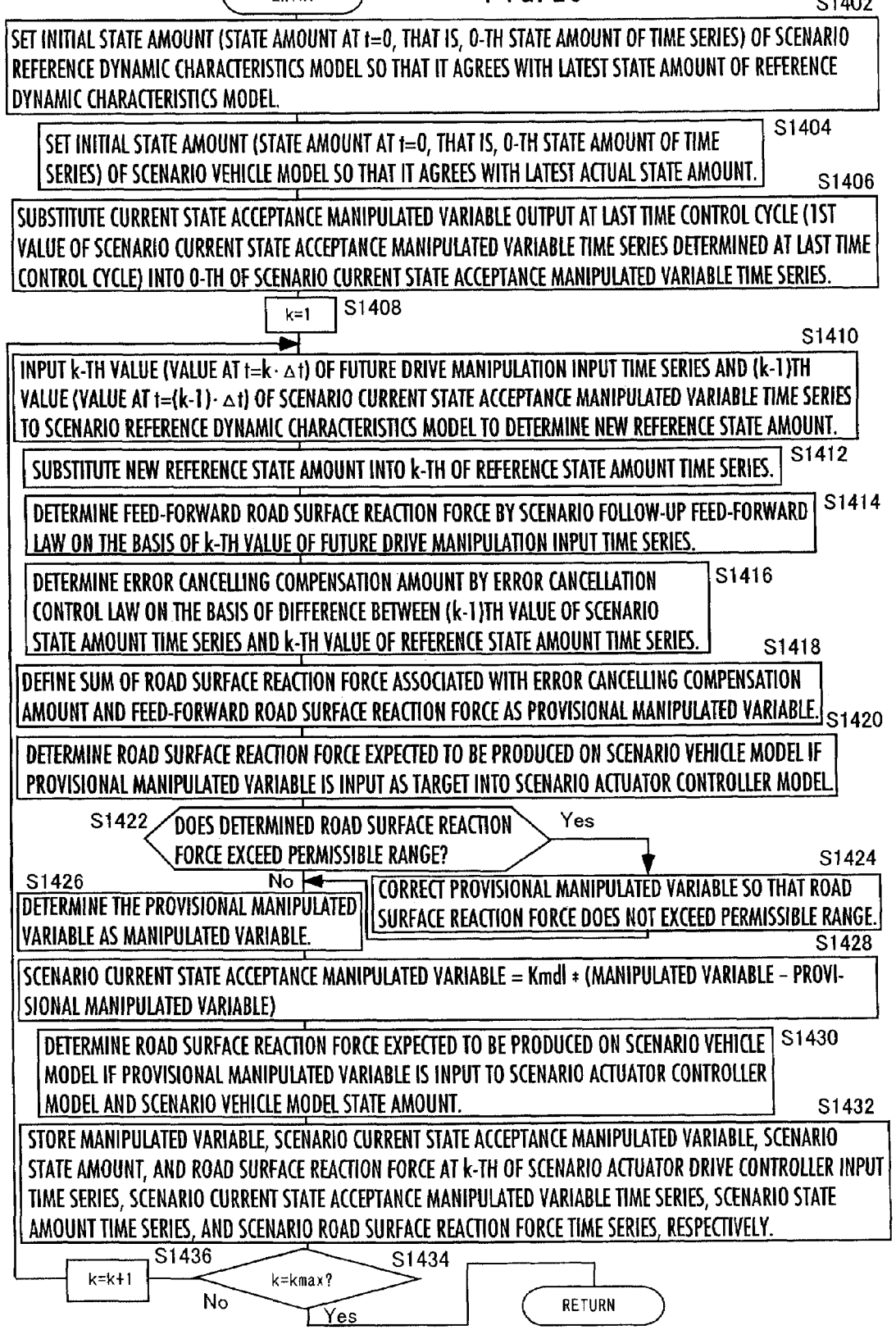
FIG. 23 is a flowchart showing the subroutine processing in S414 of the flowchart of FIG. 22.
Figure 24:
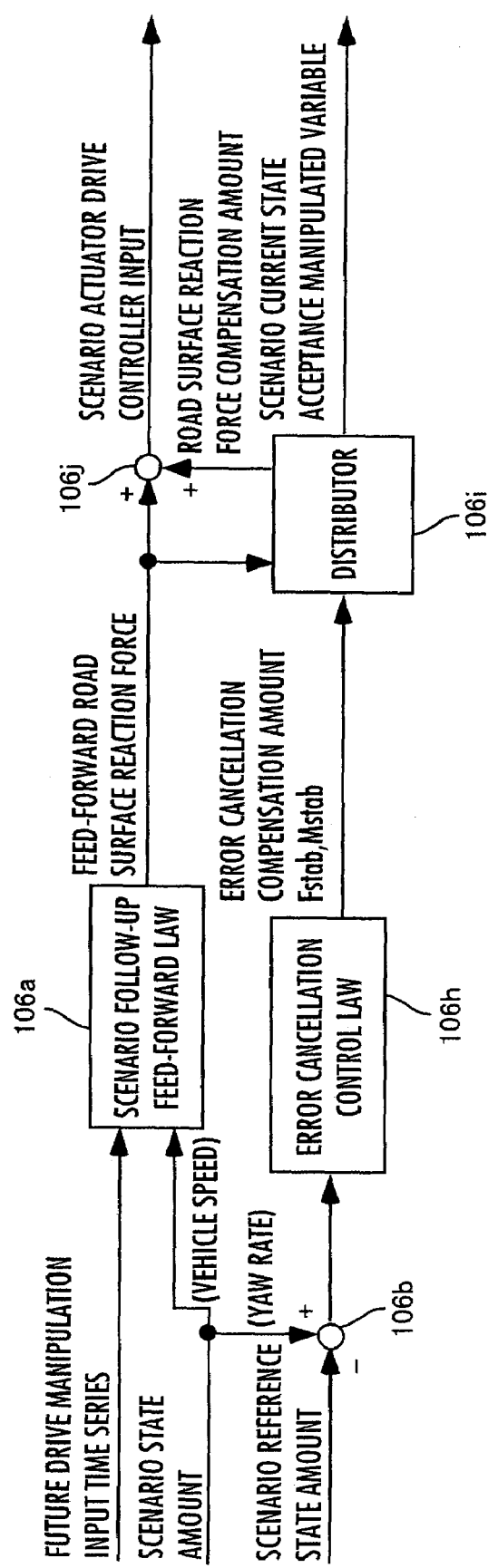
FIG. 24 is a block diagram showing a functional construction of a scenario follow-up control law in the fifth embodiment.

The invention claimed is:

1. A control device for a vehicle equipped with a drive manipulated variable output means for outputting a drive manipulated variable that indicates a drive manipulation state of a vehicle driven by a driver of the vehicle having a plurality of wheels, an actuator device provided in the vehicle so as to be able to perform manipulation of a predetermined motion of the vehicle, and an actuator device control means for controlling an operation of the actuator device, the control device for a vehicle comprising:

an actual state amount grasping means for detecting or estimating an actual state amount, which is a predetermined state amount related to an actual motion of the vehicle;

a vehicle model motion determining means for determining a vehicle model motion, which is a vehicle motion on a first vehicle model expressing dynamic characteristics of the vehicle, on the basis of at least the drive manipulated variable; and a state amount error reaction control means for determining an actual vehicle actuator manipulation control input for manipulating the actuator device of an actual vehicle and a vehicle model manipulation control input for manipulating the vehicle model motion according to a predetermined feedback control law or converging a first state amount error to 0, wherein the first state amount error is the difference between an actual state amount that has been detected or estimated and a model state amount, which is the predetermined state amount related to the vehicle model motion, wherein the actuator device control means comprises a means for controlling the actuator device on the basis of at least the actual vehicle actuator manipulation control input, and the vehicle model motion determining means comprises a means for determining the vehicle model motion on the basis of at least the drive manipulated variable and the vehicle model manipulation control input.

2. The control device for a vehicle according to claim 1, wherein the vehicle model manipulation control input is a virtual external force to be applied to a vehicle on the first vehicle model.

3. The control device for a vehicle according to claim 1, wherein the vehicle model manipulation control input comprises a manipulated variable of an actuator device on the first vehicle model.

4. The control device for a vehicle according to claim 1, wherein the actuator device control means comprises a means for determining an actual vehicle basic control input, which is a basic value of a control input specifying an operation of the actuator device on the basis of at least the drive manipulated variable, the actual vehicle actuator manipulation control input comprises a correction amount for correcting the actual vehicle basic control input, and the actuator device control means controls the actuator device on the basis of a control input obtained by correcting the determined actual vehicle basic control input by the actual vehicle actuator manipulation control input.

5. The control device for a vehicle according to claim 1, wherein the actuator device control means comprises a means for determining a road surface reaction force basic desired parameter that defines a basic desired value of a road surface reaction force to be applied to the vehicle on the basis of at least the drive manipulated variable, the actual vehicle actuator control input comprises a correction parameter for correcting the road surface reaction force basic desired parameter, and the actuator device control means controls the actuator device on the basis of a desired value of a road surface reaction force defined by a corrected parameter obtained by correcting the determined road surface reaction force basic desired parameter by the correction parameter.

6. The control device for a vehicle according to claim 4, wherein the vehicle model motion determining means comprises a means for determining a model basic control input, which is a basic value of a control input that defines an operation of the actuator device on the first vehicle model on the basis of at least the drive manipulated variable, the vehicle model manipulation control input comprises a correction amount for correcting the model basic control input, the vehicle model motion determining means comprises a means for determining the vehicle model motion by operating the actuator device on the first vehicle model on the basis of a manipulated variable obtained by correcting the determined model basic control input by the vehicle model manipulation control input, and the model basic control input agrees with the actual vehicle basic control input.

7. The control device for a vehicle according to claim 5, wherein the vehicle model manipulation control input comprises a virtual external force to be applied to a vehicle on the first vehicle model, the vehicle model motion determining means comprises a means for determining a model road surface reaction force parameter that defines a road surface reaction force to be applied to a vehicle on the first vehicle model on the basis of at least the drive manipulated variable, and a means for determining a motion of the first vehicle model by applying at least a road surface reaction force defined by the determined model road surface reaction force parameter and the virtual external force, which is the vehicle model manipulation control input, to the vehicle on the first vehicle model, and a road surface reaction force defined by the model road surface reaction force parameter agrees with a basic desired value of the road surface reaction force defined by the road surface reaction force basic desired parameter.

8. The control device for a vehicle according to claim 5, wherein the state amount error reaction control means comprises a means for setting a permissible range of the road surface reaction force and determines an actuator manipulation control input serving as the correction parameter such that a permissible range condition in that a desired value of a road surface reaction force defined by a corrected parameter obtained by correcting a basic desired value of a road surface reaction force defined by the determined road surface reaction force basic desired parameter by the correction parameter falls within the permissible range is satisfied.

9. The control device for a vehicle according to claim 8, wherein the correction parameter comprises a parameter that defines a correction amount of a road surface reaction force acting on each of the wheels of a vehicle, the road surface reaction force basic desired parameter comprises a parameter that defines a basic desired value of a road surface reaction force acting on each wheel, and the permissible range comprises a permissible range of a road surface reaction force acting on each of the wheels.

10. The control device for a vehicle according to claim 9, wherein the state amount error reaction control means comprises a means for determining an error canceling compensation amount, which is an external force to be applied to a vehicle in order to bring the first state amount error close to zero, on the basis of the first state amount error, and determines the correction parameter such that a resultant force of the correction amounts of road surface reaction forces acting on the individual wheels defined by the correction parameters approximates the error canceling compensation amount while satisfying the permissible range condition.

11. The control device for a vehicle according to claim 10, wherein the vehicle model manipulation control input comprises a virtual external force to be applied to a vehicle on the first vehicle model, and the state amount error reaction control means comprises a means for determining the virtual external force as the vehicle model manipulation control input on the basis of a difference between the resultant force of the correction amounts of the road surface reaction forces and the error canceling compensation amount.

12. The control device for a vehicle according to claim 10, wherein the vehicle model manipulation control input comprises a manipulated variable of an actuator device on the first vehicle model, and the state amount error reaction control means comprises a means for determining the manipulated variable as the vehicle model manipulation control input on the basis of a difference between the resultant force of the correction amounts of the road surface reaction forces and the error canceling compensation amount.

13. The control device for a vehicle according to claim 4, comprising a future drive manipulated variable determining means for determining a future drive manipulated variable, which is a drive manipulated variable for a predetermined period including a period until after a predetermined time from current time, on the basis of at least the drive manipulated variable before the current time, and a future vehicle behavior predicting means for predicting a future behavior of the first vehicle model on the basis of at least the future drive manipulated variable, using a latest value of a state amount of the first vehicle model as a starting point, wherein the actuator device control means determines the actual vehicle basic control input on the basis of a future behavior of the first vehicle model.

14. The control device for a vehicle according to claim 1, comprising:

a future drive manipulated variable determining means for determining a future drive manipulated variable, which is a drive manipulated variable for a predetermined period including a period until after a predetermined time from current time, on the basis of at least the drive manipulated variable before the current time; and a future vehicle behavior predicting means for predicting future behaviors of the second vehicle model and a third vehicle model while determining a model control input, which is a control input defining an operation of an actuator device on the third vehicle model on the basis of at least a difference between a state amount of the second vehicle model and a state amount of the third vehicle model and the future drive manipulated variable at each time until after the predetermined time from the current time, taking a latest value of a state amount of the first vehicle model as the starting point of the state amount of the second vehicle model that represents the dynamic characteristics of the vehicle and by taking a latest value of an actual state amount of the vehicle as the starting point of the state amount of the third vehicle model that represents the dynamic characteristics of the vehicle, wherein the actuator device control means determines the actual vehicle actuator manipulation control input on the basis of at least a future behavior of the third vehicle model.

15. The control device for a vehicle according to claim 4, comprising:

a future drive manipulated variable determining means for determining a future drive manipulated variable, which is a drive manipulated variable for a predetermined period including a period until after a predetermined time from current time, on the basis of at least the drive manipulated variable before the current time;

a reference motion state amount determining means for sequentially determining a state amount of a reference motion that the first vehicle model should follow by a reference dynamic characteristic model representing dynamic characteristics of the vehicle on the basis of at least the drive manipulated variable;

a future vehicle behavior predicting means for predicting future behaviors of the second vehicle model and a third vehicle model while determining a model control input, which is a control input defining an operation of an actuator device on the third vehicle model on the basis of at least a difference between a state amount of the second vehicle model and a state amount of the third vehicle model and the future drive manipulated variable at each time until after the predetermined time from the current time, a latest value of a state amount of the reference motion being the starting point of a state amount of the second vehicle model that represents the dynamic characteristics of the vehicle and a latest value of a state amount of the first vehicle model being the starting point of a state amount of the third vehicle model that represents the dynamic characteristics of the vehicle, wherein the actuator device control means determines the actual vehicle basic control input on the basis of at least a future behavior of the third vehicle model.

16. The control device for a vehicle according to claim 15, wherein the reference motion state amount determining means determines a new state amount of the reference motion on the basis of at least a difference between the state amount of the first vehicle model and the state amount of the reference motion and the drive manipulated variable.

17. The control device for a vehicle according to claim 5, comprising:

a reference motion determining means for determining a reference motion, which is a reference motion relative to the vehicle model motion, on the basis of at least the drive manipulated variable; and a means for determining a model restoring compensation amount, which is an external force to be applied to a vehicle to bring the second state amount error, which is a difference between a predetermined second state amount related to the determined reference motion and a predetermined second state amount related to the determined first vehicle model motion, close to zero, on the basis of the second state amount error, wherein the means for determining the road surface reaction force basic desired parameter determines the road surface reaction force basic desired parameter on the basis of at least the model restoring compensation amount.

18. The control device for a vehicle according to claim 6, comprising a reference motion determining means for determining a reference motion, which is a reference motion relative to the vehicle model motion, on the basis of at least the drive manipulated variable, wherein the means for determining the model basic control input determines the model basic control input on the basis of at least a second state amount error, which is a difference between a predetermined second state amount related to the determined reference motion and a predetermined second state amount related to the determined first vehicle model motion, such that the difference is brought close to zero.

* * * * *

UNITED STATES PATENT AND TRADEMARK OFFICE
CERTIFICATE OF CORRECTION

PATENT NO. : 7,702,442 B2 Page 1 of 1
APPLICATION NO. : 11/572606
DATED : April 20, 2010
INVENTOR(S) : Takenaka It is certified that error appears in the above-identified patent and that said Letters Patent is hereby corrected as shown below:

In Column 67, Line 2, in Claim 1, delete "or" and insert -- for --

Signed and Sealed this

Thirteenth Day of July, 2010

David J. Kappos
*Director of the United States Patent and Trademark Office*